US008383234B2

(12) United States Patent
Mayuzumi et al.

(10) Patent No.: US 8,383,234 B2
(45) Date of Patent: Feb. 26, 2013

(54) CHARGING MEMBER, PROCESS CARTRIDGE, AND ELECTROPHOTOGRAPHIC APPARATUS

(75) Inventors: Hiroshi Mayuzumi, Yokohama (JP); Tomohito Taniguchi, Suntou-gun (JP); Hidekazu Matsuda, Susono (JP); Nozomu Takahata, Suntou-gun (JP); Yusuke Yagisawa, Mishima (JP); Satoshi Koide, Susono (JP); Masataka Kodama, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 13/372,459

(22) Filed: Feb. 13, 2012

(65) Prior Publication Data

US 2012/0141162 A1 Jun. 7, 2012

Related U.S. Application Data

(63) Continuation of application No. PCT/JP2011/073276, filed on Oct. 4, 2011.

(30) Foreign Application Priority Data

Oct. 4, 2010 (JP) ................................. 2010-224897
Nov. 8, 2010 (JP) ................................. 2010-249896

(51) Int. Cl.
*B32B 5/16* (2006.01)
*G03G 21/16* (2006.01)

(52) U.S. Cl. ......... 428/323; 399/111; 428/331; 428/447

(58) Field of Classification Search .................. 399/111; 428/323, 331, 447
See application file for complete search history.

(56) References Cited

U.S. PATENT DOCUMENTS

| | | | |
|---|---|---|---|
| 4,917,939 | A | 4/1990 | Matsuda et al. |
| 5,158,619 | A | 10/1992 | Kawada et al. |
| 5,659,854 | A | 8/1997 | Masuda et al. |
| 6,094,556 | A | 7/2000 | Tanaka et al. |
| 6,600,893 | B2 | 7/2003 | Ashibe et al. |
| 6,725,002 | B2 | 4/2004 | Sakurai et al. |
| 6,737,133 | B2 | 5/2004 | Kusaba et al. |
| 7,201,967 | B2 | 4/2007 | Sakurai et al. |
| 7,208,211 | B2 | 4/2007 | Tanaka et al. |
| 7,381,510 | B2 | 6/2008 | Akiyama et al. |
| 7,979,004 | B2 | 7/2011 | Tanaka et al. |
| 2008/0292366 | A1 | 11/2008 | Akama et al. |
| 2010/0226684 | A1 | 9/2010 | Mayuzumi et al. |
| 2012/0076924 | A1 | 3/2012 | Mayuzumi et al. |
| 2012/0177402 | A1 | 7/2012 | Taniguchi et al. |

FOREIGN PATENT DOCUMENTS

| | | | |
|---|---|---|---|
| JP | 8-69148 | A | 3/1996 |
| JP | 9-244348 | A | 9/1997 |
| JP | 9-305024 | A | 11/1997 |
| JP | 2000-181243 | A | 6/2000 |
| JP | 2001-74036 | A | 3/2001 |
| JP | 2002-207362 | A | 7/2002 |
| JP | 2003-207994 | A | 7/2003 |
| JP | 2003-316112 | A | 11/2003 |
| JP | 2005-352114 | A | 12/2005 |
| JP | 2007-127777 | A | 5/2007 |
| JP | 2008-281944 | A | 11/2008 |

*Primary Examiner* — D. S. Nakarani
(74) *Attorney, Agent, or Firm* — Fitzpatrick, Cella, Harper & Scinto

(57) ABSTRACT

Provided is the following charging member of an electrophotographic apparatus. The charging member suppresses the occurrence of each of a streak-like image, a spot-like image, and a rough image that occur when image formation is performed over a long time period. Also provided are a process cartridge and an electrophotographic apparatus each having the charging member. A compound having a siloxane dendrimer structure at a vinyl group or a side chain of a vinyl polymer is incorporated into the surface layer of the charging member comprising a conductive substrate and the surface layer.

15 Claims, 4 Drawing Sheets

CHARGING MEMBER, PROCESS CARTRIDGE, AND ELECTROPHOTOGRAPHIC APPARATUS

CROSS-REFERENCE TO RELATED APPLICATIONS

This application is a continuation of International Application No. PCT/JP2011/073276, filed Oct. 4, 2011, which claims the benefit of Japanese Patent Applications No. 2010-224897, filed Oct. 4, 2010 and No. 2010-249896, filed Nov. 8, 2010.

BACKGROUND OF THE INVENTION

1. Field of the Invention

The present invention relates to a charging member, a process cartridge, and an electrophotographic apparatus.

2. Description of the Related Art

The following construction has been generally adopted for a contact-type charging member in an electrophotographic apparatus. The charging member has an elastic layer for securing a nip width. A problem of such charging member is a compression set (hereinafter, referred to as “C set”) that occurs when the charging member is left to stand in a state of being brought into abutment with an electrophotographic photosensitive member over a long time period. The C set becomes more remarkable as the temperature and humidity of the environment under which the charging member is left to stand become higher. In the case where the electrophotographic photosensitive member is charged with the charging member in which the C set has occurred, a uniform micro-discharge gap cannot be maintained when a portion where the C set is occurring (hereinafter, referred to as “C set portion”) passes a discharge region.

Thus, there arises a difference in the charging ability of the charging member between the C set portion and a non-C set portion. As a result, streak-like unevenness may occur at the position of an electrophotographic image corresponding to the C set portion of the charging member. The unevenness is apt to occur in such image particularly when only a DC voltage is used as a voltage to be applied to the charging member. Japanese Patent Application Laid-Open No. H09-244348 and Japanese Patent Application Laid-Open No. H08-69148 each disclose an invention relating to the alleviation of such C set.

SUMMARY OF THE INVENTION

However, in view of requests for additional improvements in the speed, image quality, and durability of an electrophotographic apparatus in recent years, a charging member in which a C set is less likely to occur has been demanded.

In view of the foregoing, the present invention is directed to provide a charging member of an electrophotographic apparatus, the charging member being capable of suppressing the occurrence of unevenness in an electrophotographic image resulting from a C set that may occur when the charging member and a photosensitive member are left to stand for a long time period while abutting on each other.

Further, the present invention is directed to provide a process cartridge and an electrophotographic apparatus capable of stably forming high-quality images.

According to one aspect of the present invention, there is provided a charging member, comprising a conductive substrate and a surface layer provided thereon, wherein the surface layer comprises a compound having a unit represented by the following formula (1):

(1)

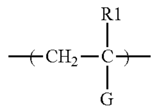

in the formula (1), R1 represents a hydrogen atom or an alkyl group having 1 to 4 carbon atoms, and G represents a group having a structure represented by the formula (2):

(2)

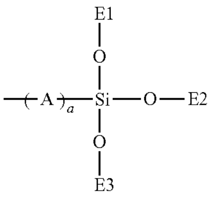

in the formula (2), A represents a group selected from the group consisting of an alkylene group having 2 to 10 carbon atoms, a phenylene group which may be substituted with at least one group selected from a methyl group and an ethyl group, and divalent groups represented by the following formulae (6) to (8), a represents 0 or 1, and E1, E2, and E3 each independently represent a group represented by the following formula (3):

(6)

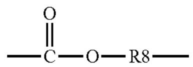

(7)

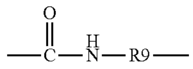

(8)

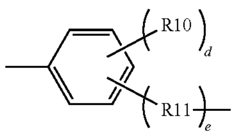

in the formulae (6) to (8), R8, R9, and R11 each independently represent an alkylene group having 1 to 10 carbon atoms, or a phenylene group which may be substituted with at least one group selected from a methyl group and an ethyl group, and in the formula (8), R10 represents an alkyl group having 1 to 10 carbon atoms, an alkoxyl group having 1 to 10 carbon atoms, an aryl group having 6 to 20 carbon atoms, an aralkyl group having 7 to 20 carbon atoms, an allyl group, or a halogen atom, d represents an integer of 0 to 4, and e represents 0 or 1;

(3)

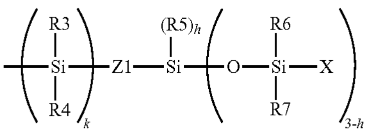

in the formula (3):

k represents 0 or 1, and h represents an integer of 0 to 3;

Z1 represents a group selected from the group consisting of an alkylene group having 2 to 10 carbon atoms, a phenylene group which may be substituted with at least one group selected from a methyl group and an ethyl group, and divalent groups represented by the following formulae (15) to (17);

R3, R4, R6, and R7 each independently represent an alkyl group having 1 to 5 carbon atoms, or a phenyl group which may be substituted with at least one group selected from a methyl group and an ethyl group;

R5 represents an alkoxy group having 1 to 10 carbon atoms, a phenoxy group which may be substituted with at least one group selected from a methyl group and an ethyl group, or a group represented by the following formula (20) or the following formula (21); and X represents a group selected from the group consisting of a hydrogen atom, an alkyl group having 1 to 10 carbon atoms, a phenyl group which may be substituted with at least one group selected from a methyl group and an ethyl group, an allyl group, a vinyl group, a group represented by the following formula (18), and a group represented by the following formula (19):

(15)

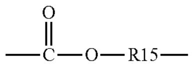

(16)

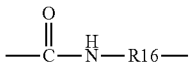

(17)

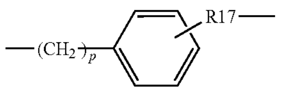

in the formulae (15) to (17), R15, R16, and R17 each independently represent an alkylene group having 1 to 10 carbon atoms, or a phenylene group which may be substituted with at least one group selected from a methyl group and an ethyl group, and p represents an integer of 0 to 3;

(18)

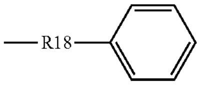

in the formula (18), R18 represents an alkylene group having 1 to 6 carbon atoms;

(19)

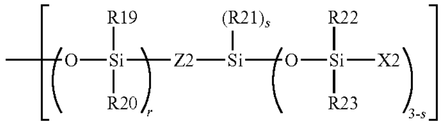

in the formula (19):

r represents 0 or 1, s represents an integer of 0 to 3, and Z2 represents a group selected from the group consisting of an alkylene group having 2 to 10 carbon atoms, a phenylene group which may be substituted with at least one group selected from a methyl group and an ethyl group, and divalent groups represented by the formulae (15) to (17);

R19, R20, R22, and R23 each independently represent an alkyl group having 1 to 5 carbon atoms, or a phenyl group which may be substituted with at least one group selected from a methyl group and an ethyl group, and R21 represents an alkoxy group having 1 to 10 carbon atoms, a phenoxy group which may be substituted with at least one group selected from a methyl group and an ethyl group, or a group represented by the following formula (20) or the following formula (21);

X2 represents a group selected from the group consisting of a hydrogen atom, an alkyl group having 1 to 10 carbon atoms, a phenyl group which may be substituted with at least one group selected from a methyl group and an ethyl group, an allyl group, a vinyl group, a group represented by the formula (18), and a group represented by the formula (19); and when X in the formula (3) is represented by the formula (19), the number of repetition of the group represented by the formula (19) is 1 to 10, and X2 in the formula (19) for forming a terminal end of the compound represents a hydrogen atom, an alkyl group having 1 to 10 carbon atoms, a phenyl group which may be substituted with at least one group selected from a methyl group and an ethyl group, an allyl group, a vinyl group, or a group represented by the formula (18):

(20)

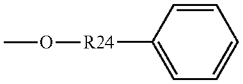

in the formula (20), R24 represents an alkylene group having 1 to 6 carbon atoms;

(21)

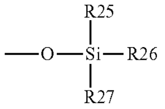

in the formula (21), R25, R26, and R27 each independently represent an alkyl group having 1 to 5 carbon atoms, or a phenyl group which may be substituted with at least one group selected from a methyl group and an ethyl group.

According to the present invention, the amount of the compression set of a charging member occurring when an electrophotographic photosensitive member and the charging member are left to stand for a long time period while abutting on each other (hereinafter, referred to as "C set amount") can be reduced. In addition, the charging ability of the charging member can be improved. Accordingly, even when a C set occurs owing to long-term abutment with the electrophotographic photosensitive member, the occurrence of unevenness resulting from the C set in an electrophotographic image can be suppressed.

Further, the process cartridge and the electrophotographic apparatus capable of stably forming high-quality electrophotographic images can be provided.

Further features of the present invention will become apparent from the following description of exemplary embodiments with reference to the attached drawings.

DESCRIPTION OF THE EMBODIMENTS

Figure 1A:
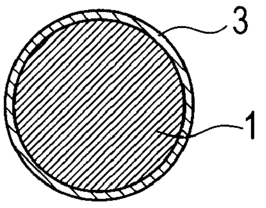
FIG. 1A is a sectional view of a charging member (roller shape) of the present invention.

A charging member according to the present invention has a surface layer on a conductive substrate and is used for charging a body to be charged. In addition, the surface layer contains a compound having a unit represented by the formula (1).

Hereinafter, the compound having the unit represented by the formula (1) according to the present invention is described.

(Compound Having Unit Represented by Formula (1))

The compound having the unit represented by the formula (1) has a carbosiloxane dendrimer structure (highly branched structure in which a siloxane bond and a silalkylene bond are alternately arranged) at a vinyl group or at a side chain of a vinyl polymer.

R1 represented in the formula (1) represents, for example, a hydrogen atom, or an alkyl group having 1 to 4 carbon atoms such as a methyl group, an ethyl group, a propyl group, an isopropyl group, and a butyl group. G in the formula (1) represents a group having a structure represented by the formula (2).

A represented in the formula (2) represents a group selected from the group consisting of an alkylene group having 2 to 10 carbon atoms, a phenylene group which may be substituted with at least one group selected from a methyl group and an ethyl group, and divalent groups represented by the following formulae (6) to (8). a represents 0 or 1.

(6)

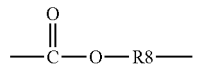

(7)

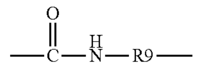

(8)

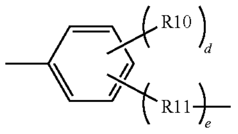

In the formulae (6) to (8), R8, R9, and R11 each independently represent an alkylene group having 1 to 10 carbon atoms, or a phenylene group which may be substituted with at least one group selected from a methyl group and an ethyl group. In the formula (8), R10 represents an alkyl group having 1 to 10 carbon atoms, an alkoxyl group having 1 to 10 carbon atoms, an aryl group having 6 to 20 carbon atoms, an aralkyl group having 7 to 20 carbon atoms, an allyl group, or a halogen atom, d represents an integer of 0 to 4, and e represents 0 or 1.

Adopting the structure enables an additional improvement in the stability of the compound upon incorporation into the surface layer.

R8 and R9 each represent, for example, a methylene group, an ethylene group, a propylene group, or a butylene group. Of those, a methylene group or a propylene group is more preferred.

R10 represents, for example, a methyl group, an ethyl group, a propyl group, or a butyl group. Of those, a methyl group is more preferred. R11 represents, for example, an alkylene group such as a methylene group, an ethylene group, a propylene group, or a butylene group. Of those, an ethylene group is more preferred.

E1, E2, and E3 in the formula (2) each independently represent a group represented by the following formula (3).

Z1 in the formula (3) represents an alkylene group having 2 to 10 carbon atoms, a phenylene group which may be substituted with at least one group selected from a methyl group and an ethyl group, or a group represented by any one of the following formulae (15) to (17). The alkylene group is exemplified by a linear alkylene group such as an ethylene group, a propylene group, a butylene group, and a hexylene group, or a branched alkylene group such as a methylmethylene group, a methylethylene group, a 1-methylpentylene group, and a 1,4-dimethylbutylene group.

In the formula (3), k represents 0 or 1, and h represents an integer of 0 to 3.

R3, R4, R6, and R7 each independently represent an alkyl group having 1 to 5 carbon atoms, or a phenyl group which may be substituted with at least one group selected from a methyl group and an ethyl group.

R5 represents an alkoxy group having 1 to 10 carbon atoms, a phenoxy group which may be substituted with at least one group selected from a methyl group and an ethyl group, or a group represented by the following formula (20) or the following formula (21).

X represents a group selected from the group consisting of a hydrogen atom, an alkyl group having 1 to 10 carbon atoms, a phenyl group which may be substituted with at least one group selected from a methyl group and an ethyl group, an allyl group, a vinyl group, a group represented by the following formula (18), and a group represented by the following formula (19).

(3)

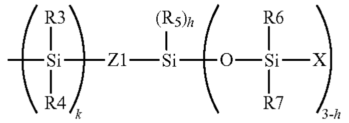

(15)

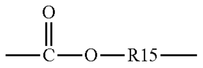

(16)

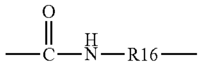

(17)

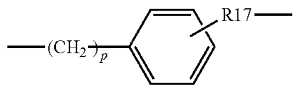

In the formulae (15) to (17), R15, R16, and R17 each independently represent an alkylene group having 1 to 10 carbon atoms, or a phenylene group which may be substituted with at least one group selected from a methyl group and an ethyl group, and p represents an integer of 0 to 3.

In the formula (3), R3, R4, R6, and R7 each independently represent an alkyl group having 1 to 5 carbon atoms, or a phenyl group. Of those, a methyl group is more preferred.

R5 represents an alkoxy group having 1 to 10 carbon atoms, a phenoxy group which may be substituted with at least one group selected from a methyl group and an ethyl group, or a group represented by the following formula (20) or the following formula (21).

(20)

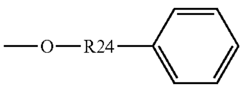

In the formula (20), R24 represents an alkylene group having 1 to 6 carbon atoms.

(21)

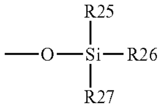

In the formula (21), R25, R26, and R27 each independently represent an alkyl group having 1 to 5 carbon atoms, or a phenyl group which may be substituted with at least one group selected from a methyl group and an ethyl group.

(18)

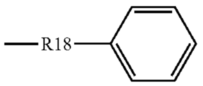

In the formula (18), R18 represents an alkylene group having 1 to 6 carbon atoms.

(19)

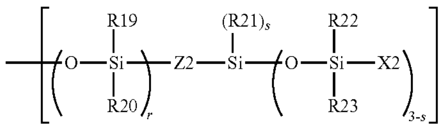

In the formula (19), r represents 0 or 1, and s represents an integer of 0 to 3.

Z2 represents a group selected from the group consisting of an alkylene group having 2 to 10 carbon atoms, a phenylene group which may be substituted with at least one group selected from a methyl group and an ethyl group, and divalent groups represented by the formulae (15) to (17). R19, R20, R22, and R23 each independently represent an alkyl group having 1 to 5 carbon atoms, or a phenyl group which may be substituted with at least one group selected from a methyl group and an ethyl group. R21 represents an alkoxy group having 1 to 10 carbon atoms, a phenoxy group which may be substituted with at least one group selected from a methyl group and an ethyl group, or a group represented by the following formula (20) or the following formula (21).

X2 represents a group selected from the group consisting of a hydrogen atom, an alkyl group having 1 to 10 carbon atoms, a phenyl group which may be substituted with at least one group selected from a methyl group and an ethyl group, an allyl group, a vinyl group, a group represented by the formula (18), and a group represented by the formula (19).

Figure 9A:
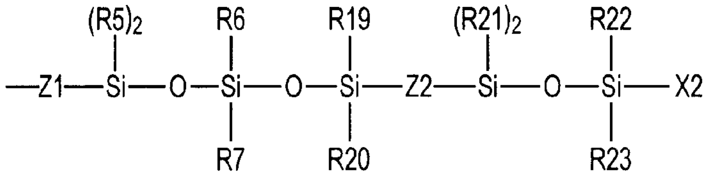
FIG. 9A is an explanatory diagram of a specific example of a structure represented by a formula (3).
Figure 9B:
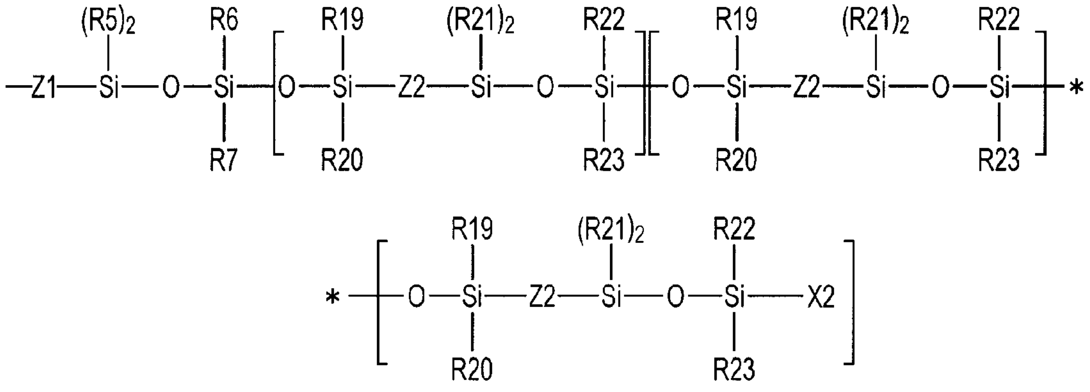
FIG. 9B is an explanatory diagram of a specific example of the structure represented by the formula (3).

When X in the formula (3) is represented by the formula (19), the number of repetition of the group represented by the formula (19) is 1 to 10, and X2 in the formula (19) for forming a terminal end of the compound represents a hydrogen atom, an alkyl group having 1 to 10 carbon atoms, a phenyl group which may be substituted with at least one group selected from a methyl group and an ethyl group, an allyl group, a vinyl group, or a group represented by the formula (18). Here, FIG. 9A illustrates an example of the structure of the formula (3) when k equals 0 and X is represented by the formula (19) in the formula (3), and the number of repetition of a group represented by the formula (19) is 1. In addition, FIG. 9B illustrates an example of the structure of the formula (3) when the above number of repetition is 3.

(20)

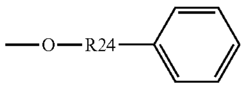

In the formula (20), R24 represents an alkylene group having 1 to 6 carbon atoms.

(21)

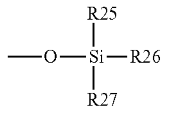

In the formula (21), R25, R26, and R27 each independently represent an alkyl group having 1 to 5 carbon atoms, or a phenyl group which may be substituted with at least one group selected from a methyl group and an ethyl group.

It should be noted that the respective groups in the formulae (3) to (21) may be different groups as long as the definition is satisfied in each of E1, E2, and E3. For example, Z1 in the formula (3) for forming E1 and Z1 in the formula (3) for forming E2 may be different groups as long as the groups are each selected from the group consisting of an alkylene group having 2 to 10 carbon atoms, a phenylene group which may be substituted with at least one group selected from a methyl group and an ethyl group, and divalent groups represented by the formulae (15) to (17).

The compound is more preferably such that h represents 0 and X represents a group represented by the formula (19) in the formula (3), the number of repetition of a structure represented by the following formula (5) among a structure represented by the formula (19) is 1 to 3, and r in the formula (19) represents 0.

(5)

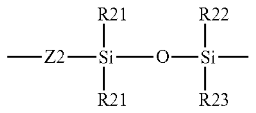

In addition, Z1 in the formula (3) more preferably represents an alkylene group having 2 to 6 carbon atoms.

Thus, a moisture absorption-suppressing effect and a molecular motion-suppressing effect on the surface layer to be described later are expressed with additional ease. Simultaneously, such an effect that flexibility and releasability are imparted is enhanced.

The compound more preferably further has a unit represented by the following formula (4) as well as the unit represented by the formula (1). Thus, the following tendency is observed. Adhesiveness between the surface layer and the conductive substrate is particularly improved, and hence the state in which the electrophotographic photosensitive member and the charging member abut on each other described in the foregoing is additionally stabilized.

(4)

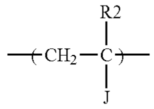

In the formula (4), R2 represents, for example, a hydrogen atom, a methyl group, an ethyl group, a propyl group, an isopropyl group, or a butyl group.

J represents a hydrogen atom, an alkyl group having 1 to 4 carbon atoms, a phenyl group which may be substituted with at least one group selected from a methyl group and an ethyl group, or a group represented by the following formula (9), (10), or (11).

Of those, a structure represented by the following formula (9), (10), or (11) is more preferred. Thus, the following tendency is observed. Adhesiveness between the surface layer and the conductive substrate is improved, and hence the state in which the electrophotographic photosensitive member and the charging member abut on each other described in the foregoing is additionally stabilized.

(9)

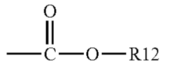

(10)

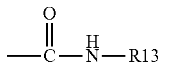

(11)

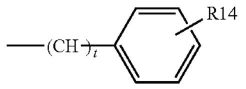

In the formulae (9) and (10), R12 and R13 each independently represent an alkyl group having 1 to 6 carbon atoms, a phenyl group which may be substituted with at least one group selected from a methyl group and an ethyl group, or a group represented by the formula (11). In the formula (11), R14 represents an alkyl group having 1 to 4 carbon atoms, or a phenyl group which may be substituted with at least one group selected from a methyl group and an ethyl group, and t represents an integer of 1 to 3.

The compound has a weight-average molecular weight of preferably 2,000 to 2,000,000, more preferably 5,000 to 1,000,000, still more preferably 10,000 to 700,000. Thus, the moisture absorption-suppressing effect and the molecular motion-suppressing effect on the surface layer described in the foregoing are expressed with additional ease. Simultaneously, such effect that flexibility and releasability are imparted is enhanced.

In addition, the content of the unit represented by the formula (1) is preferably 2.0% or more, more preferably 3.0 to 80% with respect to the entirety of the compound. Thus, the moisture absorption-suppressing effect and the molecular motion-suppressing effect on the surface layer described in the foregoing are expressed with additional ease. Simultaneously, such effect that flexibility and releasability are imparted is enhanced.

The compound is a compound represented by the following formula (12) or can be obtained by polymerizing the compound represented by the following formula (12).

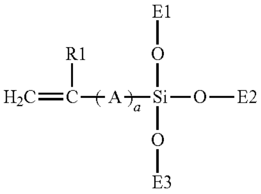

(12)

(In the formula (12), R1, A, a, E1, E2, and E3 are identical to the examples described in the foregoing.)

Examples of the structure represented by the formula (12) are represented by a formula (13) and a formula (14).

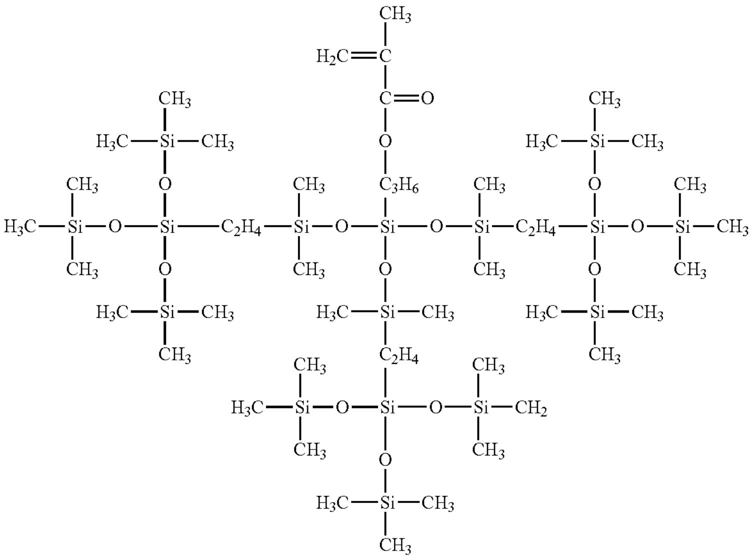

(13)

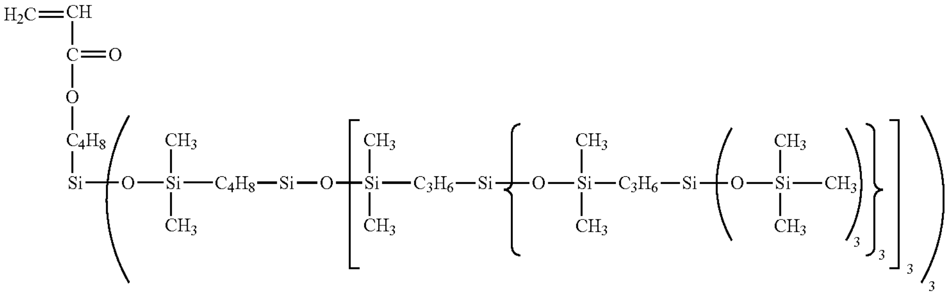

(14)

Further, the compound can be obtained by subjecting the compound represented by the formula (12) and the following compounds each having a vinyl group to a polymerization reaction. The compounds each having a vinyl group each have a radically polymerizable vinyl group, and for example, the following kinds of compounds are available. For example, there are given: lower alkyl(meth)acrylates such as methyl (meth)acrylate, ethyl(meth)acrylate, n-propyl(meth)acrylate, and isopropyl(meth)acrylate; higher (meth)acrylates such as glycidyl(meth)acrylate, n-butyl(meth)acrylate, isobutyl (meth)acrylate, tert-butyl(meth)acrylate, n-hexyl(meth)acrylate, cyclohexyl(meth)acrylate, 2-ethylhexyl(meth)acrylate, octyl(meth)acrylate, lauryl(meth)acrylate, and stearyl(meth) acrylate; lower fatty acid vinyl esters such as vinyl acetate and vinyl propionate; higher fatty acid esters such as vinyl butyrate, vinyl caproate, vinyl 2-ethylhexanoate, vinyl laurate, and vinyl stearate; aromatic vinyl-type monomers such as styrene, vinyltoluene, benzyl(meth)acrylate, phenoxyethyl (meth)acrylate, and vinylpyrrolidone; amide group-containing vinyl-type monomers such as (meth)acrylamide, N-methylol(meth)acrylamide, N-methoxymethyl(meth) acrylamide, isobutoxymethoxy(meth)acrylamide, and N,N-dimethyl(meth)acrylamide; hydroxyl group-containing vinyl-type monomers such as 2-hydroxyethyl(meth)acrylate, 2-hydroxybutyl(meth)acrylate, and 2-hydroxypropyl(meth) acrylate; fluorine-containing vinyl-type monomers such as trifluoropropyl(meth)acrylate, perfluorobutylethyl(meth) acrylate, and perfluorooctylethyl(meth)acrylate; epoxy group-containing vinyl-type monomers such as glycidyl (meth)acrylate and 3,4-epoxycyclohexylmethyl(meth)acrylate; carboxylic acid-containing vinyl-type monomers such as (meth)acrylic acid, itaconic acid, crotonic acid, fumaric acid, and maleic acid; ether bond-containing vinyl-type monomers such as tetrahydrofurfuryl(meth)acrylate, butoxyethyl(meth)acrylate, ethoxydiethylene glycol(meth)acrylate, polyethylene glycol(meth)acrylate, polypropylene glycol mono(meth)acrylate, hydroxybutyl vinyl ether, cetyl vinyl ether, and 2-ethylhexyl vinyl ether; unsaturated group-containing silicone compounds such as (meth)acryloxypropyltrimethoxysilane, (branched or linear) polydimethylsiloxane containing a (meth)acryl group at one end, and polydimethylsiloxane containing a styryl group at one end; butadiene; vinyl chloride; vinylidene chloride; (meth)acrylonitrile; dibutyl fumarate; maleic anhydride; dodecyl succinic anhydride; (meth)acryl glycidyl ether; alkali metal salts, ammonium salts, and organic amine salts of radically polymerizable unsaturated carboxylic acids such as (meth)acrylic acid, itaconic acid, crotonic acid, fumaric acid, and maleic acid; radically polymerizable unsaturated monomers each having a sulfonic acid group, such as styrenesulfonic acid, and alkali metal salts, ammonium salts, and organic amine salts thereof; quaternary ammonium salts derived from (meth)acrylic acid, such as 2-hydroxy-3-methacryloxypropyltrimethylammonium chloride; methacrylic acid esters of alcohols each having a tertiary amine group, such as methacrylic acid diethylamine ester, and quaternary ammonium salts thereof. Of those, (meth)acrylates are preferred, and specific examples thereof include: alkyl(meth)acrylates such as methyl(meth)acrylate, ethyl(meth)acrylate, n-butyl(meth)acrylate, and 2-ethylhexyl(meth)acrylate; hydroxyalkyl(meth) acrylates such as 2-hydroxyethyl(meth)acrylate, 2-hydroxypropyl(meth)acrylate, and 2-hydroxybutyl(meth) acrylate; fluorine-substituted alkyl(meth)acrylates such as trichloropropyl(meth)acrylate, perfluorobutylethyl(meth) acrylate, and perfluorooctylethyl(meth)acrylate; and epoxy group-containing (meth)acrylates such as glycidyl(meth) acrylate and 3,4-epoxycyclohexylmethyl(meth)acrylate.

A polyfunctional compound can also be used.

Examples thereof include: (meth)acryloyl group-containing monomers such as trimethylolpropane tri(meth)acrylate, pentaerythritol tri(meth)acrylate, ethylene glycol di(meth) acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth) acrylate, trimethylolpropane trioxyethyl(meth)acrylate, tris (2-hydroxyethyl)isocyanurate di(meth)acrylate, tris(2-hydroxyethyl)isocyanurate tri(meth)acrylate, di(meth)acrylate of an ethylene oxide or propylene oxide adduct of bisphenol A as a diol, di(meth)acrylate of an ethylene oxide or propylene oxide adduct of hydrogenated bisphenol A as a diol, and triethylene glycol divinyl ether; and unsaturated group-containing silicone compounds such as both end styryl group-terminated polydimethylsiloxane and both end methacryloxypropyl-terminated polydimethylsiloxane.

A silicone compound having a radically polymerizable unsaturated group and a silicon atom-bonded hydrolyzable group can also be used. Examples of the radically polymerizable unsaturated group include a (meth)acryloxy group-containing organic group, a (meth)acrylamide group-containing organic group, a styryl group-containing organic group, an alkenyl group having 2 to 10 carbon atoms, a vinyloxy group, and an allyloxy group. Examples of the silicon atom-bonded hydrolyzable group include a halogen group, an alkoxy group, and an acetoxy group. Specific examples of the compound can include organosilane compounds such as methacryloxypropyltrimethoxysilane, methacryloxypropylmethyldimethoxysilane, methacryloxypropyldimethylmethoxysilane, acryloxypropyltrimethoxysilane, acryloxypropylmethyldimethoxysilane, acryloxypropyldimethylmethoxysilane, vinyltrimethoxysilane, vinyltriethoxysilane, and vinylbutyldibutoxysilane.

Of those, a lower alkyl(meth)acrylate, an aromatic vinyl-type monomer, and an amide group-containing vinyl-type monomer are more preferred. Specifically, examples of the lower alkyl(meth)acrylate can include methyl(meth)acrylate, ethyl(meth)acrylate, propyl(meth)acrylate, and butyl(meth) acrylate. Examples of the aromatic vinyl-type monomer can include styrene, vinyltoluene, benzyl(meth)acrylate, and phenoxyethyl(meth)acrylate. Examples of the amide group-containing vinyl-type monomer can include (meth)acrylamide, N-methylol(meth)acrylamide, N-methoxymethyl (meth)acrylamide, and N,N-dimethyl(meth)acrylamide.

In addition, the content of the unit represented by the formula (1) with respect to the entirety of the compound can be adjusted by adjusting a mixing ratio between the compound represented by the formula (12) and any such compound having a vinyl group as described above.

A radical polymerization method or an ion polymerization method is employed as a polymerization method for obtaining the compound. Of those, a radical polymerization method is preferred. A solution polymerization method out of the radical polymerization methods is more preferred.

The solution polymerization method is performed by subjecting the compound represented by the formula (12) alone, or the compound represented by the formula (12) and the compound having a vinyl group, to a reaction in a solvent in the presence of a radical initiator under a temperature condition of 50 to 150° C.

Examples of the solvent to be used in this case can include: aliphatic hydrocarbons such as hexane, octane, decane, and cyclohexane; aromatic hydrocarbons such as benzene, toluene, and xylene; ethers such as diethyl ether, dibutyl ether, tetrahydrofuran, and dioxane; ketones such as acetone, methyl ethyl ketone, methyl isobutyl ketone, and diisobutyl ketone; esters such as methyl acetate, ethyl acetate, butyl acetate, and isobutyl acetate; alcohols such as methanol, ethanol, isopropyl alcohol, and butanol; and organosiloxane oligomers such as octamethylcyclotetrasiloxane, decamethylcyclopentasiloxane, hexamethyldisiloxane, and octamethyltrisiloxane.

A conventionally known compound generally used in a radical polymerization method is used as the radical initiator, and specific examples thereof can include: azobis-based compounds such as 2,2'-azobis(isobutyronitrile), 2,2'-azobis(2-methylbutyronitrile), and 2,2'-azobis(2,4-dimethylvaleronitrile); and organic peroxides such as benzoyl peroxide, lauroyl peroxide, tert-butylperoxybenzoate, and tert-butylperoxy-2-ethylhexanoate.

One kind of the radical initiators may be used alone, or two or more kinds thereof may be used as a mixture. The usage of the radical initiator preferably falls within the range of 0.1 to 5 parts by mass when the total amount of the compound to be polymerized is set to 100 parts by mass.

In addition, a chain transfer agent can be added upon polymerization. Specific examples of the chain transfer agent can include: mercapto compounds such as 2-mercaptoethanol, butyl mercaptan, n-dodecyl mercaptan, 3-mercaptopropyltrimethoxysilane, and polydimethylsiloxane having a mercaptopropyl group; and halides such as methylene chloride, chloroform, butyl bromide, and 3-chloropropyltrimethoxysilane. Of those, 3-mercaptopropyltrimethoxysilane is preferred. Such chain transfer agent is blended in an amount of preferably 0.001 to 15 parts by mass, more preferably 0.01 to 10 parts by mass when the total amount of the compound to be polymerized is set to 100 parts by mass. It should be noted that when the polymer of the present invention is produced, a remaining unreacted vinyl-based compound is preferably removed by performing a decompression treatment under heat after the polymerization.

As described above, the compound having the unit represented by the formula (1) has a bulky structure having a siloxane dendrimer structure (multi-branched structure in which a siloxane bond and a silalkylene bond are alternately arranged with a polysiloxane structure as a core) at a vinyl group or a side chain of a vinyl compound. The moisture absorbency of the surface layer containing a compound having such specific structure as a binder resin is suppressed, and the molecular motion of the surface layer is also suppressed. As a result, the amount of a compression set upon application of a stress to the charging member can be reduced. In addition, the presence of a structure containing a large number of silicon atoms like the formula (2) can improve the dielectric constant of the surface layer and can improve its charging ability. With those effects, the occurrence of a C set image can be suppressed.

In addition, the suppression of the moisture absorbency of the surface layer can prevent an environmental change of the charging member. Thus, the charging member can perform uniform charging under a wide variety of environments ranging from a high-temperature, high-humidity environment to a low-temperature, low-humidity environment.

(Binder Resin)

Although the surface layer according to the present invention may contain the compound having the unit represented by the formula (1) as a binder resin, the compound is preferably incorporated into the surface layer together with any other binder resin. Thus, the physical properties (such as the electrical resistance, surface roughness, and hardness) of the charging member are easily controlled to fall within desired ranges.

When the compound is incorporated into the surface layer together with the other binder resin, the content of the compound is preferably 0.5 part by mass or more, particularly preferably 1 part by mass or more, more preferably 5 parts by mass or more with respect to 100 parts by mass of the binder resin. In addition, a preferred upper limit for the content is 50 parts by mass.

A known binder resin can be used as the other binder resin to be used in the surface layer. Resins, and rubbers such as a natural rubber and a product obtained by subjecting the rubber to a vulcanization treatment, and a synthetic rubber can be given as examples of the other binder resin.

Resins such as a thermosetting resin and a thermoplastic resin can each be used as the resin. Of those, a fluororesin, a polyamide resin, an acrylic resin, a polyurethane resin, a silicone resin, a butyral resin, and the like are more preferred.

An ethylene-propylene-diene copolymer (EPDM), a styrene-butadiene copolymer rubber (SBR), a silicone rubber, a urethane rubber, an isoprene rubber (IR), a butyl rubber, an acrylonitrile-butadiene copolymer rubber (NBR), a chloroprene rubber (CR), an acrylic rubber, an epichlorohydrin rubber, and the like can each be used as the synthetic rubber.

One kind of those products may be used alone, or two or more kinds thereof may be used as a mixture. A copolymer is also permitted. It should be noted that a resin out of those products is preferably used as a binder to be used in the surface layer from the following viewpoints. The photosensitive member and any other member are not contaminated, and high releasability is obtained.

The surface layer more preferably has a volume resistivity of $1\times10^3$ Ω·cm to $1\times10^{15}$ Ω·cm in a 23° C./50% RH environment in order that the electrical resistance of the charging member may fall within the foregoing range.

When the volume resistivity of the surface layer falls short of the range, in the case where a pinhole occurs in the photosensitive member, an excessive current flows through the pinhole to cause the drop of an applied voltage, and hence an entire region in the longitudinal direction of the pinhole portion may appear as a belt-like charging failure in an image. In contrast, when the volume resistivity is excessively large, the following detrimental effect may arise. A current hardly flows through the charging roller, and hence the photosensitive member cannot be charged to a predetermined potential and an image does not achieve a desired density.

The volume resistivity of the surface layer is determined as described below. First, the surface layer in a roller state is peeled and cut into a strip shape measuring about 5 mm by 5 mm. A metal is deposited from the vapor onto each of both surfaces of the strip so that an electrode and a guard electrode may be produced. Thus, a sample for measurement is obtained. Alternatively, a surface layer coating film is formed onto an aluminum sheet by applying, and then a metal is deposited from the vapor onto the surface of the coating film so that a sample for measurement may be obtained. A voltage of 200 V is applied to the resultant sample for measurement with a microammeter (trade name: ADVANTEST R8340A ULTRA HIGH RESISTANCE METER, manufactured by Advantest Corporation). Then, a current after a lapse of 30 seconds is measured, and the volume resistivity is determined by calculation from the thickness and an electrode area.

The volume resistivity of the surface layer can be adjusted with a conducting agent such as an ion conducting agent and an electron conducting agent.

Examples of the ion conducting agent include the following agents: inorganic ionic substances such as lithium perchlorate, sodium perchlorate, and calcium perchlorate; cationic surfactants such as lauryltrimethylammonium chloride, stearyltrimethylammonium chloride, octadecyltrimethylammonium chloride, dodecyltrimethylammonium chloride, hexadecyltrimethylammonium chloride, trioctylpropylammonium bromide, and modified aliphatic dimethylethylammonium ethosulfate; zwitterionic surfactants such as lauryl betaine, stearyl betaine, and dimethylalkyllauryl betaine; quaternary ammonium salts such as tetraethylammonium perchlorate, tetrabutylammonium perchlorate, and trimethyloctadecylammonium perchlorate; and organic acid lithium salts such as lithium trifluoromethanesulfonate. One kind of those agents may be used alone, or two or more kinds thereof may be used in combination. Of the ion conducting agents, a quaternary ammonium salt is particularly suitably used because its resistance is stable against an environmental change.

Examples of the electron conducting agent include the following: metal-based fine particles and fibers of, for example, aluminum, palladium, iron, copper, and silver; metal oxides such as titanium oxide, tin oxide, and zinc oxide; composite particles obtained by subjecting the surfaces of the metal-based fine particles and fibers, and metal oxides to surface treatments by an electrolysis treatment, spray application, and mixing and shaking; and carbon powders such as furnace black, thermal black, acetylene black, Ketjen Black, polyacrylonitrile (PAN)-based carbon, and pitch-based carbon.

Examples of the furnace black include the following: SAF-HS, SAF, ISAF-HS, ISAF, ISAF-LS, I-ISAF-HS, HAF-HS, HAF, HAF-LS, T-HS, T-NS, MAF, FEF, GPF, SRF-HS-HM, SRF-LM, ECF, and FEF-HS. Examples of the thermal black include FT and MT.

In addition, one kind of those conducting agents can be used alone, or two or more kinds thereof can be used in combination.

In addition, the conducting agent has an average particle diameter of preferably 0.01 μm to 0.9 μm, more preferably 0.01 μm to 0.5 μm. As long as the average particle diameter falls within the range, the volume resistivity of the surface layer is easily controlled.

It is proper for the addition amount of any such conducting agent to be added to the surface layer to fall within the range of 2 parts by mass to 80 parts by mass, preferably 20 parts by mass to 60 parts by mass with respect to 100 parts by mass of the binder.

The surface of the conducting agent may be subjected to a surface treatment. Organic silicon compounds such as an alkoxysilane, a fluoroalkylsilane, and a polysiloxane, various kinds of silane-based, titanate-based, aluminate-based, and zirconate-based coupling agents, and oligomer or polymer compounds can each be used as a surface treatment agent. One kind of those agents may be used alone, or two or more kinds thereof may be used. Of those, organic silicon compounds such as an alkoxysilane and a polysiloxane, and various kinds of silane-based, titanate-based, aluminate-based, and zirconate-based coupling agents are preferred, and organic silicon compounds are more preferred.

When carbon black is used as a conducting agent, the carbon black is more preferably used as composite conductive fine particles obtained by coating metal oxide-based fine particles with the carbon black. It tends to be difficult to cause the carbon black to exist uniformly in the binder because the carbon black forms a structure. When the carbon black is used as composite conductive fine particles obtained by coating the metal oxide with the carbon black, the conducting agent can be caused to exist uniformly in the binder, and hence the volume resistivity is controlled with additional ease.

Examples of the metal oxide-based fine particles to be used for that purpose include a metal oxide and a composite metal oxide. Specifically, examples of the metal oxide can include zinc oxide, tin oxide, indium oxide, titanium oxides (such as titanium dioxide and titanium monoxide), iron oxide, silica, alumina, magnesium oxide, and zirconium oxide. In addition, examples of the composite metal oxide can include strontium titanate, calcium titanate, magnesium titanate, barium titanate, and calcium zirconate.

The metal oxide-based fine particles are more preferably subjected to a surface treatment. Organic silicon compounds such as an alkoxysilane, a fluoroalkylsilane, and a polysiloxane, various kinds of silane-based, titanate-based, aluminate-based, and zirconate-based coupling agents, and oligomer or polymer compounds can each be used for the surface treatment. One kind of those agents may be used alone, or two or more kinds thereof may be used.

Other particles can be incorporated into the surface layer to such an extent that an effect of the present invention is not impaired. Insulating particles can be given as examples of the other particles.

First, particles each formed of a polymer compound are given as the insulating particles. Examples thereof can include resins such as a polyamide resin, a silicone resin, a fluororesin, a (meth)acryl resin, a styrene resin, a phenol resin, a polyester resin, a melamine resin, a urethane resin, an olefin resin, an epoxy resin, and copolymers, modified products, and derivatives thereof, an ethylene-propylene-diene copolymer (EPDM), a styrene-butadiene copolymer rubber (SBR), a silicone rubber, a urethane rubber, an isoprene rubber (IR), a butyl rubber, a chloroprene rubber (CR), and thermoplastic elastomers such as a polyolefin-based thermoplastic elastomer, a urethane-based thermoplastic elastomer, a polystyrene-based thermoplastic elastomer, a fluororubber-based thermoplastic elastomer, a polyester-based thermoplastic elastomer, a polyamide-based thermoplastic elastomer, a polybutadiene-based thermoplastic elastomer, an ethylene vinyl acetate-based thermoplastic elastomer, a polyvinyl chloride-based thermoplastic elastomer, and a chlorinated polyethylene-based thermoplastic elastomer.

In particular, a (meth)acryl resin, a styrene resin, a urethane resin, a fluororesin, and a silicone resin are preferred.

Other examples of the insulating particles can include particles of zinc oxide, tin oxide, indium oxide, titanium oxides (such as titanium dioxide and titanium monoxide), iron oxide, silica, alumina, magnesium oxide, zirconium oxide, strontium titanate, calcium titanate, magnesium titanate, barium titanate, calcium zirconate, barium sulfate, molybdenum disulfide, calcium carbonate, magnesium carbonate, dolomite, talc, kaolin clay, mica, aluminum hydroxide, magnesium hydroxide, zeolite, wollastonite, diatomaceous earth, glass beads, bentonite, montmorillonite, hollow glass spheres, a organic metal compound, and an organic metal salt. In addition, iron oxides such as ferrite, magnetite, and hematite, activated carbon, and the like can also be used.

One kind of those particles may be used, or two or more kinds thereof may be used in combination. In addition, the particles to be used may be subjected to, for example, a surface treatment, modification, the introduction of a functional group or a molecular chain, or coating. The particles are more preferably subjected to a surface treatment in order that the dispersibility of the particles may be improved.

Although any such surface treatment agent as described in the foregoing can be used in such surface treatment, a surface treatment with a fatty acid or a fatty acid metal salt as well as the surface treatment can be given. A saturated or unsaturated fatty acid can be used as the fatty acid, and a fatty acid having 12 to 22 carbon atoms is preferred. Salts of saturated or unsaturated fatty acids and metals can each be used as the fatty acid metal salt. Specifically, salts of fatty acids each having 12 to 18 carbon atoms and alkaline earth metals such as magnesium, calcium, strontium, and barium, alkali metals such as lithium, sodium, and potassium, and metals such as zinc, aluminum, copper, iron, lead, and tin can be given as examples thereof.

The surface treatment agent is preferably used in an amount of 0.01 part by mass to 15.0 parts by mass with respect to 100 parts by mass of the insulating particles. As long as the amount falls within the range, sufficient dispersibility can be imparted to the insulating particles. The amount is more preferably 0.02 part by mass to 12.5 parts by mass, still more preferably 0.03 part by mass to 10.0 parts by mass.

A release agent may be further incorporated into the surface layer for improving the releasability of its surface. When the release agent is a liquid, the release agent serves as a leveling agent as well upon formation of the surface layer.

A release agent having low surface energy, a release agent having sliding property, or the like can be utilized as such release agent, and as for its nature, solid and liquid release agents can each be used. Specific examples of the release agent include molybdenum disulfide, tungsten disulfide, boron nitride, and a metal oxide such as lead monoxide. An oily or solid compound containing silicon or fluorine in a molecule thereof (such as a releasable resin or a powder thereof, or a product obtained by introducing a site having releasability to part of a polymer), a wax, or a higher fatty acid or a salt, an ester, or any other derivative thereof can also be used.

The surface layer has a thickness of preferably 0.1 μm to 100 μm, more preferably 1 μm to 50 μm.

Figure 5A:
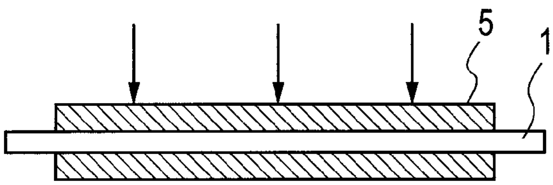
FIG. 5A is a schematic view illustrating a section viewed from an axial direction of a site where the surface roughness of the roller of the present invention or the thickness of its surface layer is measured.
Figure 5B:
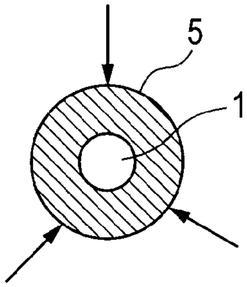
FIG. 5B is a schematic view illustrating a section viewed from a direction perpendicular to the axial direction of the site where the surface roughness of the roller of the present invention or the thickness of its surface layer is measured.

It should be noted that the thickness of the surface layer can be measured by cutting out a roller section at a position illustrated in each of FIGS. 5A and 5B with a keen cutting tool, and observing the section with an optical microscope or an electron microscope.

The surface layer may be subjected to a surface treatment. A surface processing treatment with UV or an electron beam, and a surface modification treatment involving causing a compound or the like to adhere to the surface and/or impregnating the surface with the compound or the like can be given as examples of the surface treatment.

In addition, graphitized particles are preferably incorporated into the surface layer according to the present invention as surface-roughening particles for roughening the surface of the surface layer.

That is, the following contact charging mode has been frequently adopted in an electrophotographic apparatus. A voltage (a voltage formed only of a DC voltage or a voltage obtained by superimposing an AC voltage on a DC voltage) is applied to a charging member brought into contact with, or placed close to, the surface of an electrophotographic photosensitive member so that the surface of the electrophotographic photosensitive member may be charged. Here, the voltage to be applied to the charging member is preferably formed only of a DC voltage (hereinafter, referred to as "DC charging mode") from the viewpoints of a cost reduction and a reduction in the size of the electrophotographic apparatus.

However, the DC charging mode has involved the following problem. A horizontal streak is apt to occur in an electrophotographic image owing to a charging failure caused by minute resistance unevenness of the charging member, or by the adhesion of toner or an external additive to its surface.

To solve such problem, Japanese Patent Application Laid-Open No. 2003-316112 proposes a method of alleviating a horizontal streak-like charging failure in a charging roller to be used in the DC charging mode, the method involving incorporating resin particles into the surface layer of the charging roller to form protruded portions. In recent years, however, performance requested of a charging member has become sophisticated in association with an improvement in the performance of an electrophotographic apparatus. In other words, the following requests have arisen:

(1) in association with the lengthening of a lifetime, the discharge characteristic of the charging member must be stabilized so that the member can endure the output of a large number of images;

(2) in association with an increase in speed, the charging member must have such charging performance as to discharge with additional ease; and (3) in association with an improvement in image quality, the surface of the charging member tends to be additionally susceptible to contamination owing to a reduction in the particle diameter of toner and the diversification of external additives, and hence a charging member provided with such charging performance as to be capable of sustaining stable discharge even when contaminated has been requested.

To meet such requests, Japanese Patent Application Laid-Open No. 2007-127777 proposes a charging roller containing conductive particles in its surface layer.

Under such circumstances, the charging member obtained by incorporating the graphitized particles into the surface layer according to the present invention as surface-roughening particles to form protruded portions derived from the graphitized particles in the surface layer can maintain excellent charging performance over a long time period.

The protruded portions derived from the graphite particles express a reducing effect on a frictional force between the electrophotographic photosensitive member and the charging member by making abutment between the electrophotographic photosensitive member and the charging member point contact.

The compound having the unit represented by the formula (1) has a siloxane dendrimer structure (highly branched structure in which a siloxane bond and a silalkylene bond are alternately arranged with a polysiloxane structure as a core) at a vinyl group or a side chain of a vinyl polymer, and hence has an extremely bulky structure. The specific structure expresses such an effect that flexibility and releasability are simultaneously imparted to the surface layer.

The opening of the compression set can be suppressed as a result of the reduction of the frictional force by the protruded portions derived from the graphite particles and an improvement in releasability by the siloxane dendrimer structure. Simultaneously, abnormal rotation behavior of the charging member resulting from the rotation unevenness of the electrophotographic photosensitive member or from the vibration of the electrophotographic apparatus can be suppressed as a result of an improvement in the flexibility of the surface layer by the siloxane dendrimer structure. Thus, the occurrence of abnormal discharge can be suppressed.

In addition, the expansion and contraction of the protruded portions derived from the graphite particles with temperatures and humidities are suppressed. Simultaneously, the siloxane dendrimer structure suppresses the moisture absorption of the surface layer and suppresses the molecular motion of the surface layer. That is, the entire region of the surface layer, in particular, a vicinity of the protruded portions to abut on a photosensitive drum is of such a construction as to be extremely hardly affected by the temperatures and the humidities. Thus, a rotational abutment state between the electrophotographic photosensitive member and the charging member is stabilized irrespective of a usage environment, and hence a suppressing effect on the occurrence of the abnormal discharge can be expressed.

It should be noted that the graphite particles each have conductivity and the protruded portions derived from the graphite particles can preferentially perform discharge to the electrophotographic photosensitive member. Simultaneously, the siloxane dendrimer structure can improve the dielectric constant of the surface layer and can improve the charging ability of the charging member because the structure has a specific structure containing a large number of silicon atoms. Therefore, the vicinity of the protruded portions derived from the graphite particles is a stable discharge site to which conductivity and dielectric property are imparted. Thus, the occurrence of the abnormal discharge can be suppressed, and at the same time, stable discharge can be performed over a long time period.

In addition, the moisture absorption-suppressing effect of the siloxane dendrimer structure suppresses an environmental change of the charging member. Thus, stable charging can be performed under a wide variety of environments ranging from a high-temperature, high-humidity environment to a low-temperature, low-humidity environment.

Japanese Patent Application Laid-Open No. H09-305024, Japanese Patent Application Laid-Open No. 2002-207362, and Japanese Patent Application Laid-Open No. 2003-207994 and the like each propose that a silicone-modified acrylic polymer or the like be incorporated into a charging member. However, the incorporation has not led to the expression of the effect described in the present invention.

<Charging Member>

Figure 1B:
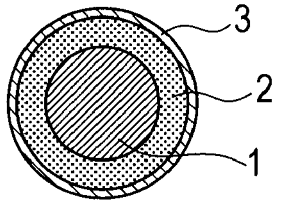
FIG. 1B is a sectional view of the charging member (roller shape) of the present invention.
Figure 1C:
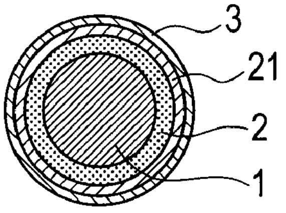
FIG. 1C is a sectional view of the charging member (roller shape) of the present invention.
Figure 1D:
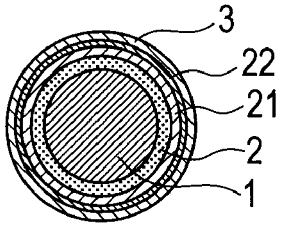
FIG. 1D is a sectional view of the charging member (roller shape) of the present invention.
Figure 2A:
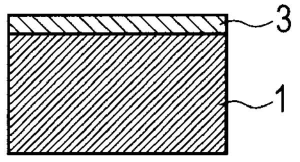
FIG. 2A is a sectional view of the charging member (plate shape) of the present invention.
Figure 2B:
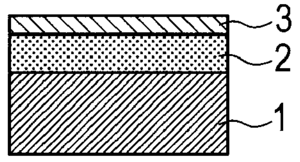
FIG. 2B is a sectional view of the charging member (plate shape) of the present invention.
Figure 3A:
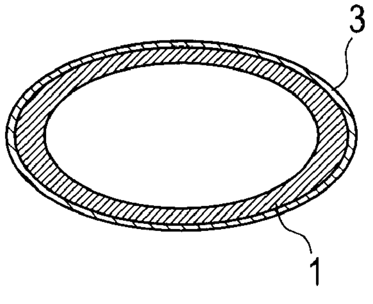
FIG. 3A is a sectional view of the charging member (belt shape) of the present invention.
Figure 3B:
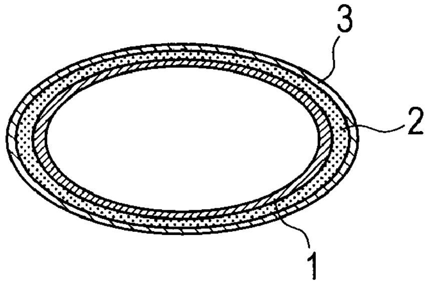
FIG. 3B is a sectional view of the charging member (belt shape) of the present invention.

FIGS. 1A to 1D (roller shape), FIGS. 2A and 2B (flat plate shape), and FIGS. 3A and 3B (belt shape) each illustrate an example of the charging member of the present invention. It should be noted that those figures each illustrate a schematic sectional view of the charging member of the present invention. It should be noted that a charging member of a roller shape illustrated in each of FIGS. 1A to 1D, that is, a charging roller is described in detail below because the charging members basically have the same construction.

FIG. 1A illustrates a charging roller having a conductive substrate 1 and a surface layer 3.

FIG. 1B illustrates a charging roller having an elastic layer 2 between the conductive substrate 1 and the surface layer 3.

FIG. 1C illustrates a charging roller having an intermediate layer 21 between the elastic layer 2 and the surface layer 3, and FIG. 1D illustrates a charging roller having the intermediate layer 21 and an intermediate layer 22 therebetween.

The charging roller of the present invention more preferably has elasticity because the charging roller is used in contact with an electrophotographic photosensitive member. It is recommended that the charging roller be formed of two or more layers by providing the elastic layer as illustrated in each of FIGS. 1B to 1D particularly when durability or the like is requested.

The conductive substrate and the elastic layer or layers to be sequentially laminated (such as the elastic layer and the surface layer illustrated in FIG. 1B) may be bonded to each other through an adhesive. In this case, the adhesive is preferably conductive. The adhesive can contain a known conducting agent so as to be conductive.

A binder for the adhesive is, for example, a thermosetting resin or a thermoplastic resin. A known resin such as a urethane-based resin, an acrylic resin, a polyester-based resin, a polyether-based resin, or an epoxy-based resin can be used.

One kind alone, or a combination of two or more kinds, appropriately selected from conducting agents to be described in detail later can be used as a conducting agent for imparting conductivity to the adhesive.

In ordinary cases, the charging roller of the present invention more preferably has an electrical resistance of $1\times10^{2}\Omega$ to $1\times10^{10}\Omega$ in a 23° C./50% RH environment in order that the photosensitive member may be satisfactorily charged.

Figure 4A:
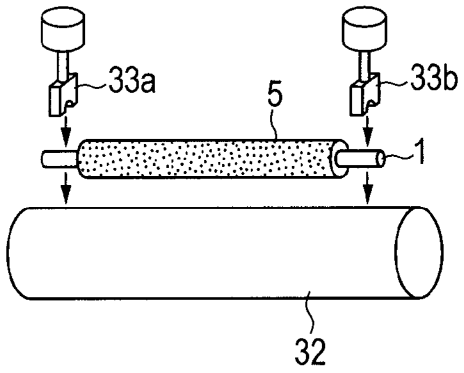
FIG. 4A illustrates a schematic view of an instrument to be used for measuring the electrical resistance of a charging roller of the present invention before the measurement.
Figure 4B:
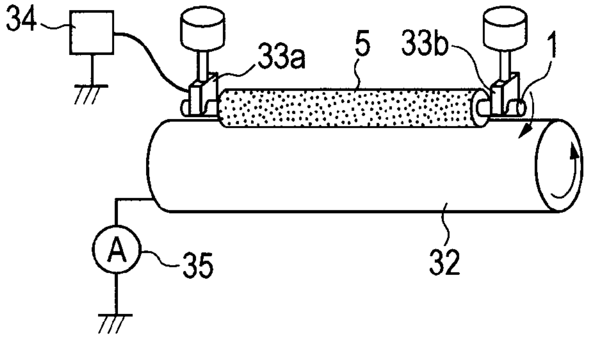
FIG. 4B illustrates a schematic view of the instrument to be used for measuring the electrical resistance of the charging roller of the present invention at the time of the measurement.

FIGS. 4A and 4B each illustrate a method of measuring the electrical resistance of the charging roller as an example. Both ends of the conductive substrate 1 are brought into abutment with a columnar metal 32 having the same curvature as that of the photosensitive member by loaded bearings 33*a* and 33*b* so as to be parallel to the metal. In this state, the columnar metal 32 is rotated with a motor (not shown), and then a DC voltage of −200 V is applied from a stabilized power supply 34 to a charging roller 5 abutting on the metal while the roller is rotated following the rotation of the metal. A current flowing at this time is measured with an ammeter 35, and then the resistance of the charging roller is calculated. In the present invention, the load applied to each bearing was set to 4.9 N, the diameter of the metal column was set to 30 mm, and the metal column was rotated at a circumferential speed of 45 mm/sec.

The charging roller of the present invention is preferably of such a shape that the charging roller is thickest at a central portion in its longitudinal direction and becomes thinner as the charging roller approaches each of both of its ends in the longitudinal direction, which is so called a crown shape, from the viewpoint of the uniformity of a longitudinal nip width with respect to the photosensitive member. A crown amount is preferably such that a difference between an outer diameter at the central portion and an outer diameter at a position distant from the central portion by 90 mm is 30 μm to 200 μm.

It is more preferred that the charging roller of the present invention have a ten-point average roughness Rzjis of its surface of 3 μm to 30 μm and a depression-protrusion average interval RSm of its surface of 15 μm to 150 μm. Setting the ten-point average surface roughness Rzjis and depression-protrusion average interval RSm of the charging roller within the ranges can additionally stabilize a state in which the charging roller and the electrophotographic photosensitive member are brought into contact with each other. The ranges are more preferred because the photosensitive member is thus uniformly charged with ease.

Methods of measuring the ten-point average roughness Rzjis of the surface and the depression-protrusion average interval RSm of the surface are described below.

Measurement is performed in conformity with a surface roughness specification by JIS B0601-2001 with a surface roughness-measuring machine "SE-3500" (trade name, manufactured by Kosaka Laboratory Ltd.). The Rzjis is the average of values measured at six sites of the charging member selected at random. In addition, the RSm is determined as described below. Six sites of the charging member are selected at random, and then the average of ten depression-protrusion intervals measured at each of the sites is defined as the RSm of the measurement site. The average of the measured values at the six sites is defined as the RSm of the charging member.

Particles having an average particle diameter of 1 μm to 30 μm are more preferably added to each layer to be described later, in particular, the surface layer in order that the ten-point average roughness and the depression-protrusion average interval may be controlled to fall within the ranges. Insulating particles can be given as examples of the particles.

(Graphite Particles)

The graphite particles to be incorporated into the surface layer in the present invention are a substance containing carbon atoms that form a layer structure with SP2 covalent bond. In addition, the graphite particles are preferably such particles that the half width of the peak intensity of a peak at 1,580 $cm^{-1}$ derived from graphite in a Raman spectrum is 80 $cm^{-1}$ or less, more preferably such particles that the half width is 60 $cm^{-1}$ or less. The half width represents a degree of crystallinity and the spread of a graphite plane on SP2 orbital, and is one indicator for the conductivity of the graphite particles. There is a tendency that a degree of graphitization becomes higher and the conductivity also becomes higher as the half width becomes smaller. Thus, such a state that a current preferentially flows in the surface layer through the graphite particles is established. Therefore, such an effect that discharge from the protruded portions derived from the graphite particles to the electrophotographic photosensitive member is preferentially performed can be expressed, which contributes to the improvement of a charging ability over a long time period.

The graphite particles preferably have an average particle diameter of 0.5 μm to 15 μm. Thus, the flow of the current in the surface layer can be controlled. In particular, suppressing effects on a spot-like image and a rough image can be expressed. It should be noted that the average particle diameter of the graphite particles is more preferably 1 μm to 8 μm.

The graphite particles more preferably have a longer diameter-to-shorter diameter ratio of 2 or less. Thus, the flow of the current in the surface layer can be controlled with additional ease. In addition, such an effect that releasability is imparted to the surface layer is enhanced, and hence the occurrence of, in particular, each of the spot-like image and the rough image can be suppressed with additional reliability.

It is more preferred that when the average particle diameter (μm) of the graphite particles is represented by A, graphite particles each having a particle diameter in the range of 0.5 A to 5 A account for 80% or more of all the graphite particles. The foregoing suggests that the particle size distribution of the graphite particles is more preferably sharp. Thus, the flow of the current in the surface layer can be controlled with additional ease. In addition, such effect that releasability is imparted to the surface layer is enhanced, and hence the occurrence of, in particular, the spot-like image can be suppressed with additional reliability.

The graphite particles more preferably have a spacing of a graphite (002) plane of 0.3361 nm to 0.3450 nm. Adopting the spacing means that the crystallization of the graphite particles is further progressing. Thus, the flow of the current in the surface layer can be controlled with additional ease. Simultaneously, such effect that releasability is imparted to the surface layer is enhanced. Therefore, the occurrence of each of the streak-like image, the spot-like image, and the rough image can be suppressed with additional reliability.

The occupancy of the graphite particles in the surface layer is preferably 1% to 50%, more preferably 2% to 30% in terms of a volume occupation ratio. Thus, the flow of the current in the surface layer can be controlled with additional ease. Simultaneously, such effect that releasability is imparted to the surface layer is enhanced. Therefore, the occurrence of each of the streak-like image, the spot-like image, and the rough image can be suppressed with additional reliability.

The graphite particles are mixed in an amount of preferably 0.5 part by mass to 50 parts by mass, more preferably 1 part by mass to 50 parts by mass, particularly preferably 2 parts by mass to 30 parts by mass with respect to 100 parts by mass of the binder resin. When the range is adopted, the volume occupation ratio can be controlled to fall within the more preferred range. Thus, the flow of the current in the surface layer can be controlled with additional ease. Simultaneously, such effect that releasability is imparted to the surface layer is enhanced. Therefore, the occurrence of each of the streak-like image, the spot-like image, and the rough image can be suppressed with additional reliability.

It is more preferred that 80% or more of the protruded portions derived from the graphite particles exist at an interval of 10 μm to 100 μm. Thus, the flow of the current in the surface layer can be controlled with additional ease. Simultaneously, such effect that releasability is imparted to the surface layer is enhanced. Therefore, the occurrence of each of the streak-like image, the spot-like image, and the rough image can be suppressed with additional reliability.

Other particles having an average particle diameter of about 2 μm to 30 μm are more preferably added to the surface layer in order that the interval at which the graphite particles exist may be controlled with additional ease. Electron conducting agents and insulating particles can be given as examples of the other particles.

Although graphite particles of any kind can be used as the graphite particles of the present invention as long as the graphite particles have the above characteristics, artificial graphite is more preferred from such a viewpoint that the above characteristics are easily controlled. Particles obtained by subjecting coke or the like to a graphitization treatment, particles obtained by subjecting bulk mesophase pitch to a graphitization treatment, particles obtained by subjecting mesocarbon microbeads to a graphitization treatment, particles obtained by subjecting a phenol resin to a graphitization treatment, and particles obtained by coating a phenol resin with a mesophase and by subjecting the resultant to a graphitization treatment can be given as examples of the artificial graphite. Hereinafter, the outline of a method of producing the graphite particles in the present invention is described.

Particles Obtained by Subjecting Coke or the Like to Graphitization Treatment

The particles are obtained by adding a binder such as pitch to a filler such as coke, molding the mixture, and baking the molded product. Residual oil in petroleum distillation, coke obtained by further baking raw coke, which is obtained by heating coal tar pitch at about 500° C., at 1,200° C. to 1,400° C., or the like can be used as the filler. Pitch obtained as a distillation residue of tar or the like can be used as the binder.

A method of obtaining the graphite particles with those raw materials involves: finely pulverizing the filler first; mixing the finely pulverized product with the binder; kneading the mixture under heat at about 150° C.; molding the kneaded product with a molding machine; subjecting the molded product to a heat treatment at 700° C. to 1,000° C. to impart heat stability to the product; and subjecting the resultant to a heat treatment at 2,600° C. to 3,000° C. Thus, desired graphite particles are obtained. At the time of each heat treatment, the molded product is preferably coated with coke for packing in order that its oxidation may be prevented.

Particles Obtained by Subjecting Bulk Mesophase Pitch to Graphitization Treatment The bulk mesophase pitch can be obtained by, for example, extracting β-resin from coal tar pitch or the like through solvent fractionation, and subjecting the β-resin to hydrogenation and a treatment for making the β-resin heavy. In addition, after the treatment for making the β-resin heavy, the following can be adopted. The resultant is finely pulverized, and then solvent soluble matter is removed with benzene, toluene, or the like. The bulk mesophase pitch preferably has a quinoline soluble matter content of 95 mass % or more. When bulk mesophase pitch having a quinoline soluble matter content of less than 95 mass % is used, the inside of each particle hardly undergoes liquid-phase carbonization but instead undergoes solid-phase carbonization, and hence the particles maintain crushed shapes. The above control is more preferably performed in order that the longer diameter-to-shorter diameter ratio may be reduced.

The graphite particles are obtained with the mesophase pitch by the following method. First, the bulk mesophase pitch is finely pulverized, and then the finely pulverized product is subjected to a heat treatment in the air at 200° C. to 350° C. so as to be lightly subjected to an oxidation treatment. As a result of the oxidation treatment, only the surfaces of the bulk mesophase pitch particles are made infusible, and melting and fusion at the time of the graphitization treatment as a next step are prevented. It is proper for the bulk mesophase pitch particles subjected to the oxidation treatment to have an oxygen content of 5 mass % to 15 mass %. It should be noted that when the oxygen content is less than 5 mass %, the fusion of the particles may become vigorous at the time of the heat treatment. In addition, when the oxygen content exceeds 15 mass %, even the insides of the particles are oxidized. Accordingly, the particles are graphitized while maintaining crushed shapes, and hence spherical particles are hardly obtained in some cases. Next, the bulk mesophase pitch particles subjected to the oxidation treatment as described above are subjected to a heat treatment under an inert atmosphere such as nitrogen and argon at 1,000° C. to 3,500° C. Thus, desired graphite particles are obtained.

Particles Obtained by Subjecting Mesocarbon Microbeads to Graphitization Treatment Available as a method of obtaining the mesocarbon microbeads is, for example, a method involving: subjecting a coal-based heavy oil or a petroleum-based heavy oil to a heat treatment at a temperature of 300° C. to 500° C.; subjecting the treated product to polycondensation to produce coarse mesocarbon microbeads; subjecting the reaction product to a treatment such as filtration, static sedimentation, and centrifugal separation to separate mesocarbon microbeads; washing the separated mesocarbon microbeads with a solvent such as benzene, toluene, and xylene; and drying the washed mesocarbon microbeads.

In order that the graphite particles may be obtained with the mesocarbon microbeads, first, the mesocarbon microbeads that have undergone the drying are preferably subjected to primary dispersion in a mechanical fashion with such a force that the mesocarbon microbeads are not broken. The foregoing intends to prevent the coalescence of the particles after the graphitization treatment and to obtain a uniform particle size. The mesocarbon microbeads that have undergone the primary dispersion are subjected to a primary heating treatment under an inert atmosphere at a temperature of 200° C. to 1,500° C. so as to be carbonized. The carbide that has undergone the primary heating treatment is also preferably subjected to secondary dispersion in a mechanical fashion with such a force that the carbide is not broken in order that the coalescence of the particles after the graphitization treatment may be prevented and a uniform particle size may be obtained. The carbide that has undergone the secondary dispersion treatment is subjected to a secondary heating treatment under an inert atmosphere at 1,000° C. to 3,500° C. Thus, desired graphite particles are obtained.

Particles Obtained by Subjecting Phenol Resin to Graphitization Treatment

Examples of the phenol resin as a precursor include resol-type phenol resins as condensates of phenol and aldehydes. The resol-type phenol resins are resins obtained by causing aromatic compounds each having a phenolic hydroxyl group and the aldehydes to react with each other in the presence of a catalyst, and curing the reaction products under heat. A method of obtaining the graphite particles with the phenol resin is, for example, a method involving baking the phenol resin under an inert gas atmosphere at 900° C. to 2,000° C. At this time, the flow rate of the inert gas is preferably 0.1 ml/min or more per 1 g of the phenol resin. Thus, volatile matter can be efficiently removed from the phenol resin. Alternatively, the baking may be performed at a pressure as low as 50 kPa or less. When the baking is performed at a pressure of 50 kPa or less, the volatile matter from the phenol resin can be efficiently removed from a reaction system.

Particles Obtained by Coating Phenol Resin with Mesophase and Subjecting Resultant to Graphitization Treatment The surface of the above phenol resin is coated with bulk mesophase pitch by a mechanochemical method. After that, the bulk mesophase pitch can be produced by the same method as the graphitization treatment.

(Formation of Surface Layer)

The surface layer can be formed by an application method such as electrostatic spray application and dipping application. Alternatively, the surface layer can be formed by bonding or coating a sheet- or tube-shaped layer formed so as to have a predetermined thickness in advance. Alternatively, a method involving curing a material in a mold to mold the material into a predetermined shape can be employed. Of those, the following is preferred. A coating material is applied by an application method so that a coating film may be formed.

When the layer is formed by the application method, a solvent to be used in the application liquid has only to be a solvent capable of dissolving the binder. Specific examples thereof include: alcohols such as methanol, ethanol, and isopropanol; ketones such as acetone, methyl ethyl ketone, and cyclohexanone; amides such as N,N-dimethylformamide and N,N-dimethylacetamide; sulfoxides such as dimethyl sulfoxide; ethers such as tetrahydrofuran, dioxane, and ethylene glycol monomethyl ether; esters such as methyl acetate and ethyl acetate; and aromatic compounds such as xylene, ligroin, chlorobenzene, and dichlorobenzene.

Known solution dispersion means such as a ball mill, a sand mill, a paint shaker, a dyno-mill, and a pearl mill can be used as a method of dispersing the binder, the conducting agent, the insulating particles, and the like in the application liquid.

(Elastic Layer)

The rubbers and resins given in the foregoing as examples of the binder component of the surface layer can each be used as a material used for the elastic layer.

Preferred examples thereof include the following: an epichlorohydrin rubber, an acrylonitrile-butadiene copolymer rubber (NBR), a chloroprene rubber, a urethane rubber, a silicone rubber, and thermoplastic elastomers such as a styrene/butadiene/styrene block copolymer (SBS) and a styrene/ethylenebutylene/styrene block copolymer (SEBS).

Of those, a polar rubber is more preferably used because resistance adjustment is easily performed. The epichlorohydrin rubber and the NBR can be given as examples thereof. Those rubbers each have such an advantage that the control of the resistance and hardness of the elastic layer is performed with additional ease.

The epichlorohydrin rubber can exert good conductivity even when the addition amount of the conducting agent is small because the polymer itself has conductivity in a middle resistance region. In addition, the rubber can reduce a variation in electrical resistance with a position, and is hence suitably used as a polymer elastic body. Examples of the epichlorohydrin rubber include the following polymers: an epichlorohydrin homopolymer, an epichlorohydrin-ethylene oxide copolymer, an epichlorohydrin-allyl glycidyl ether copolymer, and an epichlorohydrin-ethylene oxide-allyl glycidyl ether terpolymer. Of those, an epichlorohydrin-ethylene oxide-allyl glycidyl ether terpolymer is particularly suitably used because the terpolymer shows stable conductivity in the middle resistance region. The conductivity and processability of the epichlorohydrin-ethylene oxide-allyl glycidyl ether terpolymer can be controlled by arbitrarily adjusting its degree of polymerization or composition ratio.

The elastic layer, which may be formed of the epichlorohydrin rubber alone, may contain any other general rubber as required while using the epichlorohydrin rubber as a main component. Examples of the other general rubber include the following rubbers. There are given, for example, an ethylene/propylene rubber (EPM), an ethylene-propylene-diene copolymer (EPDM), an acrylonitrile-butadiene copolymer rubber (NBR), a chloroprene rubber, a natural rubber, an isoprene rubber, a butadiene rubber, a styrene-butadiene rubber, a urethane rubber, and a silicone rubber. The elastic layer may also contain a thermoplastic elastomer such as a styrene/butadiene/styrene block copolymer (SBS) and a styrene/ethylenebutylene/styrene block copolymer (SEBS). When the general rubber is incorporated, its content is more preferably 1 to 50 parts by mass with respect to 100 parts by mass of the materials for the elastic layer.

The elastic layer preferably has a volume resistivity measured under a 23° C./50% RH environment of $10^2$ Ω·cm to $10^{10}$ Ω·cm. In addition, a conducting agent such as carbon black, a conductive metal oxide, an alkali metal salt, and an ammonium salt can be appropriately added for adjusting the volume resistivity. When a polar rubber is used as a material for the elastic layer, the ammonium salt is particularly preferably used.

The insulating particles listed in the foregoing may be incorporated into the elastic layer.

In addition, an additive such as a plasticizing oil and a plasticizer may be added to the elastic layer for adjusting its hardness or the like. The plasticizer or the like is blended in an amount of preferably 1 part by mass to 30 parts by mass, more preferably 3 parts by mass to 20 parts by mass with respect to 100 parts by mass of the materials for the elastic layer. A plasticizer of a polymer type is more preferably used as the plasticizer. The polymer plasticizer has a molecular weight of preferably 2,000 or more, more preferably 4,000 or more.

Further, materials for imparting various functions may each be appropriately incorporated into the elastic layer. An age resistor and a filler can be given as examples of those materials.

The hardness of the elastic layer is preferably 70° or less, more preferably 60° or less in terms of microhardness (Model MD-1). When the microhardness (Model MD-1) exceeds 70°, a nip width between the charging member and the photosensitive member becomes small. Accordingly, an abutting force between the charging member and the photosensitive member converges on a narrow area, and hence an abutting pressure enlarges in some cases.

It should be noted that the term "microhardness (Model MD-1)" refers to the hardness of the charging member measured with an ASKER micro-rubber hardness meter Model MD-1 (trade name, manufactured by KOBUNSHI KEIKI CO., LTD.). Specifically, the hardness is a value of the charging member, which has been left to stand in a normal-temperature, normal-humidity (23° C./55% RH) environment for 12 hours or more, measured with the hardness meter according to a 10-N peak hold mode.

The volume resistivity of the elastic layer can be measured as described below. All materials to be used in the elastic layer are molded into a sheet having a thickness of 1 mm, and then a metal is deposited from the vapor onto each of both surfaces of the sheet so that an electrode and a guard electrode may be formed. A volume resistivity measurement sample thus obtained is subjected to measurement by the same method as the method of measuring the volume resistivity of the surface layer.

The elastic layer may be subjected to a surface treatment. A surface processing treatment with UV or an electron beam, and a surface modification treatment involving causing a compound or the like to adhere to the surface and/or impregnating the surface with the compound or the like can be given as examples of the surface treatment.

The elastic layer can be formed by bonding a sheet- or tube-shaped layer formed so as to have a predetermined thickness in advance to the conductive substrate, or by coating the substrate with the layer. Alternatively, the elastic layer can be produced by integrally extruding the conductive substrate and the materials for the elastic layer with an extruder provided with a crosshead.

A known method such as mixing with a ribbon blender, a Nauta mixer, a Henschel mixer, a Super mixer, a Banbury mixer, a pressure kneader, or the like can be employed as a method of dispersing the conducting agent, the insulating particles, the filler, and the like in the materials for the elastic layer.

In addition, a charging member whose surface layer has the following construction can be given as another embodiment of the charging member according to the present invention. That is, the surface layer contains the compound having the unit represented by the formula (1) in a binder resin, and at least the surface of the surface layer forms a continuous phase formed of the binder resin and a discontinuous phase formed of the compound.

When the compound having the unit represented by the formula (1) forms the discontinuous phase with respect to the binder resin in at least the surface of the surface layer, the discontinuous phase formed of the compound contributes to the impartment of proper releasability to the surface layer.

With such effect, the adhesion of a substance such as toner to the charging member is suppressed, and hence the occurrence of an image resulting from the contamination of the charging member can be suppressed. Further, a layer containing a compound having a bulky structure having a multi-branched structure exists in the surface of the surface layer. Thus, the sliding property of the surface is improved. Accordingly, the substance such as toner does not adhere to the charging member, and the adhesion of a substance such as an external additive remaining on the photosensitive member to the photosensitive member is suppressed. Thus, the occurrence of an image resulting from fusion to the photosensitive member can be suppressed.

A method of causing the compound having the unit represented by the formula (1) to form the discontinuous phase with respect to the binder resin in the surface of the surface layer is, for example, application by an air spray method. A known spray gun can be used as a spray gun to be used in the application by the air spray method, and for example, a needle-type air spray gun or a spray gun free of any needle can be used. Of those, the application is preferably performed with the spray gun free of any needle.

When the discontinuous phase of the compound is formed by the air spray method, a solvent to be used in an application liquid can be exemplified by: aliphatic hydrocarbons such as hexane, octane, decane, and cyclohexane; aromatic hydrocarbons such as benzene, toluene, and xylene; ethers such as diethyl ether, dibutyl ether, tetrahydrofuran, and dioxane; ketones such as acetone, methyl ethyl ketone, methyl isobutyl ketone, and diisobutyl ketone; esters such as methyl acetate, ethyl acetate, butyl acetate, and isobutyl acetate; alcohols such as methanol, ethanol, isopropyl alcohol, and butanol; and organosiloxane oligomers such as octamethylcyclotetrasiloxane, decamethylcyclopentasiloxane, hexamethyldisiloxane, and octamethyltrisiloxane.

The discontinuous phase of the compound preferably has a maximum diameter of 0.1 μm to 3.0 μm. Thus, in particular, such effect as described in the forgoing that the discontinuous phase contributes to the impartment of the proper releasability is enhanced. Further, such an effect that the discontinuous phase contributes to the suppression of the fusion of the substance such as an external additive to the photosensitive member is enhanced.

In addition, the area fraction of the discontinuous phase of the compound with respect to the surface of the surface layer is preferably 5% to 50%. Thus, in particular, such effect as described in the forgoing that the discontinuous phase contributes to the impartment of the proper releasability is enhanced. Further, such effect that the discontinuous phase contributes to the suppression of the fusion of the substance such as an external additive to the photosensitive member is enhanced.

Further, still another embodiment of the charging member according to the present invention is, for example, a charging member provided with a surface layer containing a binder resin and resin particles each formed of the compound having the unit represented by the formula (1), and having formed in its surface protruded portions derived from the resin particles.

In an electrophotographic apparatus according to the contact charging mode, a charging roller and an electrophotographic photosensitive member form a nip. In addition, in the nip, the protruded portions formed in the surface of the charging roller deform with an abutting pressure. After that, the deformed protruded portions restore their original shapes by passing the nip in association with the rotation of the charging roller. The deformation, and restoration of the original shapes, of the protruded portions in the surface of the charging roller are repeatedly performed by the rotation of the charging roller.

Upon formation of the protruded portions in the surface of the charging roller, soft resin particles have been conventionally used as resin particles to be added to the surface layer lest the resin particles should flaw the electrophotographic photosensitive member owing to abutment with the electrophotographic photosensitive member. Accordingly, the protruded portions tend to deform remarkably in the nip. Accordingly, such a situation that toner or the like is additionally liable to fix on the surface of the charging roller is established.

On the other hand, the compound having the unit represented by the formula (1) has a specific structure that is extremely bulky. Accordingly, the resin particles each containing the compound having the unit represented by the formula (1) have high restoring properties against deformation despite being soft. Further, each of the resin particles and the binder around the resin particle strongly interact with each other at the surface of the resin particle. Accordingly, even when the deformation and restoration of the protruded portions are repeatedly performed, displacement from the surrounding binder at the surface of the resin particle is suppressed, and hence a suppressing effect on resistance unevenness in the vicinity of the protruded portions is expressed. As a result, a hazy image hardly occurs in an electrophotographic image formed with the charging roller according to this embodiment.

<Method of Producing Resin Particles Each Formed of Compound Having Unit Represented by Formula (1)>

A known method can be employed as a method of producing the resin particles in the present invention, and the production method is not particularly limited. Resin particles each having a target particle diameter can be obtained by: cooling, drying, and solidifying the compound having the unit represented by the formula (1); pulverizing the solidified product with a pulverizer such as a crusher; and classifying the pulverized product.

The resin particles preferably have an average particle diameter of 1 μm to 30 μm. The resin particles having an average particle diameter of 1 μm or more can additionally stabilize discharge at the nip portion by virtue of flexibility and restoring force against deformation resulting from the bulky structure. In addition, the resin particles having an average particle diameter of 30 μm or less can suppress a reduction in restoring force to sufficiently suppress a set image. Further, when the average particle diameter of the resin particles is larger than 30 μm, the resin particles may be detached from the outermost surface layer owing to long-term, repeated use. Thus, a spot image due to a charging failure may occur.

A measured value obtained by subjecting powdery resin particles to measurement with a measuring machine such as a Coulter Counter Multisizer can be adopted as the average particle diameter of the resin particles. For example, a small amount of a surfactant is added to 100 ml to 150 ml of an electrolyte solution, and then the measurement sample is added to the mixture. The electrolyte solution in which the measurement sample has been suspended is subjected to a dispersion treatment with an ultrasonic dispersing unit, and is then subjected to the measurement with the Coulter Counter Multisizer. Thus, the mass-average particle diameter of the measurement sample is determined by computer processing.

In addition, even the particle diameters of the resin particles already in states of being incorporated into the surface layer can be measured by such a method as described below. First, a section of the surface layer is observed with a TEM, and then the projected area of a resin particle is determined from sectional image data on the resin particle. Next, the diameter of a circle having the same area as the area is determined and defined as the particle diameter of the resin particle. The diameter of a circle having the same area as the projected area of another resin particle is also determined from the area in the same manner as in the foregoing. The arithmetic average of the diameters of those circles thus obtained is defined as the average particle diameter of the resin particles.

For example, measurement sites are cut out of an arbitrary point of the surface layer every 20 nm over 500 μm with focused ion beams "FB-2000C" (manufactured by Hitachi, Ltd.), and then their sectional images are photographed. Then, images obtained by photographing the same resin particle are combined so that a stereographic image may be calculated. The projected area of the resin particle is determined from the stereographic image of the resin particle thus calculated, and the diameter of a circle having the same area as the area is defined as the particle diameter of the resin particle. The diameter of a circle having the same area as the projected area of another resin particle is similarly determined from the area. Such operation is performed on 20 resin particles in the measurement sites. Then, similar measurement is performed on 10 points along the longitudinal direction of the charging member. The arithmetic average of a total of 200 values thus obtained is defined as the average particle diameter of the resin particles.

The hardness of the resin particles is preferably $0.1\times10^{-4}$ N to $8\times10^{-4}$ N. Further, the hardness is particularly preferably $1\times10^{-4}$ N to $5\times10^{-1}$ N. When the hardness of the resin particles is set to $1\times10^{-4}$ N or more, the restoring force of each of the resin particles is maintained. Further, excessive deformation of the protruded portions in the surface of the charging member is suppressed, and hence displacement between each resin particle and the binder can be suppressed. In addition, when the hardness of the resin particles is set to $5\times10^{-4}$ N or less, the abutment between the charging member and the body to be charged is additionally stabilized, and hence the discharge at the nip portion can be stabilized.

Here, the hardness of the resin particles can be measured with a hardness meter such as a NanoIndenter (manufactured by MTS). A measurement sample is cut out of the surface layer with a razor so that a section of a resin particle may be cut. Next, the resin particle is observed with a microscope, and then its hardness is measured.

The content of the resin particles is preferably 0.5 part by mass to 80 parts by mass with respect to 100 parts by mass of the binder. When the content is excessively small, the addition of the resin particles cannot exert a stabilizing effect on charging in some cases. When the content is excessively large, a long time is needed to control the viscosity of the application liquid for the surface layer.

The surface layer may be subjected to a surface treatment. A surface processing treatment with UV or an electron beam, and a surface modification treatment involving causing a compound to adhere to the surface and/or impregnating the surface with the compound can be given as examples of the surface treatment.

(Formation of Surface Layer)

The surface layer can be formed by an application method such as electrostatic spray application and dipping application. Alternatively, the surface layer can be formed by bonding or coating a sheet- or tube-shaped layer formed so as to have a predetermined thickness in advance. Alternatively, a method involving curing a material in a mold to mold the material into a predetermined shape can be employed. Of those, the following is preferred. An application liquid is applied by an application method so that a coating film may be formed.

When the layer is formed by the application method, a solvent to be used in the application liquid has only to be a solvent capable of dissolving the binder resin.

A method of forming the protruded portions derived from the resin particles of the present invention in the surface layer is preferably to apply a surface layer raw material formed of an application liquid containing the resin particles by dipping, more preferably to incorporate resin particles having an average particle diameter equal to or more than a quarter of the thickness of the surface layer.

The surface layer has a thickness of preferably 0.1 μm to 100 μm, more preferably 1 μm to 50 μm. In addition, when the protruded portions derived from the resin particles of the present invention are formed, the thickness of the surface layer is preferably 2 μm to 50 μm, more preferably 5 μm to 30 μm. Setting the thickness of the surface layer within the range facilitates the formation of the protruded portions derived from the resin particles of the present invention.

It should be noted that the thickness of the surface layer can be measured by cutting out a section of the charging roller at a position illustrated in each of FIGS. 5A and 5B with a keen cutting tool, and observing the section with an optical microscope or an electron microscope.

(Intermediate Layer)

One or more intermediate layers may be provided between the elastic layer and the surface layer. Each intermediate layer more preferably has a volume resistivity of $10^2$ Ω·cm to $10^{16}$ Ω·cm. A volume resistivity within the range does not impair charging performance, and is hence advantageous for the suppression of a phenomenon in which in the case where a pinhole occurs in the photosensitive member, an excessive current flows through the pinhole to cause the drop of an applied voltage. The conducting agent, the insulating particles, and the like can be used for adjusting the volume resistivity of the intermediate layer.

Any material listed for the elastic layer as well as various substances to be incorporated into the surface layer can be appropriately incorporated into the intermediate layer of the present invention. In addition, as in the elastic layer, the intermediate layer may be subjected to a surface processing treatment with UV or an electron beam, or a surface modification treatment involving causing a compound or the like to adhere to the surface and/or impregnating the surface with the compound or the like.

<Electrophotographic Apparatus>

Figure 6:
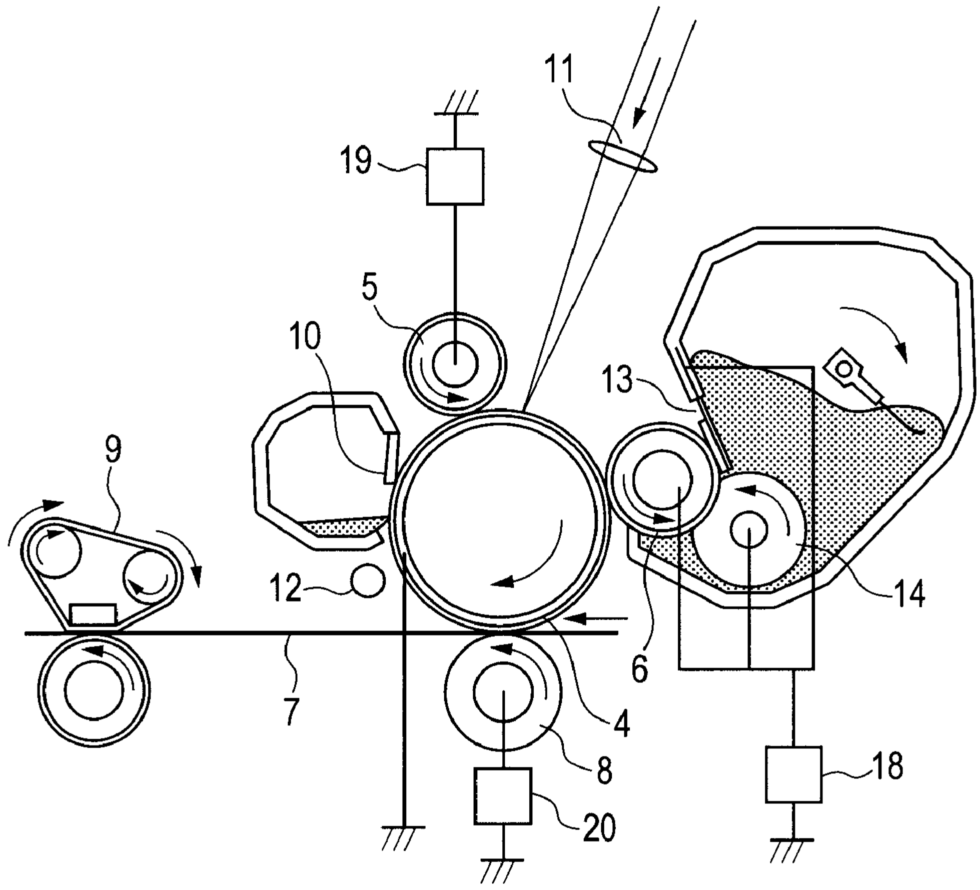
FIG. 6 illustrates a schematic view illustrating a section of one embodiment of an electrophotographic apparatus of the present invention.

FIG. 6 illustrates an example of the schematic construction of an electrophotographic apparatus provided with the charging member of the present invention.

The electrophotographic apparatus is formed of, for example, a photosensitive member, a charging apparatus for charging the photosensitive member, a latent image-forming apparatus for performing exposure, a developing apparatus for developing a latent image into a toner image, a transferring apparatus for transferring the toner image onto a transfer material, a cleaning apparatus for recovering transfer residual toner on the photosensitive member, and a fixing apparatus for fixing the toner image.

An electrophotographic photosensitive member 4 is of a rotating drum type having a photosensitive layer on a conductive substrate. The electrophotographic photosensitive member 4 is rotationally driven in the direction indicated by an arrow at a predetermined circumferential speed (process speed).

The charging apparatus has a contact-type charging member (charging roller) 5 placed so as to be in contact with the electrophotographic photosensitive member 4 by being brought into abutment with the member at a predetermined pressing force. The charging roller 5 is of a dependent-rotating type that rotates following the rotation of the photosensitive member, and the roller charges the photosensitive member to a predetermined potential by applying a predetermined DC voltage from a power supply 19 for charging.

An exposing apparatus such as a laser beam scanner is used as a latent image-forming apparatus 11 for forming an electrostatic latent image on the electrophotographic photosensitive member 4. When the uniformly charged photosensitive member is subjected to exposure corresponding to image information, an electrostatic latent image is formed.

The developing apparatus has a developing roller 6 placed so as to be close to, or in contact with, the electrophotographic photosensitive member 4. The electrostatic latent image is visualized and developed into a toner image with toner, which has been subjected to an electrostatic treatment so as to have the same polarity as the charged polarity of the photosensitive member, by reversal development.

The transferring apparatus has a contact-type transfer roller 8. The apparatus transfers the toner image from the photosensitive member onto a transfer material 7 such as plain paper (the transfer material is conveyed by a sheet-feeding system having a conveying member).

The cleaning apparatus has a blade-type cleaning member 10 and a recovery container, and mechanically scrapes transfer residual toner remaining on the photosensitive member after the transfer to recover the toner.

Here, adopting a simultaneous-with-development cleaning mode according to which the transfer residual toner is recovered in the developing apparatus can eliminate the cleaning apparatus.

A fixing apparatus 9 is formed of a heated roll or the like, and fixes the transferred toner image onto the transfer material 7 and discharges the resultant to the outside of the apparatus. It should be noted that in FIG. 6, reference numeral 12 represents a pre-charging exposing apparatus, reference numeral 13 represents an elastic regulating blade, reference numeral 14 represents a toner-supplying roller, reference numerals 18 and 20 each represent a power supply, and reference numeral 30 represents a toner seal.

<Process Cartridge>

A process cartridge (FIG. 7) obtained by integrating, for example, a photosensitive member, a charging apparatus, a developing apparatus, and a cleaning apparatus, and designed so as to be detachably mountable to an electrophotographic apparatus can also be used.

That is, the process cartridge is as described below. A charging member is integrated with at least a body to be charged, the process cartridge is detachably mountable to the main body of the electrophotographic, apparatus, and the charging member is the above-described charging member.

In addition, an electrophotographic apparatus has at least a process cartridge, an exposing apparatus, and a developing apparatus, and the process cartridge is the above-described process cartridge.

It should be noted that the electrophotographic apparatus preferably charges the photosensitive member (body to be charged) by applying only a DC voltage to the charging member.

EXAMPLES

Hereinafter, the present invention is described in more detail by way of specific examples. However, the technical scope of the present invention is not limited to these examples.

Example A

Hereinafter, an example is specifically described by letting n represent the number of units each represented by the formula (1) in a compound having a unit represented by the formula (1) and letting m represent the number of units each represented by the formula (4) therein.

Production of Compound Having Unit Represented by Formula (1)

Production Example A-1

300 Parts by mass of isopropyl alcohol as a solvent were charged into a 1-L glass flask provided with a stirring machine, a condenser, and a temperature gauge. Under stirring, a mixture of 95 parts by mass of a compound represented by the following average molecular formula (1A), 78.2 parts by mass of butyl acrylate, 132 parts by mass of methyl methacrylate, and 0.3 part by mass of a radical polymerization initiator (α,α'-azobisisobutyronitrile) was dropped to the flask at 80° C. over 1 hour while a nitrogen gas was flowed. Further, a polymerization reaction was performed at 80° C. for 6 hours. After part of the isopropyl alcohol solution had been removed under reduced pressure, the remaining solution was charged into a large amount of methanol, and then the mixture was stirred. After that, the mixture was left at rest. Thus, a precipitate was obtained. The precipitate was dried under reduced pressure. Thus, a compound was obtained.

The resultant compound was analyzed by $^{29}$Si-NMR, $^{13}$C-NMR, and FT-IR. As a result, the compound had units represented by a formula (1-1) and a formula (1-2) as well as the following formula (1A-1) as a unit represented by the formula (1). In addition, the contents of the unit represented by the formula (1A-1), the unit represented by the formula (1-1), and the unit represented by the formula (1-2) with respect to the entirety of the compound were 3.5%, 66%, and 30.5%, respectively, and n and m represented 7 and 193, respectively. The compound had a weight-average molecular weight in terms of polystyrene (hereinafter, abbreviated as "PS") by gel permeation chromatography (hereinafter, abbreviated as "GPC") of about 30,000. Table 2 shows the results.

(1A)

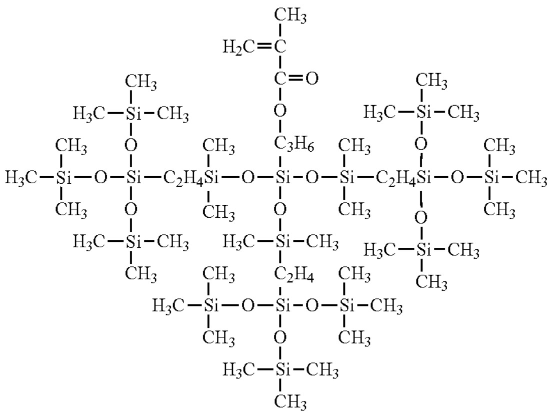

(1A-1)

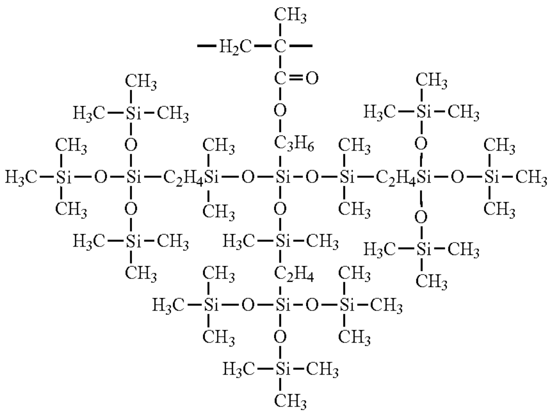

(1-1)

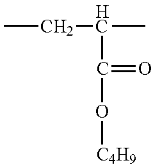

(1-2)

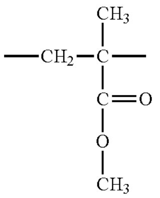

(1-3)

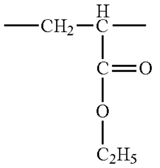

(1-4)

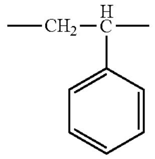

Production Examples A-2 to A-5, A-7, A-8, A-11, A-12, and A-16 to A-21

Compounds were each produced in the same manner as in Production Example A-1 except that the kind of the solvent, the mixture to be dropped, and the polymerization reaction time were changed as shown in Table 1. The resultant compounds were each analyzed in the same manner as in Production Example A-1. Table 2 shows the results.

Production Examples A-6 and A-13 to A-15

Compounds were each produced in the same manner as in Production Example A-1 except the following. The kind of the solvent, the mixture to be dropped, and the polymerization reaction time were changed as shown in Table 1. In addition, after the polymerization reaction, the remaining solution was dried at 150° C. and a reduced pressure of 10 mmHg without being charged into methanol so that the compound was produced. The resultant compounds were each analyzed in the same manner as in Production Example A-1. Table 2 shows the results.

Production Examples A-9 and A-10

Compounds were each produced in the same manner as in Production Example A-1 except the following. The kind of the solvent, the mixture to be dropped, and the polymerization reaction time were changed as shown in Table 1. In addition, the mixture to be dropped was produced as described below. First, compounds except the polymerization initiator were mixed, and then the mixture was stirred for 6 hours. After that, the polymerization initiator was added in an amount shown in the unit "part(s) by mass" in Table 1 to the mixed solution so that the mixture to be dropped was obtained. The resultant compounds were each analyzed in the same manner as in Production Example A-1. Table 2 shows the results. It should be noted that the terms "IPA," "EtOH," and "polymerization initiator" shown in Table 1 mean isopropyl alcohol, ethanol, and α,α'-azobisisobutyronitrile, respectively.

TABLE 1

| | | | Mixture to be dropped | | | | | | | | | |
|---|---|---|---|---|---|---|---|---|---|---|---|---|
| | | | Compound having unit represented by formula (1) | | Butyl | Methyl | Ethyl | | Polymeri-zation | | | Polymeri-zation |
| | Reaction solvent | | Average | | acrylate | methacrylate | acrylate | Styrene | initiator | Solvent | | reaction |
| Production Example A | Kind | Part(s) by mass | molecular formula | Part(s) by mass | Part(s) by mass | Part(s) by mass | Part(s) by mass | Part(s) by mass | Part(s) by mass | Kind | Part(s) by mass | time |
| Production Example 1 | IPA | 300 | (1A) | 95 | 78.2 | 132 | — | — | 0.3 | — | — | 6 h |
| Production Example 2 | IPA | 300 | (1A) | 135 | — | 90 | 90 | — | 0.3 | — | — | 6 h |
| Production Example 3 | EtOH | 300 | (1A) | 125 | 11 | 10 | — | — | 0.3 | EtOH | 50 | 10 h |
| Production Example 4 | EtOH | 300 | (1A) | 120 | — | — | — | 5 | 0.3 | — | — | 100 h |
| Production Example 5 | EtOH | 300 | (1B) | 133 | — | — | — | 2.2 | 0.3 | EtOH | 100 | 0.5 h |
| Production Example 6 | EtOH | 300 | (1C) | 125 | — | 5 | — | — | 0.1 | EtOH | 100 | 1 min |
| Production Example 7 | EtOH | 300 | (1D) | 33 | — | — | — | — | 0.3 | — | — | 10 h |
| Production Example 8 | EtOH | 300 | (1E) | 131 | — | — | — | 43 | 0.3 | EtOH | 100 | 100 h |
| Production Example 9 | EtOH | 300 | (1F) | 200 | — | 50 | — | — | 0.5 | IPA<br>EtOH | 50<br>50 | 100 h |
| Production Example 10 | EtOH | 300 | (1G) | 201 | — | — | — | 20 | 1 | Acetone<br>EtOH<br>Toluene | 50<br>50<br>50 | 100 h |
| Production Example 11 | IPA | 300 | (1H) | 75 | — | 120 | — | 100 | 0.3 | — | — | 6 h |
| Production Example 12 | EtOH | 300 | (1A) | 120 | — | — | — | 2 | 0.3 | EtOH | 100 | 120 h |
| Production Example 13 | EtOH | 300 | (1C) | 95 | — | 103 | — | — | 0.1 | EtOH | 100 | 1 min |
| Production Example 14 | IPA | 300 | (1A) | 120 | 5 | 2 | — | — | 0.1 | — | — | 10 min |
| Production Example 15 | IPA | 300 | (1A) | 90 | 10 | 20 | — | — | 0.1 | — | — | 10 min |

TABLE 1-continued

| Production Example A | Reaction solvent Kind | Reaction solvent Part(s) by mass | Mixture to be dropped: Compound having unit represented by formula (1) Average molecular formula | Compound having unit represented by formula (1) Part(s) by mass | Butyl acrylate Part(s) by mass | Methyl methacrylate Part(s) by mass | Ethyl acrylate Part(s) by mass | Styrene Part(s) by mass | Polymerization initiator Part(s) by mass | Solvent Kind | Solvent Part(s) by mass | Polymerization reaction time |
|---|---|---|---|---|---|---|---|---|---|---|---|---|
| Production Example 16 | EtOH | 300 | (1B) | 100 | — | — | — | 7 | 0.3 | EtOH | 100 | 24 h |
| Production Example 17 | EtOH | 300 | (1B) | 100 | — | — | — | 15 | 0.3 | EtOH | 100 | 48 h |
| Production Example 18 | IPA | 300 | (1J) | 95 | 78.2 | 132 | — | — | 0.3 | — | — | 6 h |
| Production Example 19 | IPA | 300 | (1J) | 120 | 20 | 20 | — | — | 0.3 | — | — | 6 h |
| Production Example 20 | IPA | 300 | (1K) | 120 | 100 | 100 | — | — | 0.3 | — | — | 6 h |
| Production Example 21 | IPA | 300 | (1H) | 30 | — | 100 | — | 120 | 0.3 | — | — | 6 h |

IPA: isopropyl alcohol,

EtOH: ethanol, polymerization initiator: α,α'-azobisisobutyronitrile

TABLE 2

| Production Example A | Unit represented by formula (1) Average molecular formula | Percentage content | Any other unit (Percentage content) (1-1) | (1-2) | (1-3) | (1-4) | n | m | Weight-average molecular weight in terms of PS |
|---|---|---|---|---|---|---|---|---|---|
| 1 | (1A-1) | 3.5 | 66.0 | 30.5 | — | — | 7 | 193 | 30,000 |
| 2 | (1A-1) | 5.2 | — | 47.4 | 47.4 | — | 7 | 126 | 20,000 |
| 3 | (1A-1) | 33.0 | 30.0 | 37.0 | — | — | 10 | 20 | 15,000 |
| 4 | (1A-1) | 65.0 | — | — | — | 35.0 | 74 | 40 | 100,000 |
| 5 | (1B-1) | 87.0 | — | — | — | 13.0 | 7 | 1 | 50,000 |
| 6 | (1C-1) | 75.0 | — | 25.0 | — | — | 3 | 1 | 2,500 |
| 7 | (1D-1) | 100.0 | — | — | — | — | 4 | — | 3,300 |
| 8 | (1E-1) | 9.2 | — | — | — | 90.8 | 25 | 248 | 100,000 |
| 9 | (1F-1) | 4.4 | — | 95.6 | — | — | 65 | 1,400 | 700,000 |
| 10 | (1G-1) | 9.0 | — | — | — | 91.0 | 134 | 1,326 | 1,800,000 |
| 11 | (1H-1) | 2.0 | — | 54.0 | — | 44.0 | 6 | 292 | 40,000 |
| 12 | (1A-1) | 82.0 | — | — | — | 18.0 | 147 | 32 | 200,000 |
| 13 | (1C-1) | 10.0 | — | 90.0 | — | — | 2 | 18 | 3,500 |
| 14 | (1A-1) | 62.0 | 25.5 | 12.5 | — | — | 5 | 3 | 7,000 |
| 15 | (1A-1) | 18.8 | 25.2 | 56.0 | — | — | 3 | 13 | 5,500 |
| 16 | (1B-1) | 61.3 | — | — | — | 387.0 | 906 | 572 | 900,000 |
| 17 | (1B-1) | 42.5 | — | — | — | 57.5 | 1,386 | 1,875 | 1,500,000 |
| 18 | (1J-1) | 10.4 | 28.4 | 61.2 | — | — | 20 | 174 | 27,000 |
| 19 | (1J-1) | 57.0 | 19.0 | 24.0 | — | — | 142 | 107 | 72,000 |
| 20 | (1K-1) | 3.6 | 42.3 | 54.1 | — | — | 40 | 1,069 | 200,000 |
| 21 | (1H-1) | 0.8 | — | 55.2 | — | 44 | 5 | 604 | 34,000 |

Structures represented by the formulae (1B) to (1H), (1J), and (1K) described in the item "average molecular formula" of the compound having the unit represented by the formula (1) in Table 1 are shown below. Structures represented by the formulae (1B-1) to (1H-1), (1J-1), and (1K-1) described in the item "average molecular formula" of the compound having the unit represented by the formula (1) in Table 2 are also shown below.

(1B)
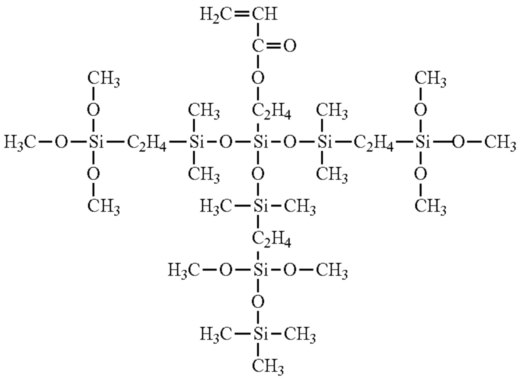
(1B-1)
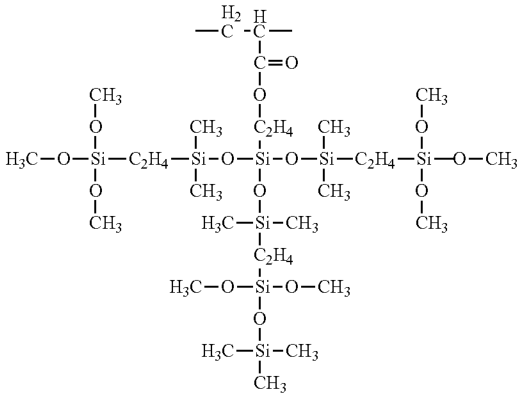
(1C)
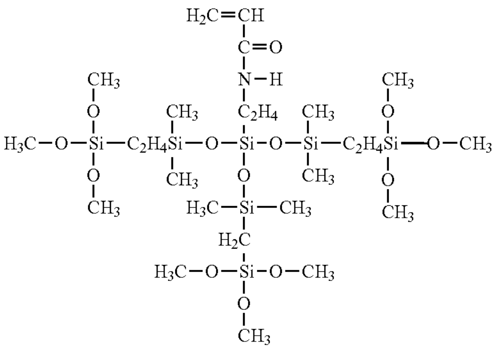
(1C-1)
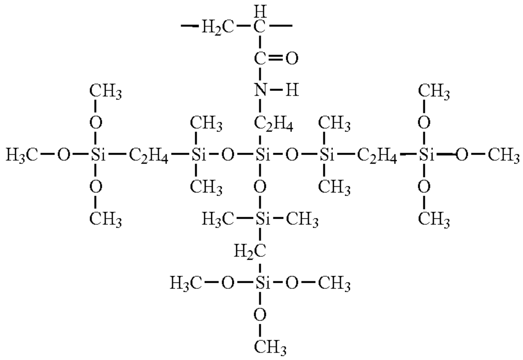
(1D)
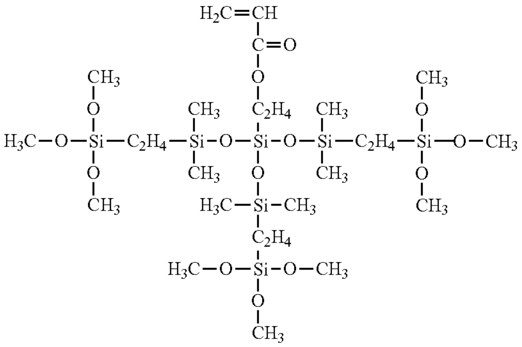
(1D-1)
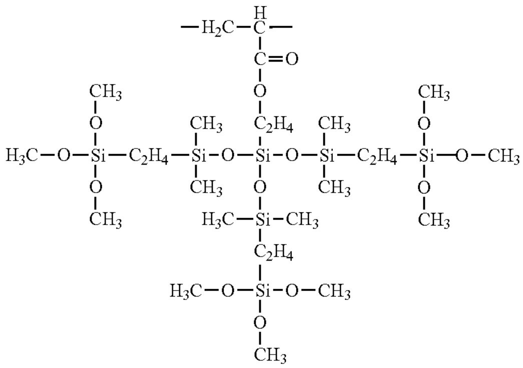
(1E)
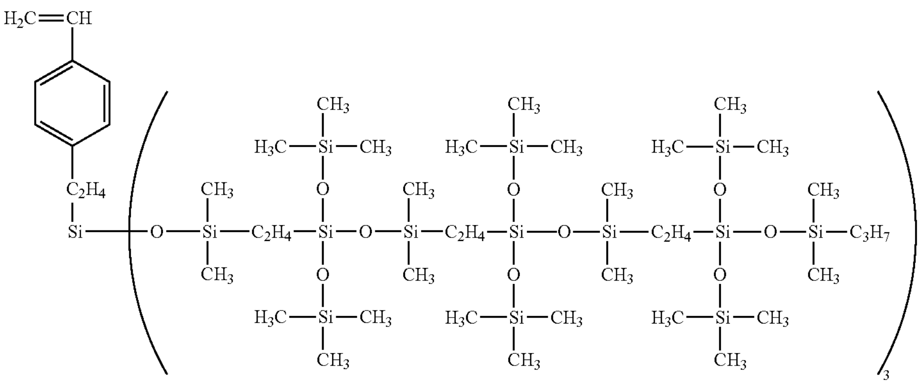

-continued
(1E-1)
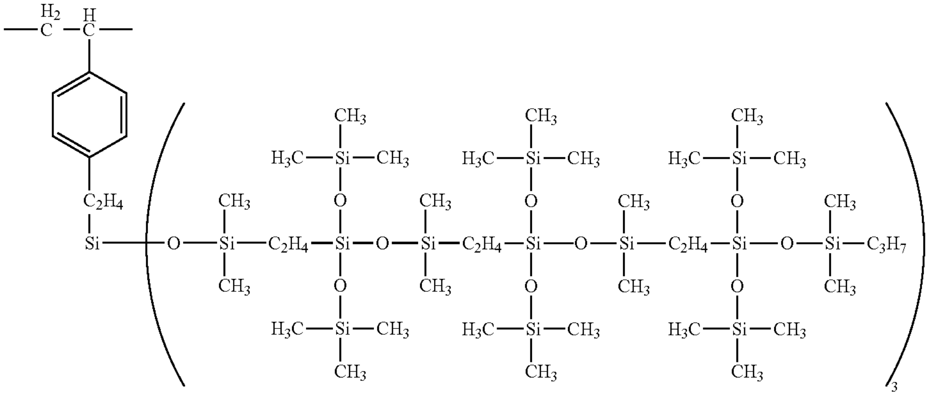
(1F)
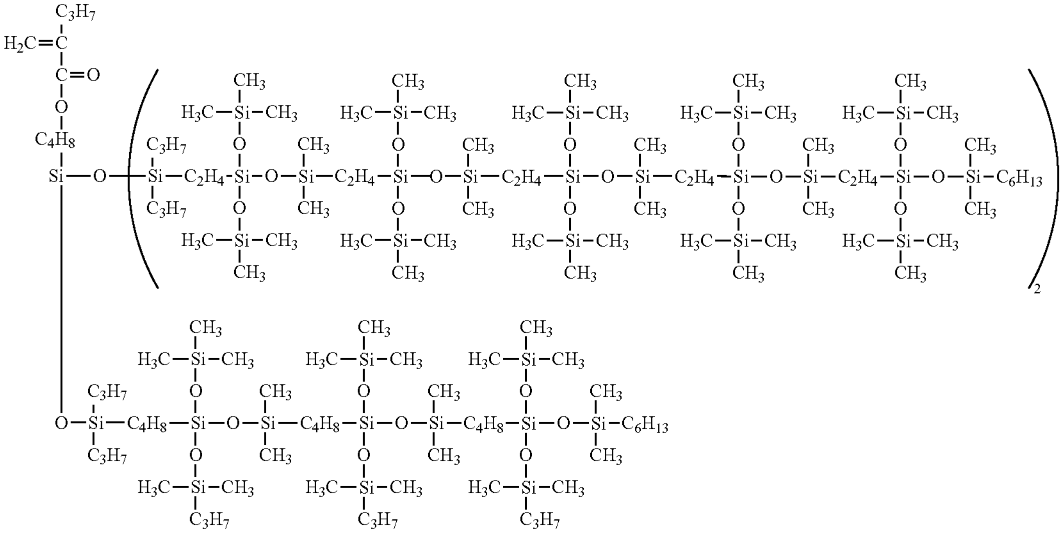
(1F-1)
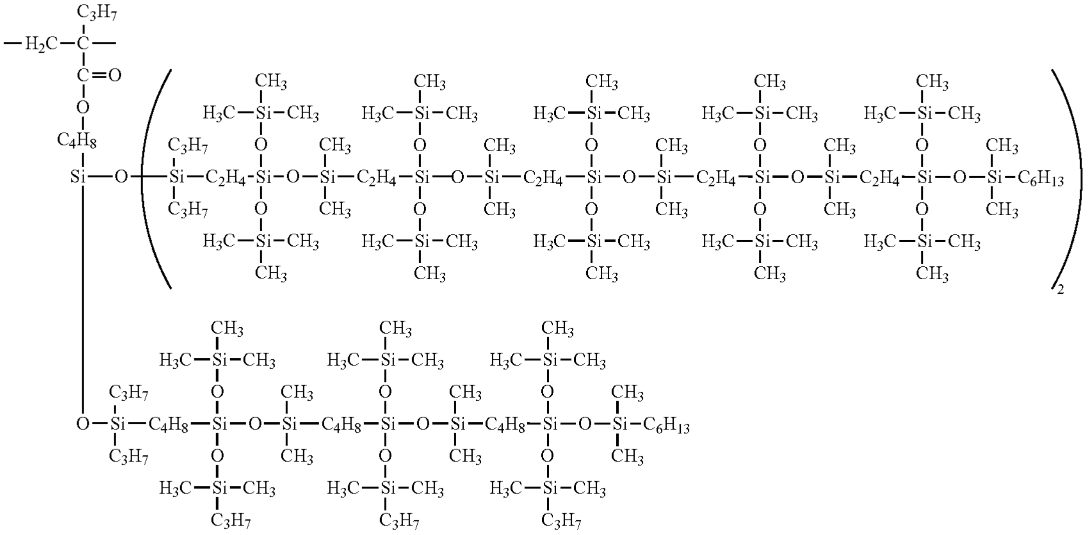

-continued
(1G)
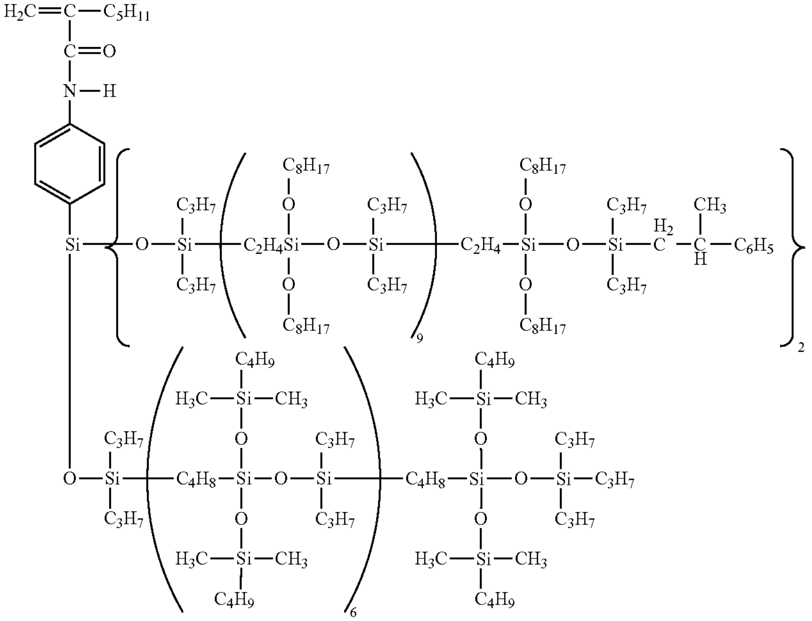
(1G-1)
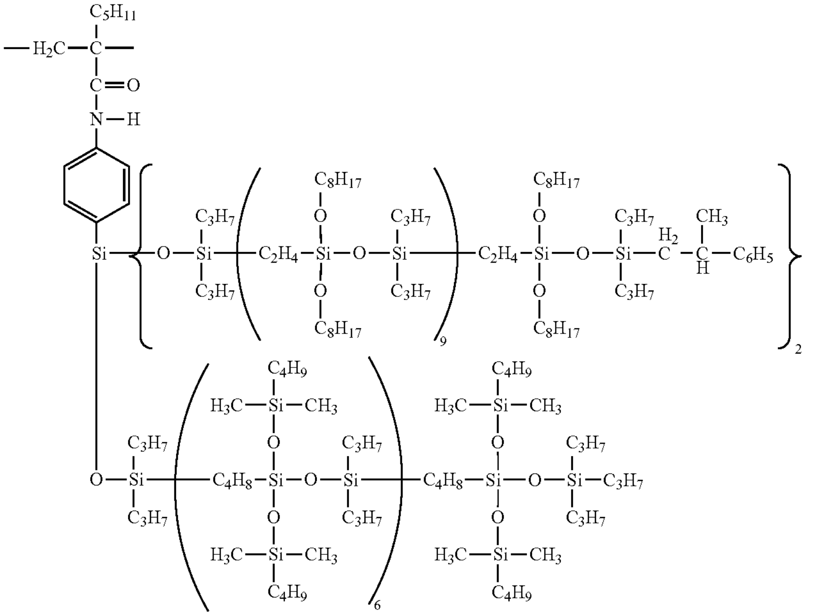
(1H)
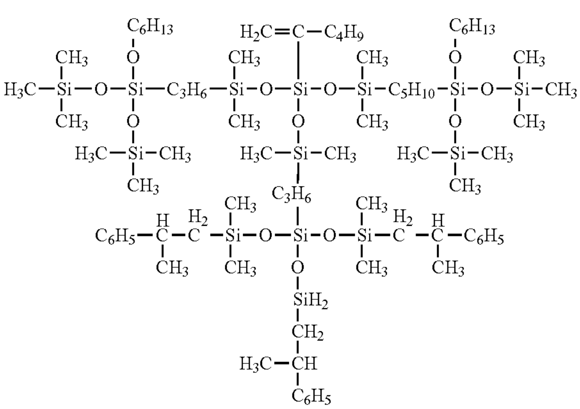
(1H-1)
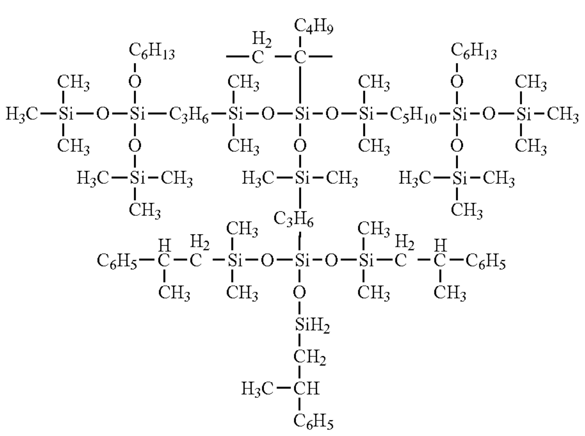

-continued (1J)

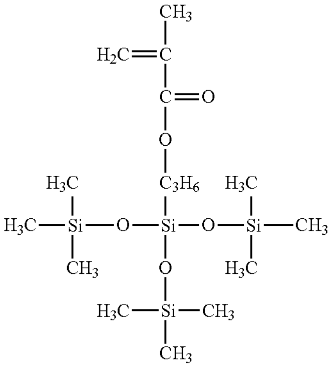

(1J-1)

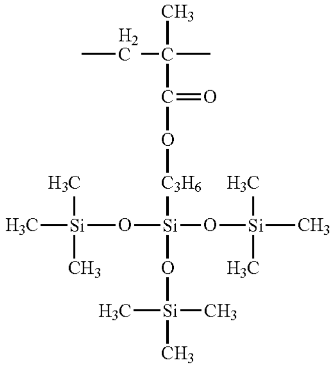

(1K)

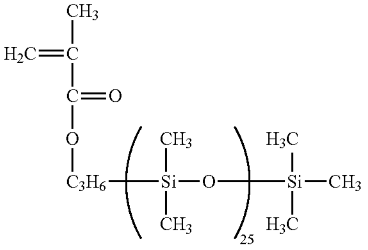

(1K-1)

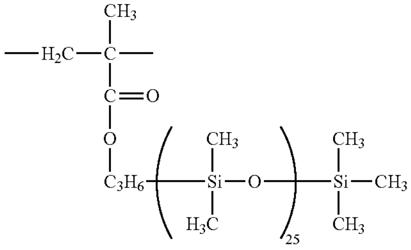

Production Examples A-22 to A-26

The reaction vessel was changed to a 3-L glass flask provided with a stirring machine, a condenser, and a temperature gauge. Compounds were each produced in the same manner as in Production Example A-1 except that the kind of the solvent, the mixture to be dropped, and the polymerization reaction time were changed as shown in Table 3. It should be noted that the terms "IPA," "EtOH," and "polymerization initiator" shown in Table 3 mean isopropyl alcohol, ethanol, and α,α'-azobisisobutyronitrile, respectively.

The resultant compounds were each analyzed in the same manner as in Production Example A-1. Table 4 shows the results.

TABLE 3

| | Reaction solvent | | Mixture to be dropped | | | | | | | | | Solvent | | Polymerization reaction time |
|---|---|---|---|---|---|---|---|---|---|---|---|---|---|---|
| | | | Compound having unit represented by formula (1) | | Butyl acrylate | Methyl methacrylate | Ethyl acrylate | Styrene | Butyl methacrylate | Polymerization initiator | | | | |
| Production Example A | Kind | Part(s) by mass | Average molecular formula | Part(s) by mass | Part(s) by mass | Part(s) by mass | Part(s) by mass | Part(s) by mass | Part(s) by mass | Part(s) by mass | | Kind | Part(s) by mass | |
| Production Example 22 | EtOH | 300 | (2A) | 1,000 | — | 10 | — | — | 10 | 1.0 | | — | — | 100 h |
| Production Example 23 | EtOH | 300 | (2B) | 1,000 | — | 5 | — | — | 5 | 1.0 | | — | — | 80 h |
| Production Example 24 | EtOH | 300 | (2C) | 1,000 | — | 10 | — | — | — | 1.0 | | — | — | 80 h |
| Production Example 25 | EtOH | 300 | (2D) | 1,000 | — | 5 | — | 5 | — | 1.0 | | — | — | 120 h |
| Production Example 26 | EtOH | 300 | (2E) | 500 | — | 10 | — | — | 10 | 1.0 | | — | — | 100 h |

IPA: isopropyl alcohol,
EtOH: ethanol,
polymerization initiator: α,α'-azobisisobutyronitrile

TABLE 4

| Production Example A | Unit represented by formula (1): Average molecular formula | Percentage content | Any other unit (Percentage content): (1-1) | (1-2) | (1-3) | (1-4) | (1-5) | n | m | Weight-average molecular weight in terms of PS |
|---|---|---|---|---|---|---|---|---|---|---|
| Production Example 22 | (2A-1) | 63.6 | — | 20.5 | — | — | 15.9 | 311 | 178 | About 1,000,000 |
| Production Example 23 | (2B-1) | 52.6 | — | 26.6 | — | — | 20.8 | 79 | 71 | About 800,000 |
| Production Example 24 | (2C-1) | 48.1 | — | 51.9 | — | — | — | 83 | 90 | About 900,000 |
| Production Example 25 | (2D-1) | 53.4 | — | 23.8 | — | 22.8 | — | 169 | 147 | About 1,500,000 |
| Production Example 26 | (2E-1) | 57.8 | — | 23.7 | — | — | 18.5 | 488 | 267 | About 1,000,000 |

Structures represented by the formulae (2A) to (2E) described in the item "average molecular formula" in Table 3 and structures represented by the formulae (2B-1) to (2E-1), and (1-5) described in the item "average molecular formula" in Table 4 are shown below.

(2A)

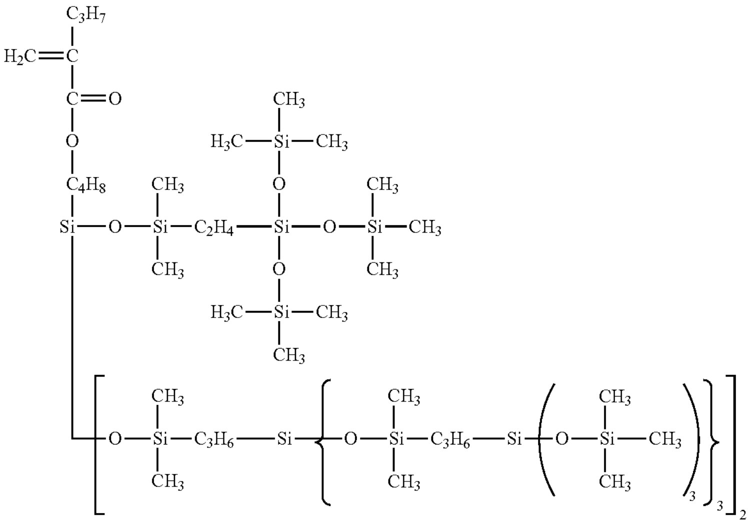

(2A-1)

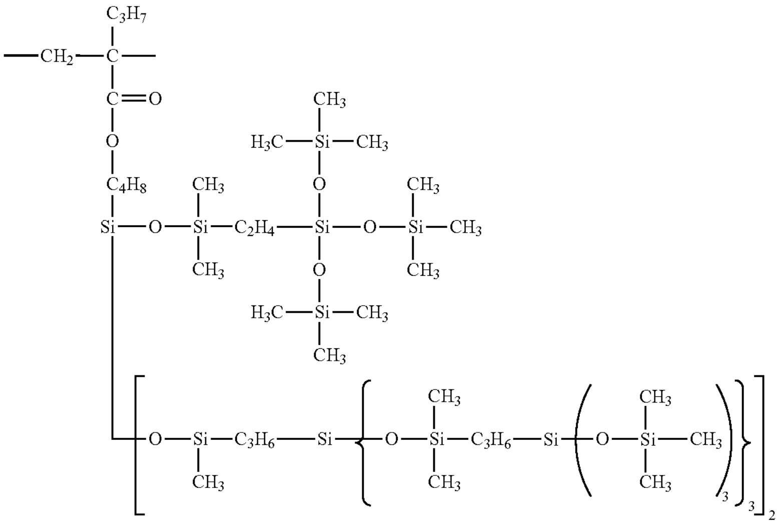

-continued
(1-5)
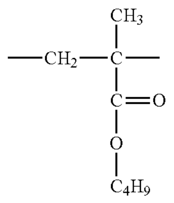
(2B)
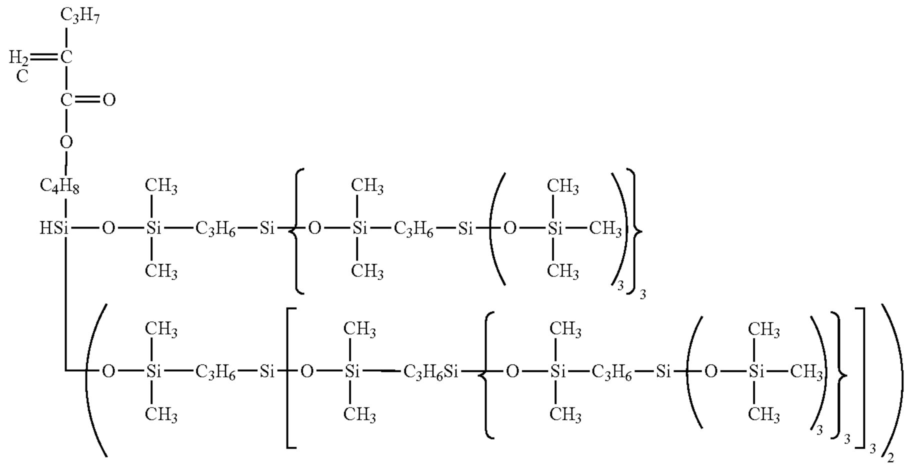
(2B-1)
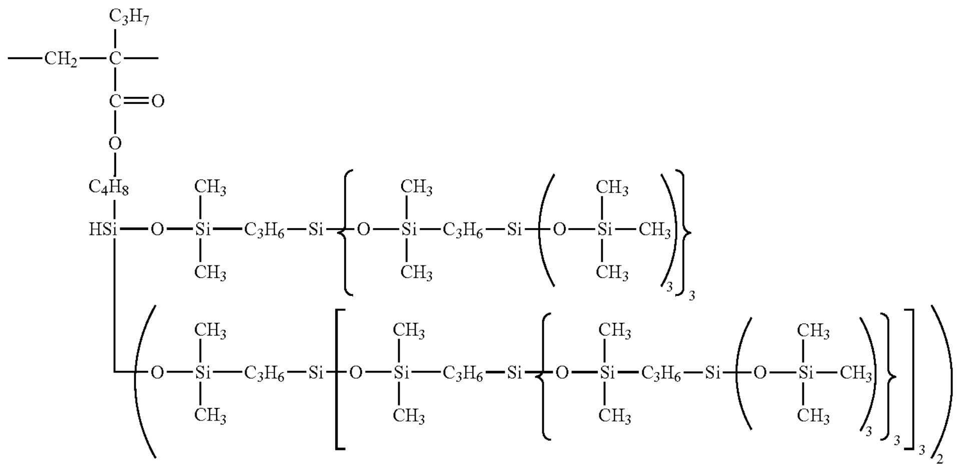

-continued
(2C)
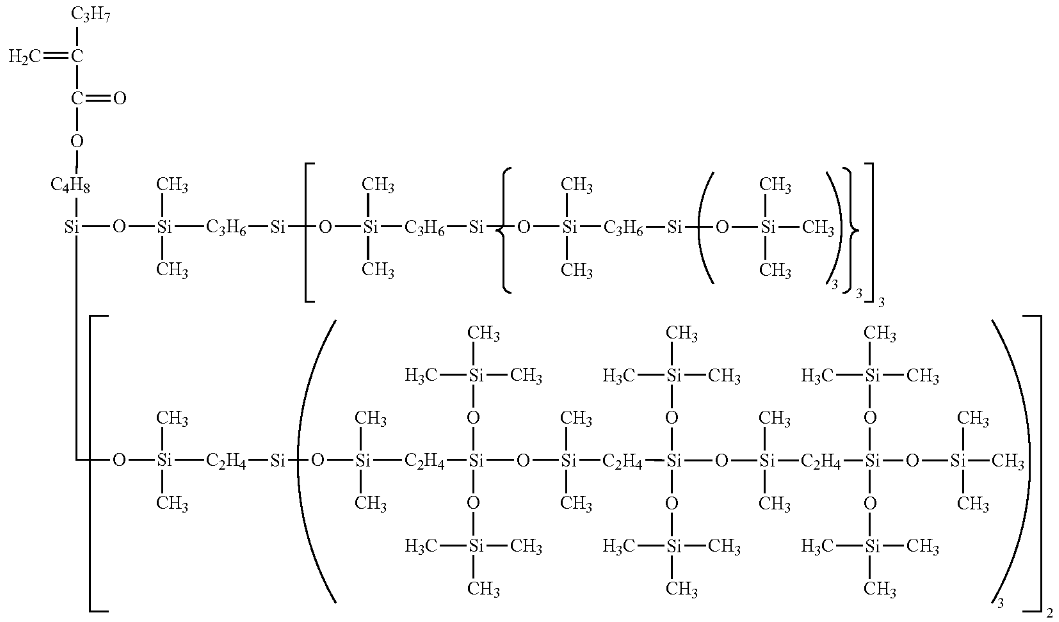
(2C-1)
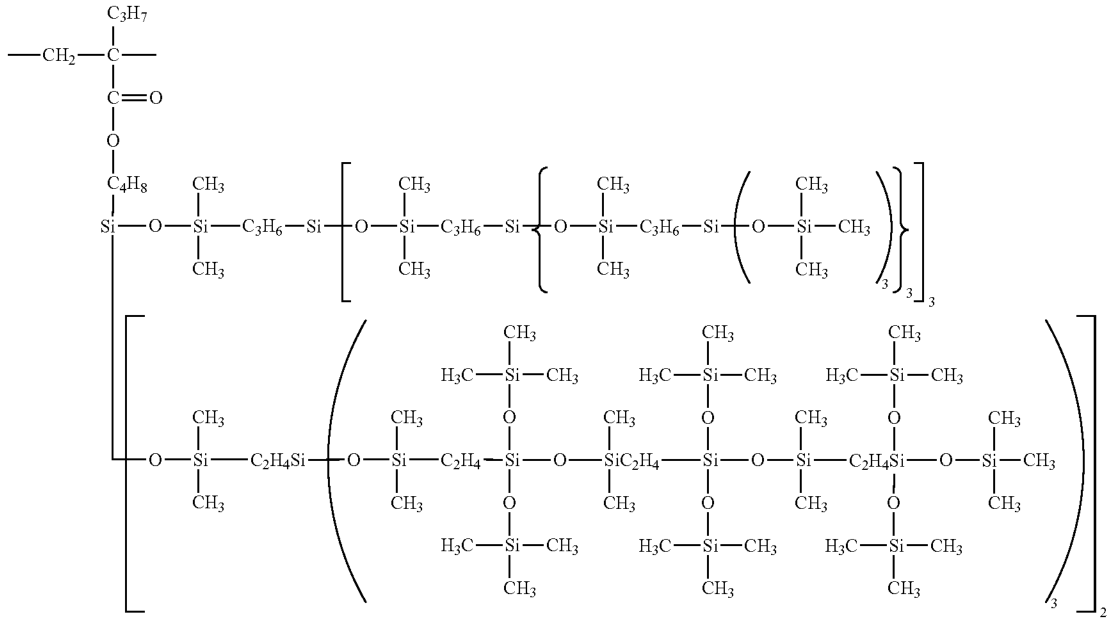

-continued (2D)

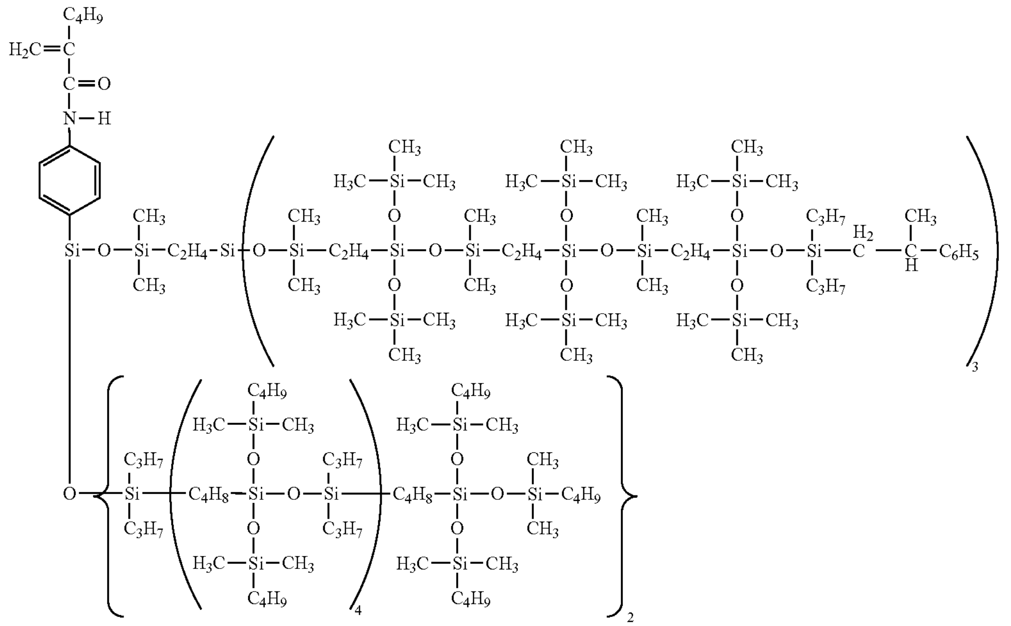

(2D-1)

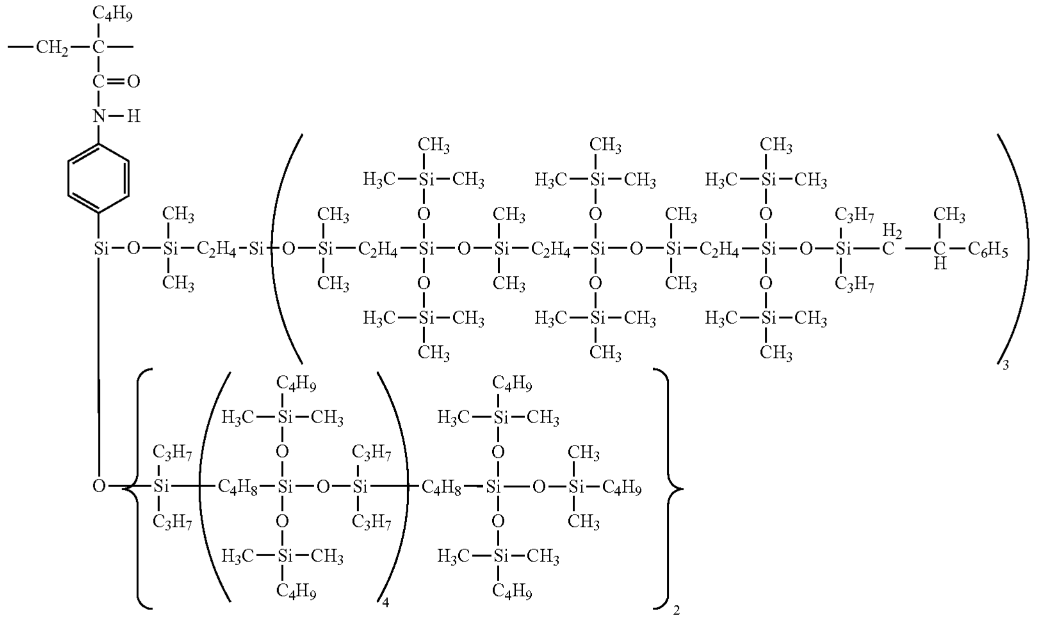

(Production of Composite Conductive Fine Particles 1)

140 Grams of methyl hydrogen polysiloxane were added to 7.0 kg of silica particles (average particle diameter: 15 nm, volume resistivity: $1.8\times10^{12}$ Ω·cm) while an edge runner was operated, and then the contents were mixed and stirred under a line load of 588 N/cm (60 kg/cm) for 30 minutes. A stirring speed at this time was 22 rpm.

7.0 Kg of carbon black particles (particle diameter: 20 nm, volume resistivity: $1.0\times10^{2}$ Ω·cm, pH: 6.0) were added to the mixture over 10 minutes while an edge runner was operated, and then the contents were mixed and stirred under a line load of 588 N/cm (60 kg/cm) for 60 minutes. Carbon black was thus caused to adhere to the surfaces of the silica particles coated with methyl hydrogen polysiloxane. After that, the particles were dried with a dryer at 80° C. for 60 minutes. Thus, composite conductive fine particles 1 were obtained. A stirring speed at this time was 22 rpm. The resultant composite conductive fine particles 1 had an average particle diameter of 15 nm and a volume resistivity of $1.1\times10^{2}$ Ω·cm.

(Production of Surface-Treated Titanium Oxide Particles 1)

110 Grams of isobutyltrimethoxysilane as a surface treatment agent and 3,000 g of toluene as a solvent were blended into 1,000 g of needle-like, rutile-type titanium oxide particles (average particle diameter: 15 nm, vertical:horizontal=3:1, volume resistivity: $2.3\times10^{10}$ Ω·cm). Thus, slurry was prepared.

The slurry was mixed with a stirring machine for 30 minutes. After that, the slurry was supplied to a Viscomill 80% of the effective internal volume of which had been filled with glass beads having an average particle diameter of 0.8 mm, and was then subjected to a wet crushing treatment at a temperature of 30° C. to 40° C.

The slurry after the wet crushing treatment was distilled under reduced pressure with a kneader (bath temperature: 110° C., product temperature: 30° C. to 60° C., degree of decompression: about 100 Torr) so that toluene was removed. The remainder was subjected to a treatment for baking the surface treatment agent at 120° C. for 2 hours. The particles subjected to the baking treatment were cooled to room temperature, and were then pulverized with a pin mill. Thus, surface-treated titanium oxide particles 1 were obtained.

(Production of Elastic Roller Member 1)

A thermosetting adhesive "METALOC U-20" (trade name, manufactured by TOYOKAGAKU KENKYUSHO CO., LTD.) was applied to a stainless rod having a diameter of 6 mm and a length of 252.5 mm, and was then dried. The resultant was used as a conductive substrate.

80 Parts by mass of calcium carbonate, 10 parts by mass of an aliphatic polyester-based plasticizer, 1 part by mass of zinc stearate, 0.5 part by mass of 2-mercaptobenzimidazole (MB) (age resistor), 2 parts by mass of zinc oxide, 2 parts by mass of a quaternary ammonium salt, and 5 parts by mass of carbon black (average particle diameter: 100 nm, volume resistivity: 0.1 Ω·cm) were added to 100 parts by mass of an epichlorohydrin rubber (EO-EP-AGE terpolymer, EO/EP/AGE=73 mol %/23 mol %/4 mol %), and then the mixture was kneaded with a closed mixer regulated to 50° C. for 10 minutes. Thus, a raw material compound was prepared.

0.8 Part by mass of sulfur as a vulcanizer, 1 part by mass of dibenzothiazyl sulfide (DM) as a vulcanization accelerator, and 0.5 part by mass of tetramethylthiuram monosulfide (TS) were added to the compound. Next, the mixture was kneaded with a twin-roll machine cooled to 20° C. for 10 minutes. Thus, a compound for an elastic layer was obtained.

The compound for an elastic layer was extruded with an extrusion molding machine with a crosshead together with the conductive substrate, and then the extruded product was molded so as to be of a roller shape having an outer diameter of about 9 mm. Next, vulcanization and the curing of an elastic layer were performed with an electric oven at 160° C. for 1 hour. Both ends of the elastic layer were cut so that the length of the elastic layer became 228 mm. After that, its surface was subjected to polishing so that a roller shape having an outer diameter of 8.5 mm was obtained. Thus, an elastic roller member 1 having the elastic layer on the conductive substrate was obtained. It should be noted that the crown amount of the elastic layer of the elastic roller member 1 (difference between an outer diameter at its central portion and an outer diameter at a position distant from the central portion by 90 mm) was 120 μm.

Example A-1

Preparation of Application Liquid for Surface Layer

Methyl isobutyl ketone was added to a caprolactone-modified acrylic polyol solution "PLACCEL DC2016" (trade name, manufactured by Daicel Chemical Industries, Ltd.) to adjust the solid content of the mixture to 14 mass %.

Materials shown in Table 5 below were added to 714.3 parts by mass of the solution (acrylic polyol solid content: 100 parts by mass). Thus, a mixed solution was prepared.

TABLE 5

| | | |
|---|---|---|
| Composite conductive fine particles 1 | 45 | parts by mass |
| Surface-treated titanium oxide particles 1 | 20 | parts by mass |
| Modified dimethyl silicone oil (*1) | 0.08 | part by mass |
| Block isocyanate mixture (*2) | 80.14 | parts by mass |

(*1): A modified dimethyl silicone oil (trade name: SH28PA, manufactured by Dow Corning Toray Co., Ltd.)
(*2): A 7:3 mixture of the respective butanone oxime block bodies of hexamethylene diisocyanate (HDI "DURANATE TPA-B80E" (trade name, manufactured by Asahi Kasei Corporation)) and isophorone diisocyanate (IPDI "VESTANAT B1370" (trade name, manufactured by Degussa Huels))

In addition, the isocyanate amount of the block isocyanate mixture was such that a ratio "NCO/OH" was equal to 1.0.

A cyclopentasiloxane solution was prepared by dissolving the compound formed of the unit 1A-1 prepared in Production Example A-1 at 30%. It should be noted that Table 10-1 shows the production example of a compound used and a unit for forming the compound.

Next, 200 g of the mixed solution were loaded into a glass bottle having an internal volume of 450 mL together with 200 g of glass beads having an average particle diameter of 0.8 mm as media, and then dispersion was performed with a paint shaker dispersing machine for 24 hours.

Next, materials shown in Table 6 below were added. After that, dispersion was performed for 1 hour, and then the glass beads were removed. Thus, an application solution for a surface layer was obtained. In addition, here, the amounts of both the PMMA particles 1 and the compound formed of the unit 1A-1 prepared in Production Example A-1 each correspond to 10 parts by mass with respect to 100 parts by mass of the acrylic polyol solid content.

TABLE 6

| | |
|---|---|
| PMMA particles 1<br>Polymethyl methacrylate resin particles having an average particle diameter of 10 μm (hereinafter, abbreviated as "PMMA particles 1," trade name: MX1000, manufactured by Soken Chemical & Engineering Co., Ltd.) | 2.24 g |
| The cyclopentasiloxane solution | 7.47 g |

(Production of Charging Roller)

The application liquid for a surface layer was applied to the elastic roller member 1 once by dipping, and was then air-dried at normal temperature for 30 minutes or more. After that, the resultant was dried with a circulating hot air dryer at 80° C. for 1 hour and then at 160° C. for an additional one hour. Thus, a charging roller having a surface layer formed on the elastic layer was obtained. It should be noted that the dipping application was performed under the conditions of an immersion time of 9 seconds, an initial lifting speed of 20 mm/s, and a final lifting speed of 2 mm/s, and the lifting speed was linearly changed with time.

(Measurement of Resistance of Charging Roller)

The resistance of the charging roller was measured with an instrument for measuring an electrical resistance illustrated in each of FIGS. 4A and 4B. First, as illustrated in FIG. 4A, the charging roller 5 was brought into abutment with the columnar metal 32 (having a diameter of 30 mm) by the bearings 33*a* and 33*b* so that the charging roller 5 was parallel to the metal. Here, an abutting pressure was adjusted to 4.9 N at one end, i.e., a total of 9.8 N at both ends with a pressing force by springs.

Next, the charging roller 5 was rotated with a motor (not shown) following the columnar metal 32 rotationally driven at a circumferential speed of 45 mm/sec. During the rotation following the metal, as illustrated in FIG. 4B, a DC voltage of −200 V was applied from the stabilized power supply 34, and then a value for a current flowing in the charging roller was measured with the ammeter 35. The resistance of the charging roller was calculated from the applied voltage and the current value. The charging roller was left to stand under a normal-temperature, normal-humidity (N/N: 23° C./55% RH) environment for 24 hours or more before its electrical resistance was measured.

(C Set Evaluation Test)

A color laser printer (LBP5400 (trade name)) manufactured by Canon Inc. reconstructed so as to output recording media at a speed of 200 mm/sec (A4 vertical output) was used as an electrophotographic apparatus having a construction illustrated in FIG. 6. The resolution of an image is 600 dpi and the output of primary charging is a DC voltage of −1,100 V.

Figure 7:
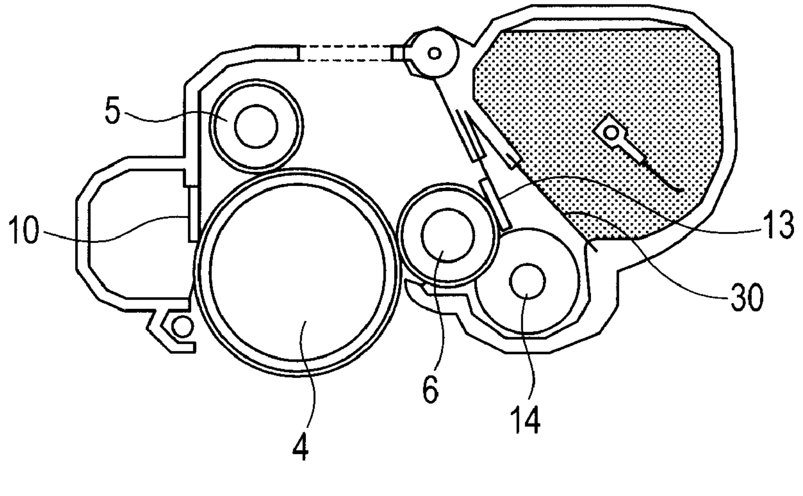
FIG. 7 illustrates a schematic view illustrating a section of one embodiment of a process cartridge of the present invention.
Figure 8:
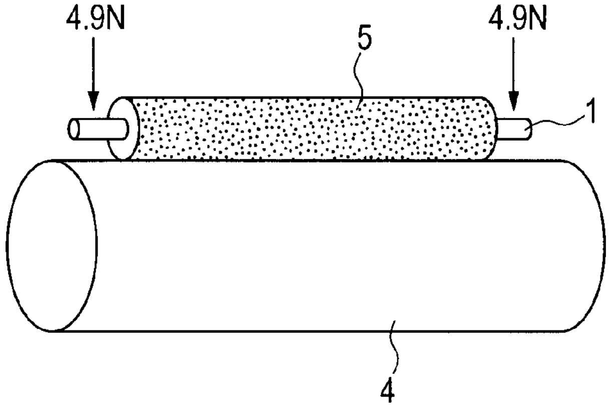
FIG. 8 illustrates a schematic view illustrating a state in which the charging roller of the present invention and an electrophotographic photosensitive member abut on each other.

A process cartridge (for a black color) for the printer was used as a process cartridge having a construction illustrated in FIG. 7. An attached charging roller was detached from the process cartridge, and then the charging roller of the present invention was set. As illustrated in FIG. 8, the charging roller 5 was brought into abutment with the photosensitive member 4 at a pressing force by springs of 4.9 N at one of its ends, in other words, a total of 9.8 N at both of the ends.

The process cartridge was left to stand under a 40° C./95% RH environment for 1 month (severe standing). Next, the process cartridge was left to stand under a 23° C./50% RH environment for 6 hours. After that, the process cartridge was mounted on the electrophotographic apparatus, and then an image was output under the same environment.

The output image was evaluated for a C set image by the following criteria.

Rank 1; The occurrence of a C set image is not observed.

Rank 2; Only a slight streak-like image is observed and cannot be observed at the pitch of the charging roller.

Rank 3; A streak-like image can be partially observed at the pitch of the charging roller, but the image quality causes no problems in practical use.

Rank 4; A streak-like image is conspicuous and a deterioration in image quality is observed.

(Measurement of C Set Amount)

After the image output, the charging roller was detached from the process cartridge, and then the radii of the charging roller at a C set portion and a non-C set portion were each measured. A difference between the radius at the non-C set portion and the radius at the C set portion is a C set amount. A fully automatic roller measuring apparatus manufactured by Tokyo Opto-Electronics Co., Ltd. was used in the measurement.

Positions corresponding to the C set portion and the non-C set portion were subjected to the measurement by rotating the charging roller by 1° for each of three sites, i.e., the longitudinal central portion of the charging roller, and left and right positions at distances of 90 mm each from the central portion. Next, a difference between the maximum of the radius at the non-C set portion and the minimum of the radius at the C set portion was calculated. The largest difference in radius among the three sites was defined as the C set amount of the present invention.

Example A-2

Methyl isobutyl ketone was added to a caprolactone-modified acrylic polyol solution "PLACCEL DC2016" (trade name, manufactured by Daicel Chemical Industries, Ltd.) to adjust the solid content of the mixture to 17 mass %. Materials shown in Table 7 below were added to 588.24 parts by mass of the solution (acrylic polyol solid content: 100 parts by mass). Thus, a mixed solution was prepared.

TABLE 7

| | |
|---|---|
| Carbon black "#52" (manufactured by Mitsubishi Chemical Corporation) | 50 parts by mass |
| Modified dimethyl silicone oil (*1) | 0.08 part by mass |
| Block isocyanate mixture (*2) | 80.14 parts by mass |

In this case, the isocyanate amount of the block isocyanate mixture was such that a ratio "NCO/OH" was equal to 1.0. In addition, (*1) and (*2) are identical to those of Example A-1.

208.6 Grams of the mixed solution were loaded into a glass bottle having an internal volume of 450 mL together with 200 g of glass beads having an average particle diameter of 0.8 mm as media, and then dispersion was performed with a paint shaker dispersing machine for 24 hours. Simultaneously, an isododecane solution was prepared by dissolving the compound formed of the unit 1A-1 produced in Production Example 1 at 40%.

After the dispersion, 2.72 g of the PMMA particles 1 and 6.8 g of the isododecane solution were added to the resultant. At this time, the amounts of both the PMMA particles 1 and the compound formed of the unit 1A-1 produced in Production Example 1 each correspond to 10 parts by mass with respect to 100 parts by mass of the acrylic polyol solid content.

After that, a charging roller was produced in the same manner as in Example 1. The produced charging roller was subjected to a C set image evaluation, C set amount measurement, and electrical resistance measurement.

Example A-3

A caprolactone-modified acrylic polyol solution was prepared in the same manner as in Example A-2, and materials shown in Table 8 below were added with respect to 100 parts by mass of the acrylic polyol solid content so that a mixed solution was prepared. As in Example A-2, the isocyanate amount of the block isocyanate mixture was such that a ratio "NCO/OH" was equal to 1.0.

TABLE 8

| | |
|---|---|
| Carbon black "#52" (manufactured by Mitsubishi Chemical Corporation) | 50 parts by mass |
| Modified dimethyl silicone oil (*1) | 0.08 part by mass |
| Block isocyanate mixture (*2) | 80.14 parts by mass |
| Compound formed of unit 1A-1 produced in Production Example A-1 (*3) | 10 parts by mass |

(*1) and (*2) are identical to those of Example A-2.

(*3) was such that an acetone solution was prepared by dissolving the compound formed of the unit 1A-1 produced in Production Example A-1 at 30%, and was then added so that parts by mass of the compound formed of the unit 1A-1 produced in Production Example A-1 were as described above with respect to 100 parts by mass of the acrylic polyol solid content.

Dispersion was performed with a paint shaker dispersing machine for 24 hours in the same manner as in Example A-2. After the dispersion, 2.72 g of the PMMA particles 1 were added to the resultant. After that, a charging roller was produced in the same manner as in Example A-1. The produced charging roller was evaluated in the same manner as in Example A-1.

Example A-4

Ethanol was added to polyvinyl butyral (available under the trade name "S-Lec BL3" from SEKISUI CHEMICAL CO., LTD.) so that a butyral solution having a solid content of 20 mass % was prepared. Materials shown in Table 9 below were added to 500 parts by mass of the solution (polyvinyl butyral solid content: 100 parts by mass). Thus, a mixed solution was prepared.

TABLE 9

| | |
|---|---|
| Carbon black "#52" (manufactured by Mitsubishi Chemical Corporation) | 50 parts by mass |
| Compound formed of unit 1A-1 produced in Production Example A-1 (*4) | 10 parts by mass |
| Modified dimethyl silicone oil (*2) | 0.08 part by mass |

(*2) is identical to that of Example A-1.

(*4) was such that an ethanol solution was prepared by dissolving the compound formed of the unit 1A-1 produced in Production Example A-1 at 30%, and was then added so that parts by mass of the compound formed of the unit 1A-1 produced in Production Example A-1 were as described above with respect to 100 parts by mass of the acrylic polyol solid content.

190.4 Grams of the mixed solution were loaded into a glass bottle having an internal volume of 450 mL together with 200 g of glass beads having an average particle diameter of 0.8 mm as media, and then dispersion was performed with a paint shaker dispersing machine for 24 hours.

After the dispersion, 3.2 g of the PMMA particles 1 were added to the resultant. At this time, the amount of the PMMA particles 1 corresponds to 10 parts by mass with respect to 100 parts by mass of the polyvinyl butyral solid content. After that, a charging roller was produced in the same manner as in Example A-1. The produced charging roller was evaluated in the same manner as in Example A-1.

Examples A-5 to A-12, and A-14 to A-19

Charging rollers were each produced in the same manner as in Example A-3 except that the kind and part(s) by mass of the compound were changed as shown in Table 10-1. It should be noted that Table 10-1 shows the production example of a compound used and a unit for forming the compound. The produced charging rollers were each subjected to a C set image evaluation, C set amount measurement, and electrical resistance measurement.

Examples A-13 and A-20

Charging rollers were each produced in the same manner as in Example A-1 except that the kind and part(s) by mass of the compound were changed as shown in Table 10-1. The produced charging rollers were each evaluated in the same manner as in Example A-1.

Example A-21

A charging roller was produced in the same manner as in Example A-1 except that the composite conductive fine particles were changed to 50 parts by mass of carbon black "#52" (manufactured by Mitsubishi Chemical Corporation). The produced charging roller was evaluated in the same manner as in Example A-1.

Example A-22 and Examples A-24 to A-31

Charging rollers were each produced in the same manner as in Example A-21 except that the kind and part(s) by mass of the compound were changed as shown in Table 10-1. The produced charging rollers were each evaluated in the same manner as in Example A-1.

Example A-23

A charging roller was produced in the same manner as in Example A-4 except that the kind and part(s) by mass of the compound were changed as shown in Table 10-1. The compound formed of the unit 1G-1 was directly added without being dissolved in an ethanol solution. The produced charging roller was evaluated in the same manner as in Example A-1.

Example A-32

A charging roller was produced in the same manner as in Example A-21 except that: the compound formed of the unit 1F-1 was changed to a compound formed of the unit 1A-1 represented by the formula (1A); and the addition amount thereof was changed to 20 parts by mass. The produced charging roller was evaluated in the same manner as in Example A-1.

Comparative Example A-1

A charging roller was produced in the same manner as in Example A-4 except that the compound formed of the unit 1A-1 produced in Production Example A-1 was not added. The produced charging roller was evaluated in the same manner as in Example A-1.

Comparative Examples A-2 to A-4

Charging rollers were each produced in the same manner as in Example A-21 except that the kind and part(s) by mass of the compound were changed as shown in Table 10-2. The produced charging rollers were each evaluated in the same manner as in Example A-1.

Table 10-1 shows the results of the evaluations of the charging rollers according to Examples A-1 to A-32 described above. In addition, Table 10-2 shows the results of the evaluations of the charging rollers according to Comparative Examples A-1 to A-4 described above.

TABLE 10-1

| Example A | Production example of compound | Unit for forming compound | Part(s) by mass of compound | C set rank | C set amount (μm) | Electrical resistance of charging roller (Ω) |
|---|---|---|---|---|---|---|
| 1 | A-1 | 1A-1 | 10 | 1 | 8 | $3.3 \times 10^5$ |
| 2 | A-1 | 1A-1 | 10 | 1 | 11 | $4.0 \times 10^5$ |
| 3 | A-1 | 1A-1 | 10 | 1 | 11 | $5.0 \times 10^5$ |
| 4 | A-1 | 1A-1 | 10 | 1 | 10 | $6.0 \times 10^5$ |
| 5 | A-1 | 1A-1 | 30 | 1 | 8 | $1.0 \times 10^6$ |
| 6 | A-1 | 1A-1 | 50 | 1 | 11 | $2.3 \times 10^6$ |
| 7 | A-1 | 1A-1 | 1 | 1 | 9 | $2.3 \times 10^5$ |
| 8 | A-1 | 1A-1 | 0.5 | 1 | 8 | $9.0 \times 10^5$ |
| 9 | A-2 | 1A-1 | 10 | 1 | 10 | $1.0 \times 10^5$ |
| 10 | A-3 | 1A-1 | 10 | 1 | 10 | $9.3 \times 10^4$ |
| 11 | A-4 | 1A-1 | 50 | 1 | 11 | $9.3 \times 10^4$ |
| 12 | A-4 | 1A-1 | 1 | 1 | 10 | $1.0 \times 10^6$ |
| 13 | A-4 | 1A-1 | 1 | 1 | 9 | $3.5 \times 10^5$ |
| 14 | A-5 | 1B-1 | 5 | 3 | 13 | $5.0 \times 10^5$ |
| 15 | A-6 | 1C-1 | 10 | 2 | 12 | $5.0 \times 10^6$ |
| 16 | A-6 | 1C-1 | 1 | 3 | 13 | $5.0 \times 10^6$ |
| 17 | A-7 | 1D-1 | 10 | 3 | 12 | $1.2 \times 10^6$ |
| 18 | A-6 | 1C-1 | 50 | 2 | 11 | $9.8 \times 10^5$ |
| 19 | A-7 | 1D-1 | 5 | 1 | 10 | $4.3 \times 10^5$ |
| 20 | A-8 | 1E-1 | 5 | 1 | 8 | $5.2 \times 10^5$ |
| 21 | A-9 | 1F-1 | 7 | 1 | 11 | $6.0 \times 10^5$ |
| 22 | A-10 | 1G-1 | 50 | 3 | 13 | $1.5 \times 10^5$ |
| 23 | A-10 | 1G-1 | 10 | 3 | 13 | $1.6 \times 10^6$ |
| 24 | A-11 | 1H-1 | 30 | 3 | 13 | $3.0 \times 10^5$ |
| 25 | A-12 | 1A-1 | 10 | 2 | 11 | $6.8 \times 10^6$ |
| 26 | A-13 | 1C-1 | 5 | 3 | 13 | $2.8 \times 10^6$ |
| 27 | A-14 | 1A-1 | 30 | 2 | 12 | $3.3 \times 10^5$ |
| 28 | A-15 | 1A-1 | 30 | 2 | 10 | $2.0 \times 10^6$ |
| 29 | A-16 | 1B-1 | 10 | 2 | 11 | $1.0 \times 10^6$ |
| 30 | A-17 | 1B-1 | 10 | 3 | 13 | $2.6 \times 10^6$ |
| 31 | A-21 | 1H-1 | 20 | 3 | 13 | $9.3 \times 10^5$ |
| 32 | — | 1A-1 | 20 | 2 | 11 | $2.6 \times 10^6$ |

TABLE 10-2

| Comparative Example A | Production example of compound | Unit for forming compound | Part(s) by mass of compound | C set rank | C set amount (μm) | Electrical resistance of charging roller (Ω) |
|---|---|---|---|---|---|---|
| 1 | — | — | — | 4 | 18 | $9.4 \times 10^4$ |
| 2 | A-18 | 1J-1 | 10 | 4 | 17 | $1.5 \times 10^6$ |
| 3 | A-19 | 1J-1 | 10 | 4 | 16 | $1.0 \times 10^6$ |
| 4 | A-20 | 1K-2 | 10 | 4 | 16 | $5.7 \times 10^5$ |

Example B

Example B-33

Preparation of Application Liquid for Surface Layer

Materials shown in Table 11 below were added to 588.24 parts by mass of the caprolactone-modified acrylic polyol solution of Example A-2. Thus, a mixed solution was prepared.

TABLE 11

| | |
|---|---|
| Composite conductive fine particles 1 | 45 parts by mass |
| Surface-treated titanium oxide particles 1 | 20 parts by mass |
| Modified dimethyl silicone oil (*1) | 0.08 part by mass |
| Block isocyanate mixture (*2) | 80.14 parts by mass |

(*1) and (*2) are identical to those of Example 1.

200 Grams of the mixed solution were loaded into a glass bottle having an internal volume of 450 mL together with 200 g of glass beads having an average particle diameter of 0.8 mm as media, and then dispersion was performed with a paint shaker dispersing machine for 24 hours. 2.24 Grams of polymethyl methacrylate resin particles having an average particle diameter of 10 μm were added to the dispersion liquid. After that, dispersion was performed for 1 hour, and then the glass beads were removed. Thus, an application liquid for a surface layer was obtained. In addition, an isododecane solution was prepared by dissolving the compound formed of the unit 2A-1 at 10%.

(Production of Charging Roller)

The application liquid for a surface layer was applied to the elastic roller member 1 once by dipping, and was then air-dried at normal temperature for 30 minutes or more. After that, the isododecane solution was sprayed with a spray gun to the resultant for 5 seconds. Further, the resultant was air-dried at normal temperature for 10 minutes or more. After that, the resultant was dried with a circulating hot air dryer at 80° C. for 1 hour and then at 160° C. for an additional one hour. Thus, a charging roller having a surface layer formed on the elastic layer was obtained.

The dipping application was performed under the same conditions as those of Example A-1.

In addition, the application with the spray gun is as described below. The roller member after the dipping was raised so that its axial direction was parallel to the moving direction of the spray gun. While the roller member was rotated, a distance between the roller member and the nozzle tip of the spray gun was kept constant. Then, the application was performed while the spray gun was moved upward at constant speed. A product obtained by incorporating, into a nozzle having a nozzle diameter of 1.2 mm, a Teflon (registered trademark) hose having an inner diameter of 1.0 mm and an outer diameter of 1.2 mm was used as the spray gun. At this time, the application was performed under the conditions of an atomizing pressure of the spray gun of $2\times10^5$ Pa, and a distance between the roller member and the nozzle tip of the spray gun of 50 mm. In addition, the speed at which the spray gun was moved upward was appropriately adjusted to such a speed that the spray gun could move from the lower end of the roller member to its upper end within a time period corresponding to the spraying time of the spray gun.

(Observation of Surface State of Charging Roller)

The state of distribution of the compound formed of the unit 2A-1 in the surface of the charging roller was measured with an atomic force microscope (AFM). The measurement was performed in a field of view measuring 40 μm by 40 μm according to a tapping mode. The measurement enabled the confirmation of the fact that the surface of the charging roller was formed of a continuous phase and a discontinuous phase having different phases.

A component of the discontinuous phase was analyzed by $^{13}$C-NMR, $^{29}$Si-NMR, and FT-IR. The analysis enabled the confirmation of the fact that the discontinuous phase was formed of the compound formed of the unit 2A-1.

The measurement was performed with the atomic force microscope at five arbitrary points of the surface of the charging roller. The state of distribution of discontinuous phases in the measured image data was analyzed with an image analysis software. As a result, it was found that the maximum diameter and area fraction of the discontinuous phases were 2.3 μm and 45%, respectively. Here, the term "maximum diameter" refers to the maximum diameter out of the diameters each passing the center of gravity of each of ten arbitrary discontinuous phases selected from the image data and connecting two points on the outer periphery of the discontinuous phase. In addition, the term "area fraction" refers to the average of the total area of the discontinuous phases with respect to the area of the entire image data.

The produced charging roller was subjected to electrical resistance measurement, C set amount measurement, and a C set image evaluation in the same manner as in Example A-1.

(Evaluation of Image Resulting from Contamination of Charging Member)

(Preparation for Evaluation)

A color laser printer (LBP5400 (trade name)) manufactured by Canon Inc. reconstructed so as to output recording media at a speed of 200 mm/sec (A4 vertical output) was used as an electrophotographic apparatus having a construction illustrated in FIG. 6. The resolution of an image is 600 dpi and the output of primary charging is a DC voltage of −1,100 V. A process cartridge (for a black color) for the printer was used as a process cartridge having a construction illustrated in FIG. 7. An attached charging roller was detached from the process cartridge, and then the charging roller of the present invention was set. As illustrated in FIG. 8, the charging roller was brought into abutment with a photosensitive member at a pressing force by springs of 4.9 N at one end, i.e., a total of 9.8 N at both ends. After a monochromatic solid image had been printed on 50 sheets under a 23° C./50% RH environment (NN environment), a solid white image was printed on one sheet. The foregoing was repeated six times. Thus, the monochromatic solid image was printed on a total of 300 sheets.

(Endurance Test Evaluation)

The process cartridge was incorporated into the electrophotographic apparatus. An image was output on one sheet, and then the rotation of the electrophotographic apparatus was stopped. After that, an image-forming operation was restarted. The foregoing operation was repeatedly performed (intermittent endurance at a print percentage of 1%). Thus, an image output endurance test of a total of 5,000 sheets was performed.

The endurance test was performed under each of an environment having a temperature of 23° C. and a humidity of 50% RH(NN environment), and an environment having a temperature of 15° C. and a humidity of 10% RH (LL environment). An initial image, and a halftone image (such an image that horizontal lines each having a width of 1 dot were drawn at an interval of 2 dots in a direction perpendicular to the rotation direction of the photosensitive member) at the time of each of 1,000-th, 3,000-th, and 5,000-th sheets in the endurance test were output as evaluation images. Those images were evaluated for states of occurrence of an image resulting from the contamination of the charging member and an image resulting from fusion to the photosensitive member based on the following criteria.

(Evaluation Criteria for Spot Image Resulting from Contamination of Charging Member)

A: The occurrence of a spot image resulting from the contamination of the charging member is not observed.

B: A slight spot image is observed only partially and cannot be observed at the pitch of the charging roller.

C: A spot-like image can be observed at the pitch of the charging roller, but the image quality causes no problems in practical use.

D: A spot-like image is conspicuous and a deterioration in image quality is observed.

(Evaluation Criteria for Spot Image Resulting from Fusion to Photosensitive Member)

A: The occurrence of a spot image resulting from fusion to the photosensitive member is not observed.

B: A slight spot image is observed only partially and cannot be observed at a drum pitch.

C: A spot image can be observed at a drum pitch, but the image quality causes no problems in practical use.

D: A spot image is conspicuous and a deterioration in image quality is observed.

Example B-34

Materials shown in Table 12 below were added to 500 parts by mass of the butyral solution of Example A-4. Thus, a mixed solution was prepared.

TABLE 12

| | |
|---|---|
| Composite conductive fine particles 1 | 45 parts by mass |
| Surface-treated titanium oxide particles 1 | 20 parts by mass |
| Modified dimethyl silicone oil (*1) | 0.08 part by mass |

(*1) is identical to that of Example 1.

Next, 200 g of the mixed solution were loaded into a glass bottle having an internal volume of 450 mL together with 200 g of glass beads having an average particle diameter of 0.8 mm as media, and then dispersion was performed with a paint shaker dispersing machine for 24 hours.

After the dispersion, 3.2 g of polymethyl methacrylate resin particles having an average particle diameter of 6 μm (MX6000, manufactured by Soken Chemical & Engineering Co., Ltd.) were added to the resultant. At this time, the amount of the polymethyl methacrylate resin particles corresponds to 10 parts by mass with respect to 100 parts by mass of the polyvinyl butyral solid content. After that, dispersion was performed for 1 hour, and then the glass beads were removed. Thus, an application liquid for a surface layer was obtained. Simultaneously, an isododecane solution was prepared by dissolving the compound formed of the unit 2A-1 at 10%.

After that, a charging roller was produced in the same manner as in Example B-33. The produced charging roller was evaluated in the same manner as in Example B-33. In addition, evaluations for a spot image resulting from the contamination of the charging member and a spot image resulting from fusion to the photosensitive member were each performed in the same manner as in Example B-33.

Examples B-35 to B-38, B-40 to B-43, and B-45 to B-48

Charging rollers were each produced in the same manner as in Example B-33 except that: the compound formed of the unit 2A-1 was changed to a compound shown in Table 13-1; and the spraying time was changed to a time shown in Table 13-1. The produced charging rollers were each evaluated in the same manner as in Example B-33.

Examples B-39, B-44, B-49, and B-50

Charging rollers were each produced in the same manner as in Example B-34 except that: the compound formed of the unit 2A-1 was changed to a compound shown in Table 13-1; and the spraying time was changed to a time shown in Table 13-1. The produced charging rollers were each evaluated in the same manner as in Example B-33.

Comparative Example B-5

A charging roller was produced in the same manner as in Example B-34 except that the spraying with the compound formed of the unit 2A-1 was not performed. The produced charging roller was evaluated in the same manner as in Example B-34.

Comparative Example B-6

A charging roller was produced in the same manner as in Example B-34 except that: the compound formed of the unit 2A-1 was changed to a dimethyl silicone oil "KF-96L-5cs" (trade name, manufactured by Shin-Etsu Silicone); and the spraying time was changed to a time shown in Table 13-2. The produced charging roller was evaluated in the same manner as in Example B-33.

Comparative Example B-7

A charging roller was produced in the same manner as in Example B-34 except that: the compound formed of the unit 2A-1 was changed to a compound shown in Table 13-2; and the spraying time was changed to a time shown in Table 10. The produced charging roller was evaluated in the same manner as in Example B-33.

Table 13-1 and Table 14-1 show the results of the evaluations of the charging rollers according to Examples B-33 to B-50 described above. In addition, Table 13-2 and Table 14-2 show the results of the evaluations of the charging rollers according to Comparative Examples B-5 to B-7.

As shown in Table 13-1 and Table 13-2, and Table 14-1 and Table 14-2, the charging roller according to the embodiments can be preferably incorporated into an electrophotographic apparatus or a process cartridge because the occurrence of each of a C set image, a spot image resulting from the contamination of the charging member, and a spot image resulting from fusion to the photosensitive member is suppressed.

TABLE 13-1

| Example B | Unit for forming compound | Spraying time (second(s)) | Maximum diameter (μm) | Area fraction (%) | Electrical resistance of charging roller (Ω) | C set rank | C set amount (μm) |
|---|---|---|---|---|---|---|---|
| 33 | 2A-1 | 5 | 2.3 | 45 | $6.9 \times 10^5$ | 1 | 8 |
| 34 | 2A-1 | 3 | 2.5 | 13 | $3.5 \times 10^5$ | 1 | 10 |
| 35 | 2B-1 | 4 | 1.4 | 28 | $5.8 \times 10^5$ | 1 | 9 |
| 36 | 2B-1 | 5 | 0.6 | 39 | $7.2 \times 10^5$ | 1 | 9 |
| 37 | 2B-1 | 3 | 0.8 | 15 | $1.7 \times 10^5$ | 2 | 11 |
| 38 | 2C-1 | 5 | 2.5 | 40 | $6.3 \times 10^5$ | 2 | 11 |
| 39 | 2C-1 | 3 | 2.2 | 16 | $2.3 \times 10^5$ | 2 | 12 |
| 40 | 2D-1 | 4 | 1.6 | 30 | $5.1 \times 10^5$ | 2 | 10 |
| 41 | 2D-1 | 5 | 0.4 | 42 | $8.1 \times 10^5$ | 2 | 11 |
| 42 | 2D-1 | 3 | 0.5 | 13 | $1.5 \times 10^5$ | 3 | 13 |

TABLE 13-1-continued

| Example B | Unit for forming compound | Spraying time (second(s)) | Maximum diameter (μm) | Area fraction (%) | Electrical resistance of charging roller (Ω) | C set rank | C set amount (μm) |
|---|---|---|---|---|---|---|---|
| 43 | 2A-1 | 3 | 3.6 | 12 | $9.4 \times 10^4$ | 2 | 13 |
| 44 | 2A-1 | 5 | 3.4 | 37 | $7.5 \times 10^5$ | 1 | 10 |
| 45 | 2B-1 | 6 | 1.8 | 70 | $2.2 \times 10^6$ | 1 | 8 |
| 46 | 2B-1 | 6 | 0.5 | 63 | $1.3 \times 10^6$ | 1 | 8 |
| 47 | 2C-1 | 4 | 0.05 | 28 | $4.3 \times 10^6$ | 2 | 11 |
| 48 | 2C-1 | 2 | 0.3 | 3 | $7.8 \times 10^4$ | 3 | 15 |
| 49 | 2D-1 | 6 | 3.5 | 60 | $8.8 \times 10^5$ | 2 | 10 |
| 50 | 2D-1 | 2 | 1.5 | 3 | $8.5 \times 10^4$ | 3 | 14 |

TABLE 13-2

| Comparative Formula B | Unit for forming compound | Spraying time (second(s)) | Maximum diameter (μm) | Area fraction (%) | Electrical resistance of charging roller (Ω) | C set rank | C set amount (μm) |
|---|---|---|---|---|---|---|---|
| 5 | — | — | — | — | $9.4 \times 10^4$ | 4 | 18 |
| 6 | Dimethyl silicone oil | 4 | 1.6 | 33 | $9.4 \times 10^4$ | 4 | 18 |
| 7 | 2K-1 | 4 | 1.5 | 29 | $9.4 \times 10^4$ | 4 | 16 |

TABLE 14-1

| | Image resulting from contamination of charging member | | | | | | | | Image resulting from fusion to photosensitive member | | | | | | | |
|---|---|---|---|---|---|---|---|---|---|---|---|---|---|---|---|---|
| | NN | | | | LL | | | | NN | | | | LL | | | |
| Example B | Initial image | 1k | 3k | 5k | Initial image | 1k | 3k | 5k | Initial image | 1k | 3k | 5k | Initial image | 1k | 3k | 5k |
| 33 | A | A | A | A | A | A | A | A | A | A | A | A | A | A | A | A |
| 34 | A | A | A | A | A | A | A | A | A | A | A | A | A | A | A | A |
| 35 | A | A | A | A | A | A | A | A | A | A | A | A | A | A | A | A |
| 36 | A | A | A | A | A | A | B | B | A | A | A | A | A | A | A | A |
| 37 | A | A | A | A | A | A | B | B | A | A | A | A | A | A | A | A |
| 38 | A | A | B | B | A | A | B | B | A | A | A | B | A | A | A | B |
| 39 | A | A | B | B | A | B | B | B | A | A | A | B | A | A | A | B |
| 40 | A | A | B | B | A | A | B | B | A | A | A | B | A | A | B | B |
| 41 | B | B | B | B | B | B | C | C | A | A | A | B | A | A | B | B |
| 42 | B | B | B | B | B | B | C | C | A | A | A | B | A | A | B | B |
| 43 | B | B | B | C | B | B | B | C | A | A | B | B | A | A | B | C |
| 44 | B | B | C | C | B | B | C | C | A | A | B | B | A | B | B | C |
| 45 | B | B | C | C | B | B | C | C | A | A | B | B | A | B | B | C |
| 46 | C | C | C | C | C | C | C | C | A | A | B | C | B | B | C | C |
| 47 | C | C | C | C | C | C | C | C | A | A | B | C | B | B | C | C |
| 48 | C | C | C | C | C | C | C | C | A | A | B | C | B | B | C | C |
| 49 | B | B | C | C | B | C | C | C | A | A | B | B | A | B | C | C |
| 50 | B | C | C | C | C | C | C | C | A | A | B | C | B | B | C | C |

TABLE 14-2

| | Image resulting from contamination of charging member | | | | | | | | Image resulting from fusion to photosensitive member | | | | | | | |
|---|---|---|---|---|---|---|---|---|---|---|---|---|---|---|---|---|
| | NN | | | | LL | | | | NN | | | | LL | | | |
| Comparative Example B | Initial image | 1k | 3k | 5k | Initial image | 1k | 3k | 5k | Initial image | 1k | 3k | 5k | Initial image | 1k | 3k | 5k |
| 5 | C | C | D | D | C | C | D | D | C | C | D | D | C | D | D | D |
| 6 | B | B | C | D | B | B | C | D | B | C | C | D | B | C | D | D |
| 7 | B | B | C | D | B | B | C | D | B | C | C | D | B | C | D | D |

Example C

Production of Resin Particles

Production Example C-27

A compound was obtained in the same manner as in Production Example A-1 except that the mixture to be dropped was changed as shown in Table 15. The resultant compound was analyzed in the same manner as in Production Example A-1. It should be noted that the term "polymerization initiator" shown in Table 15 means α,α'-azobisisobutyronitrile.

The resultant compound was mechanically pulverized with a pin mill, and was then subjected to freeze pulverization at liquid-nitrogen temperature. After that, the pulverized powder was classified. Thus, resin particles having an average particle diameter of 20 μm were obtained. The particles are defined as resin particles 1. The average particle diameter of the resin particles 1 was measured with a Coulter Counter Multisizer. 0.5 Gram of a sodium alkylbenzene sulfonate as a surfactant was added to 100 ml of an electrolyte solution, and then 5 mg of the resin particles 1 were added to the mixture. The electrolyte solution in which the resin particles 1 had been suspended was subjected to a dispersion treatment with an ultrasonic dispersing unit for one minute. A particle size distribution from 0.3 μm to 64 μm on a volume basis was measured with the Coulter Counter Multisizer while an aperture was changed. Thus, a mass-average particle diameter was determined.

Production Example C-28, C-32, and C-34

Compounds were each produced in the same manner as in Production Example C-27 except that the mixture to be dropped to the reaction solvent was changed as shown in Table 15. The resultant compounds were each analyzed in the same manner as in Production Example A-1.

Next, each of the resultant compounds was subjected to mechanical pulverization and classification in the same manner as in Production Example C-27 except that its classification conditions (the circumferential speed of a rotor and an airflow rate) were changed as shown in Table 18. Thus, resin particles were obtained.

Production Example C-29

A polymerization reaction was performed in the same manner as in Production Example C-27 except that: the reaction solvent was changed to 100 parts by mass of ethanol, 100 parts by mass of acetone, and 100 parts by mass of toluene; and the mixture to be dropped was changed as shown in Table 15. After the polymerization reaction, the resultant was dried at 150° C. and a reduced pressure of 10 mmHg. Thus, a compound was obtained.

The resultant compound was analyzed in the same manner as in Production Example 1. The compound had a unit represented by a formula (3B-1), the unit represented by the formula (1-1), the unit represented by the formula (1-2), a unit represented by a formula (1-6), and a unit represented by a formula (1-7). Table 17 shows the results of the analysis. The resultant compound was subjected to mechanical pulverization and classification in the same manner as in Production Example C-27 except that its classification conditions were changed as shown in Table 18. Thus, resin particles were obtained.

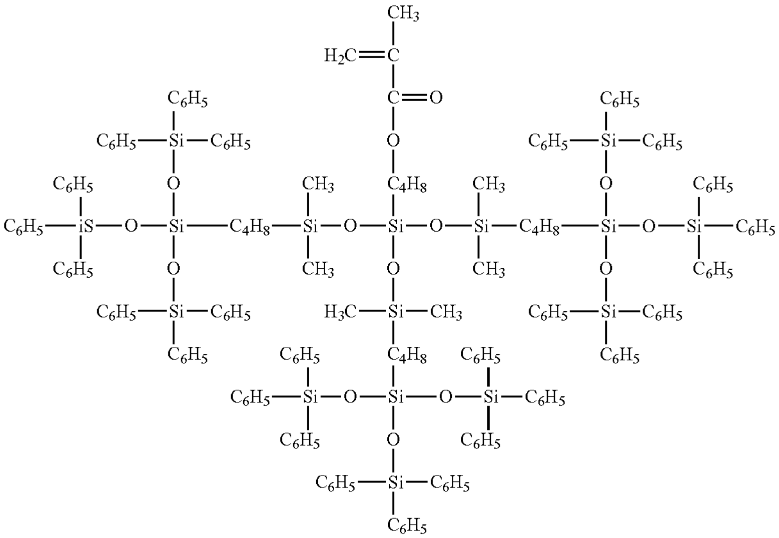

(3B)

-continued (3B-1)

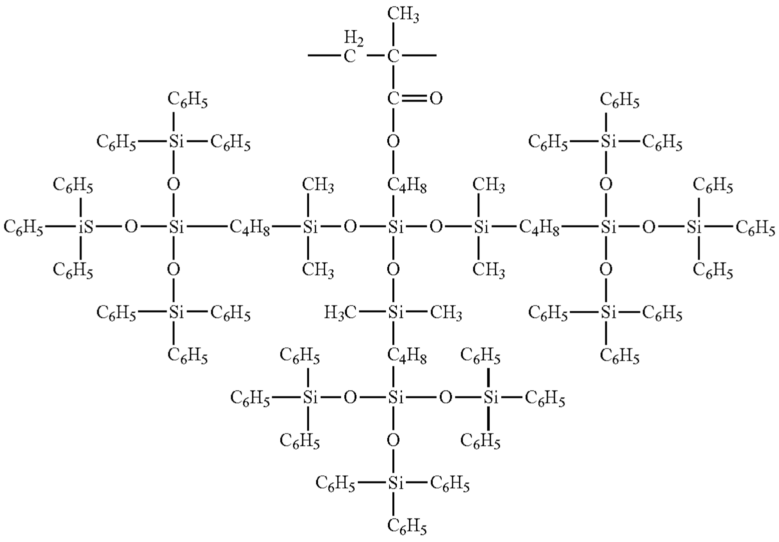

(1-6)

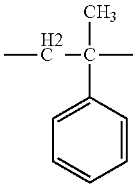

(1-7)

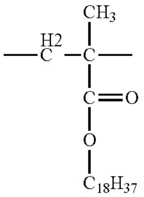

Production Examples C-30, C-31, C-33, and C-35

Compounds were each produced in the same manner as in Production Example C-29 except that the mixture to be dropped to the reaction solvent was changed as shown in Table 15. The resultant compounds were each analyzed in the same manner as in Production Example A-1.

Each of the resultant compounds was subjected to mechanical pulverization and classification in the same manner as in Production Example C-27 except that its classification conditions were changed as shown in Table 18. Thus, resin particles were obtained. Table 18 shows the mass-average particle diameters of the resin particles.

Production Example C-36

100 Parts by mass of a compound represented by an average molecular formula (3C), 39 parts by mass of butyl acrylate, 20 parts by mass of methyl methacrylate, 68 parts by mass of stearyl methacrylate, and 29 parts by mass of methyl styrene were dropped to a mixed solvent formed of 50 parts by mass of ethanol, 50 parts by mass of acetone, and 50 parts by mass of toluene, and then the contents were stirred at room temperature for 6 hours. Further, 0.4 part by mass of α,α'-azobisisobutyronitrile as a radical polymerization initiator was added to the resultant. Thus, a mixture was produced.

70 Parts by mass of isopropyl alcohol and 80 parts by mass of butyl acetate as reaction solvents were charged into a 1-L glass flask provided with a stirring machine, a condenser, and a temperature gauge. Under stirring, the mixture was dropped over 1 hour while a temperature of 80° C. was kept and a nitrogen gas was flowed. Further, a polymerization reaction was performed at 80° C. for 6 hours. After the reaction, the resultant was dried at 150° C. and a reduced pressure of 10 mmHg. Thus, a compound was obtained.

The resultant compound was analyzed in the same manner as in Production Example 1. In addition, the resultant compound was subjected to mechanical pulverization and classification in the same manner as in Production Example C-27 except that its classification conditions were changed as shown in Table 18. Thus, resin particles 10 were obtained.

(3C)

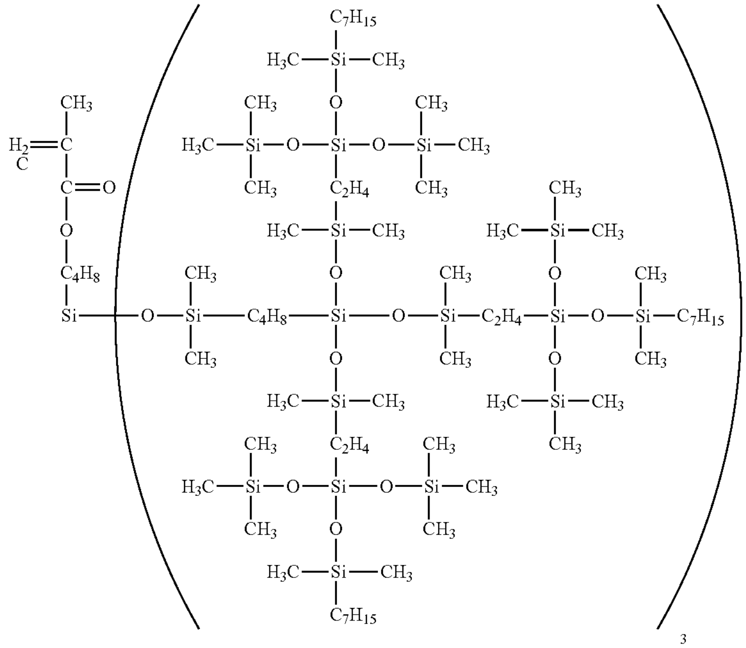

(3C-1)

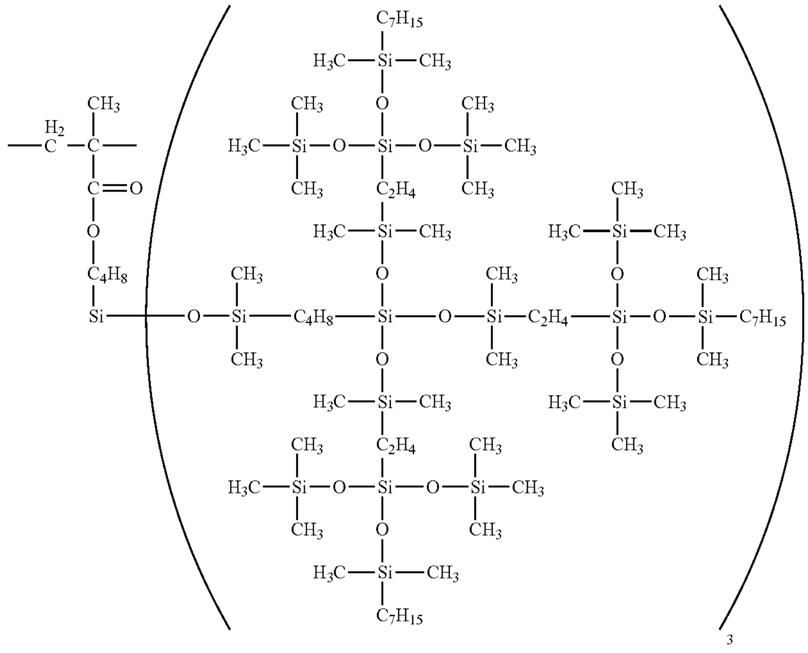

Production Examples C-37 to C-72

Compounds were each produced in the same manner as in Production Example C-36 except that the compound to be added to the mixed solvent was changed as shown in Table 16 to produce a mixture. The resultant compounds were each analyzed in the same manner as in Production Example A-1. It should be noted that, the term "polymerization initiator" and the term "chain transfer agent" shown in Table 16 mean α,α'-azobisisobutyronitrile and 3-mercaptopropyltrimethoxysilane, respectively.

Each of the resultant compounds was subjected to mechanical pulverization and classification in the same manner as in Production Example C-27 except that its classification conditions were changed as shown in Table 18. Thus, resin particles were obtained.

The compounds according to Production Examples C-27 to C-72 described above were each analyzed in the same manner as in Production Example A-1. Table 17 shows the results.

In addition, Table 18 shows the mass-average particle diameters of the resin particles 1 to 46 according to Production Examples C-27 to C-72 determined by the method described in Production Example C-27.

(3D)
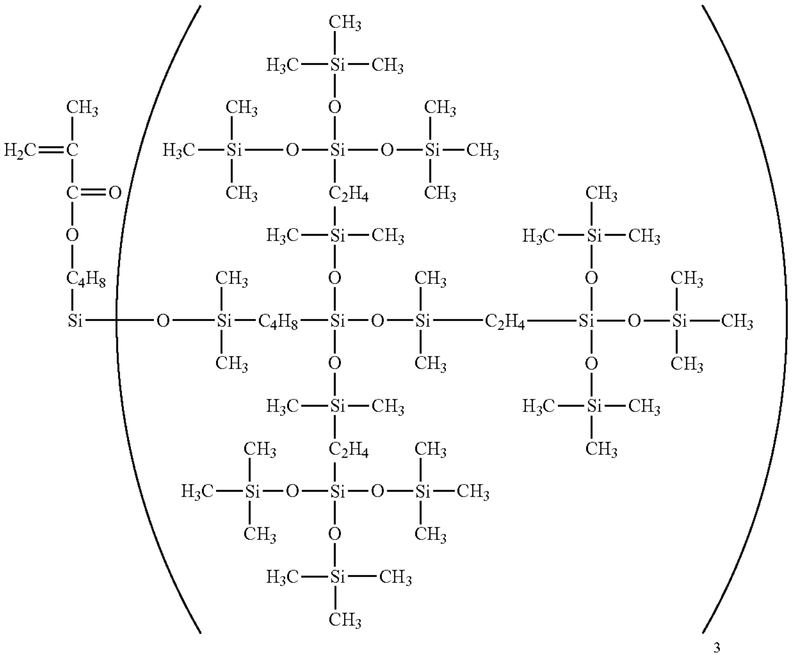
(3D-1)
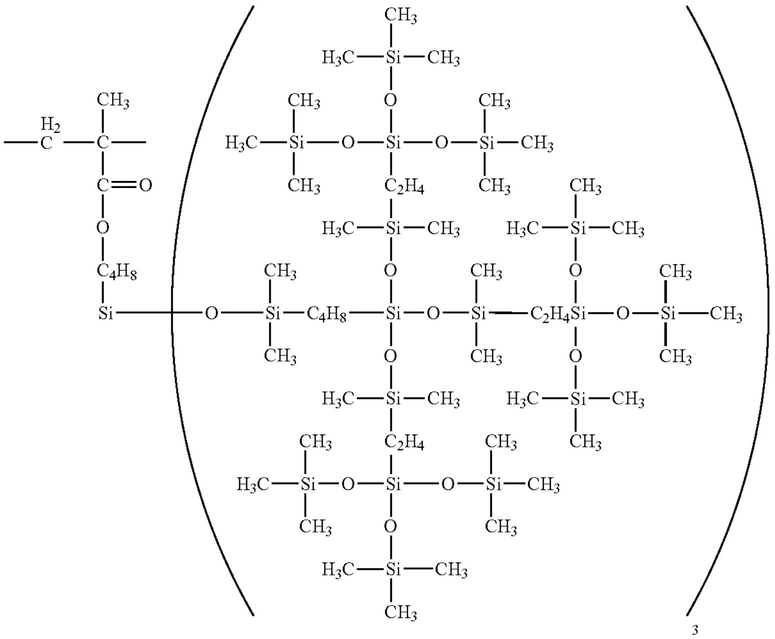
(3E)
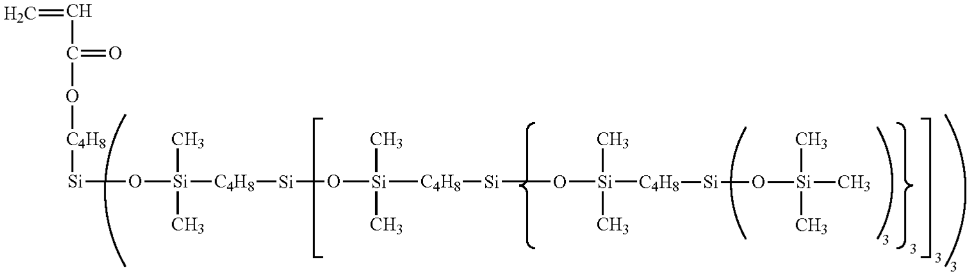

-continued
(3E-1)
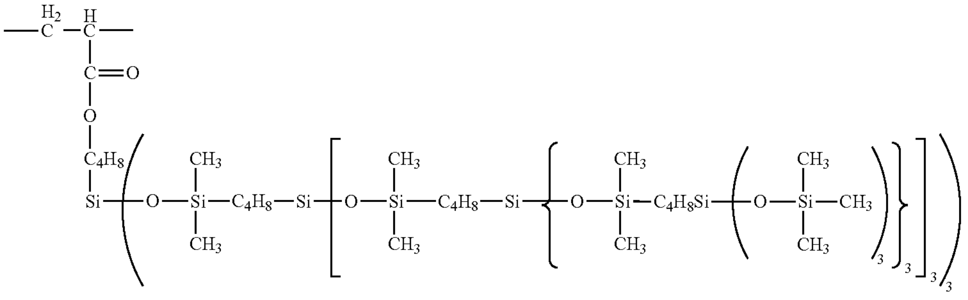
(3F)
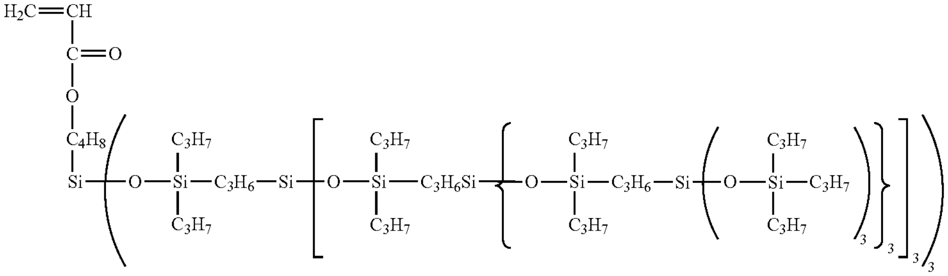
(3F-1)
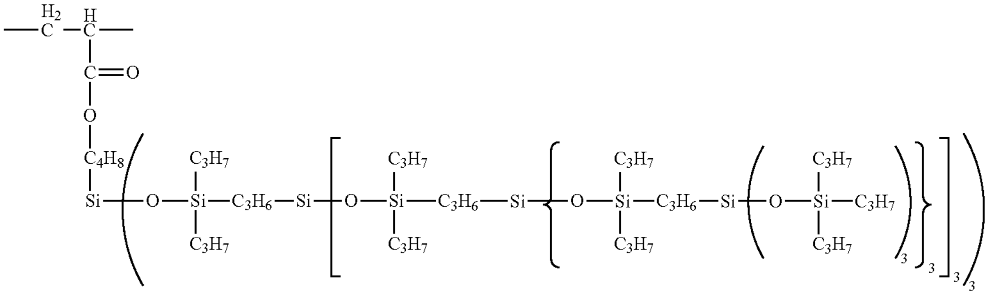
(3G)
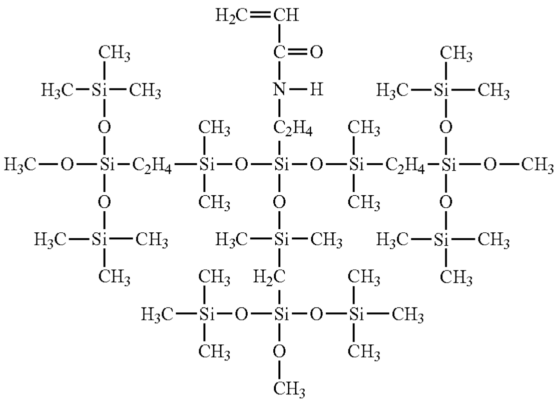
(3G-1)
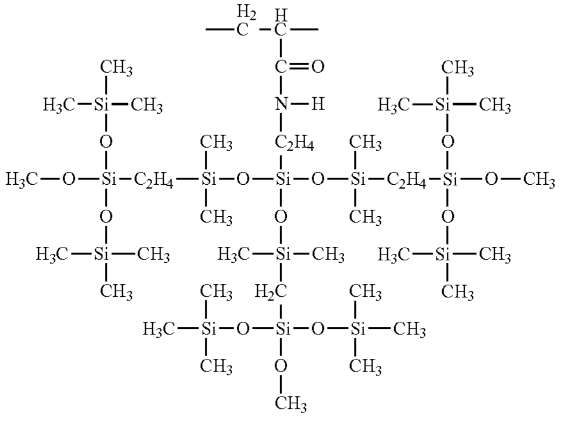

-continued
(3H)
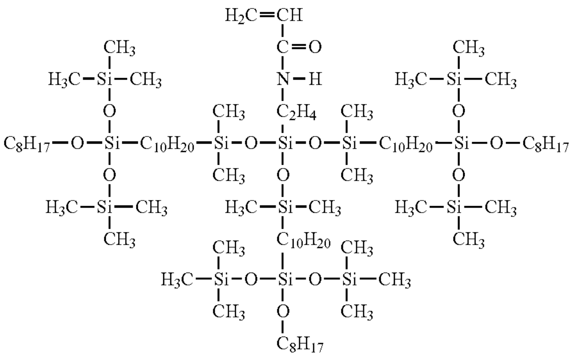
(3H-1)
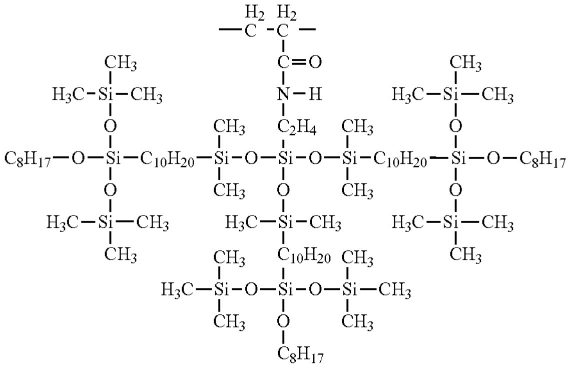
(3J)
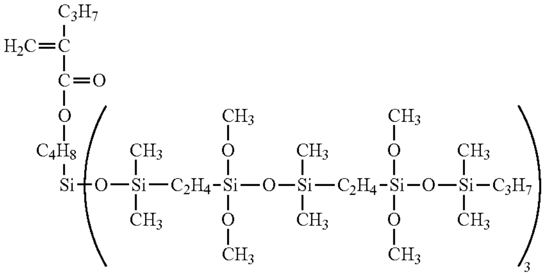
(3J-1)
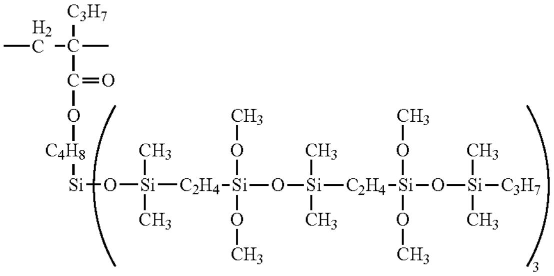
(3K)
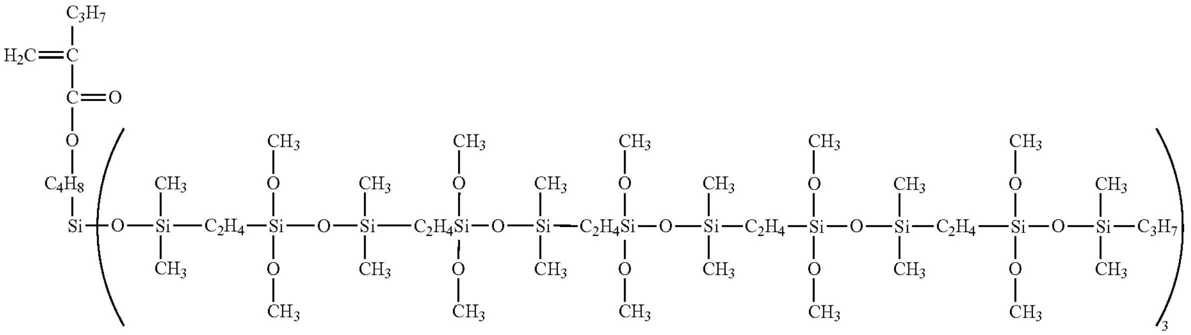
(3K-1)
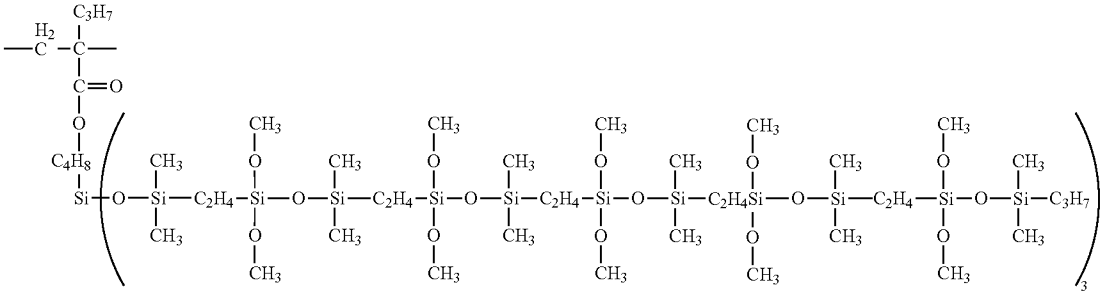

-continued
(3M)
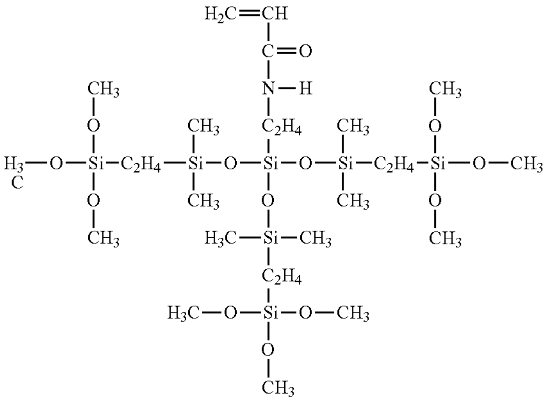
(3M-1)
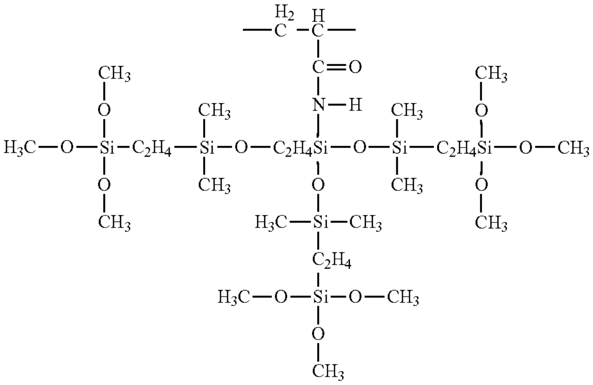
(3P)
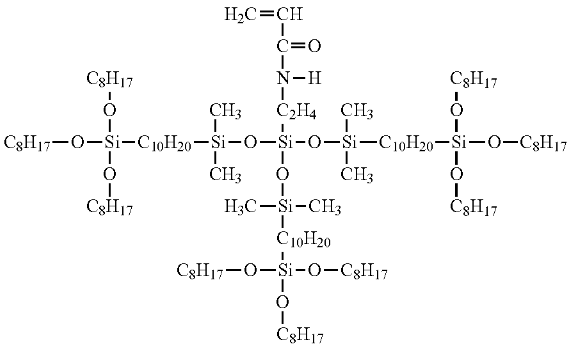
(3P-1)
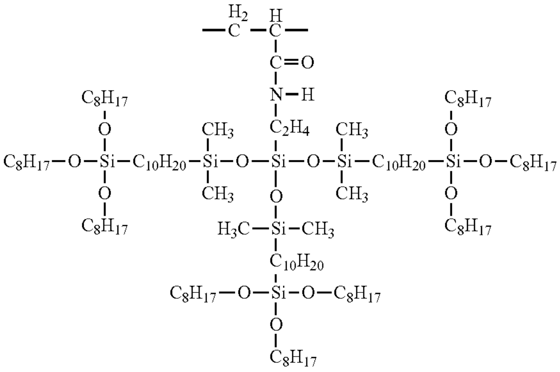
(3Q)
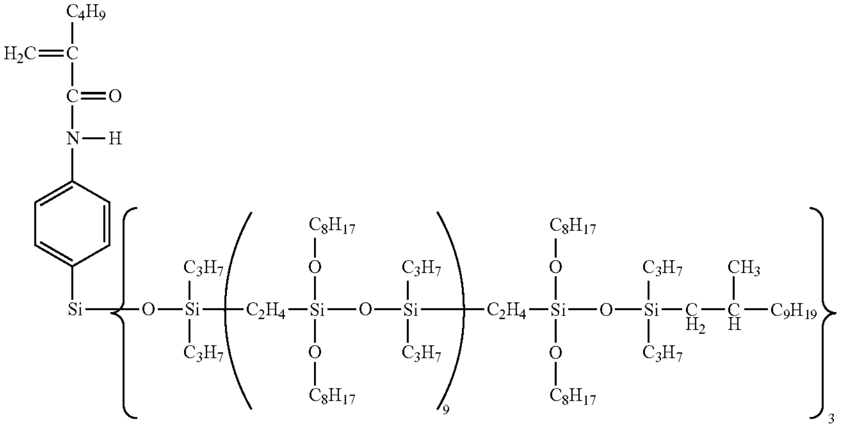

-continued (3Q-1)

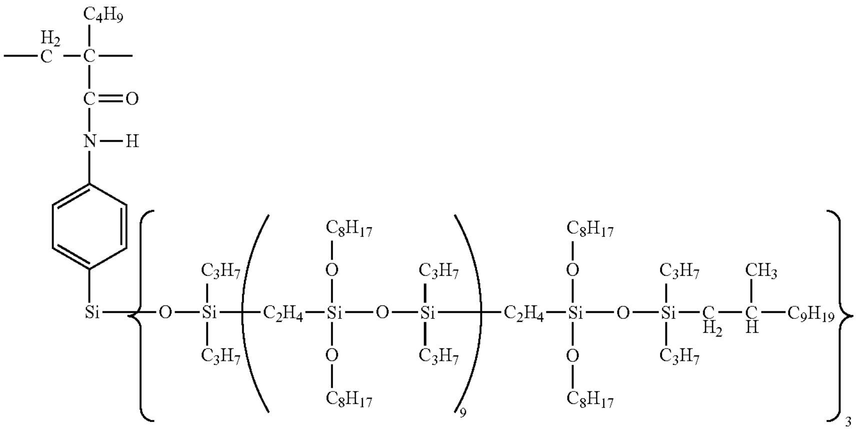

TABLE 15

| Production Example C | Mixture to be dropped: Compound having unit represented by formula (1): Average molecular formula | Part(s) by mass | Butyl acrylate Part(s) by mass | Methyl meth-acrylate Part(s) by mass | Methyl styrene Part(s) by mass | Stearyl meth-acrylate Part(s) by mass | Polymer-ization initiator Part(s) by mass |
|---|---|---|---|---|---|---|---|
| Production Example 27 | (1A) | 80 | 192 | 80 | | | 0.3 |
| Production Example 28 | (1A) | 95 | 170 | 61 | 12 | | 0.3 |
| Production Example 29 | (3B) | 120 | 41 | 8 | 18 | 135 | 0.3 |
| Production Example 30 | (3B) | 100 | 50 | 10 | | 170 | 0.3 |
| Production Example 31 | (3B) | 156 | 41 | | 14 | 122 | 0.3 |
| Production Example 32 | (1A) | 60 | 205 | 80 | | | 0.3 |
| Production Example 33 | (3B) | 210 | 38 | | 23 | 120 | 0.3 |
| Production Example 34 | (1A) | 60 | 205 | 80 | | | 0.3 |
| Production Example 35 | (3B) | 210 | 38 | | 23 | 120 | 0.3 |

Polymerization initiator: α,α'-azobisisobutyronitrile

TABLE 16

| Production Example C | Mixture to be added to mixed solvent: Compound having unit represented by formula (1): Average molecular formula | Part(s) by mass | Butyl acrylate Part(s) by mass | Methyl meth-acrylate Part(s) by mass | Methyl styrene Part(s) by mass | Stearyl meth-acrylate Part(s) by mass | Polymer-ization initiator Part(s) by mass | Chain transfer agent Part(s) by mass |
|---|---|---|---|---|---|---|---|---|
| Production Example 36 | (3C) | 100 | 39 | 20 | 29 | 68 | 0.4 | |
| Production Example 37 | (3C) | 160 | 20 | 16 | 46 | 135 | 0.4 | |
| Production Example 38 | (3C) | 180 | 15 | 18 | 40 | 120 | 0.5 | |
| Production Example 39 | (3D) | 80 | 38 | 40 | 23 | | 0.3 | |
| Production Example 40 | (3D) | 115 | 39 | 60 | 23 | | 0.3 | |

TABLE 16-continued

| Production Example C | Compound having unit represented by formula (1) Average molecular formula | Part(s) by mass | Butyl acrylate Part(s) by mass | Methyl meth-acrylate Part(s) by mass | Methyl styrene Part(s) by mass | Stearyl meth-acrylate Part(s) by mass | Polymer-ization initiator Part(s) by mass | Chain transfer agent Part(s) by mass |
|---|---|---|---|---|---|---|---|---|
| | Mixture to be added to mixed solvent | | | | | | | |
| Production Example 41 | (3C) | 60 | 51 | 40 | 12 | 68 | 0.4 | |
| Production Example 42 | (3D) | 184 | 39 | 50 | 23 | 34 | 0.3 | |
| Production Example 43 | (3C) | 60 | 51 | 40 | 12 | 68 | 0.4 | |
| Production Example 44 | (3D) | 184 | 39 | 50 | 23 | 34 | 0.3 | |
| Production Example 45 | (3E) | 240 | 30 | 32 | 14 | 55 | 0.8 | |
| Production Example 46 | (3E) | 240 | 50 | 28 | 10 | 55 | 0.8 | |
| Production Example 47 | (3E) | 270 | 31 | 30 | 9 | 70 | 0.8 | |
| Production Example 48 | (3F) | 225 | 15 | 6 | 14 | 60 | 0.7 | |
| Production Example 49 | (3F) | 300 | 15 | 8 | 28 | 14 | 0.7 | |
| Production Example 50 | (3E) | 150 | 38 | 50 | 6 | 68 | 0.8 | |
| Production Example 51 | (3F) | 300 | 11 | 6 | 28 | 3 | 0.7 | |
| Production Example 52 | (3E) | 150 | 38 | 50 | 6 | 68 | 0.8 | |
| Production Example 53 | (3F) | 300 | 11 | 6 | 28 | 3 | 0.7 | |
| Production Example 54 | (3G) | 80 | 192 | 100 | 12 | | 0.5 | |
| Production Example 55 | (3H) | 60 | 128 | | 29 | 85 | 0.6 | 0.09 |
| Production Example 56 | (3H) | 60 | 102 | | 46 | 135 | 0.6 | 0.10 |
| Production Example 57 | (3G) | 66 | 205 | | | 80 | 0.5 | |
| Production Example 58 | (3H) | 80 | 32 | 25 | 116 | 85 | 0.6 | 0.06 |
| Production Example 59 | (3J) | 45 | 51 | 40 | 46 | 103 | 0.3 | |
| Production Example 60 | (3K) | 56 | 51 | 30 | 60 | 100 | 0.4 | |
| Production Example 61 | (3K) | 46 | 13 | 170 | 58 | | 0.3 | 0.02 |
| Production Example 62 | (3J) | 24 | 64 | 30 | | 70 | 0.3 | |
| Production Example 63 | (3K) | 198 | 26 | | 46 | 68 | 0.3 | 0.02 |
| Production Example 64 | (3M) | 40 | 51 | 80 | | 135 | 0.5 | 0.08 |
| Production Example 65 | (3P) | 60 | 115 | | 35 | 101 | 0.5 | 0.01 |
| Production Example 66 | (3P) | 75 | 96 | | 29 | 170 | 0.5 | 0.01 |
| Production Example 67 | (3M) | 600 | 130 | | | 200 | 0.5 | 0.03 |
| Production Example 68 | (3P) | 82 | 58 | 15 | 35 | 150 | 0.5 | 0.08 |
| Production Example 69 | (3E) | 312 | | | | | 0.3 | |
| Production Example 70 | (3Q) | 400 | | | | | 0.5 | |
| Production Example 71 | (1J) | 40 | 64 | 10 | 23 | 170 | 0.3 | |
| Production Example 72 | (1K) | 75 | 64 | 20 | 40 | 170 | 0.3 | |

Polymerization initiator: α,α'-azobisisobutyronitrile, chain transfer agent: 3-mercaptopropyltrimethoxysilane

TABLE 17

| Production Example C | Unit represented by formula (1) Average molecular formula | Unit represented by formula (1) Percentage content | Any other unit (Percentage content) (1-1) | (1-2) | (1-6) | (1-7) | n | m | Weight-average molecular weight in terms of PS |
|---|---|---|---|---|---|---|---|---|---|
| Production Example 27 | (1A-1) | 2.5 | 63.5 | 34 | | | 6 | 230 | About 35,000 |
| Production Example 28 | (1A-1) | 3.3 | 63 | 29 | 4.7 | | 7 | 203 | About 35,000 |
| Production Example 29 | (3B-1) | 4 | 32 | 8 | 16 | 40 | 5 | 120 | About 40,000 |
| Production Example 30 | (3B-1) | 3 | 39 | 10 | | 48 | 3 | 100 | About 30,000 |
| Production Example 31 | (3B-1) | 6 | 38 | | 14 | 42 | 6 | 100 | About 41,000 |
| Production Example 32 | (1A-1) | 2 | 65 | 33 | | | 5 | 240 | About 35,000 |
| Production Example 33 | (3B-1) | 7 | 33 | | 22 | 38 | 7 | 85 | About 40,000 |
| Production Example 34 | (1A-1) | 2 | 65 | 33 | | | 5 | 240 | About 35,000 |
| Production Example 35 | (3B-1) | 7 | 33 | | 22 | 38 | 7 | 85 | About 40,000 |
| Production Example 36 | (3C-1) | 2 | 31 | 20 | 26 | 21 | 2 | 95 | About 25,000 |
| Production Example 37 | (3C-1) | 2 | 14 | 14 | 35 | 35 | 4 | 140 | About 47,000 |
| Production Example 38 | (3C-1) | 4 | 11 | 17 | 34 | 34 | 6 | 170 | About 63,000 |
| Production Example 39 | (3D-1) | 2 | 33 | 43 | 22 | | 2 | 90 | About 18,000 |
| Production Example 40 | (3D-1) | 2 | 27 | 53 | 18 | | 3 | 170 | About 23,000 |
| Production Example 41 | (3C-1) | 1 | 36 | 36 | 9 | 18 | 1 | 110 | About 23,000 |
| Production Example 42 | (3D-1) | 4 | 26 | 44 | 17 | 9 | 4 | 110 | About 33,000 |
| Production Example 43 | (3C-1) | 1 | 36 | 36 | 9 | 18 | 1 | 110 | About 23,000 |
| Production Example 44 | (3D-1) | 4 | 26 | 44 | 17 | 9 | 4 | 110 | About 33,000 |
| Production Example 45 | (3E-1) | 2 | 28 | 37 | 14 | 19 | 4 | 210 | About 93,000 |
| Production Example 46 | (3E-1) | 2 | 37 | 33 | 9 | 19 | 4 | 210 | About 93,000 |
| Production Example 47 | (3E-1) | 2 | 28 | 36 | 9 | 25 | 7 | 275 | About 137,000 |
| Production Example 48 | (3F-1) | 2 | 25 | 12 | 24 | 37 | 3 | 160 | About 107,000 |
| Production Example 49 | (3F-1) | 3 | 24 | 16 | 49 | 8 | 3 | 120 | About 91,000 |
| Production Example 50 | (3E-1) | 1 | 28 | 47 | 5 | 19 | 2 | 210 | About 62,000 |
| Production Example 51 | (3F-1) | 3 | 22 | 15 | 58 | 2 | 5 | 133 | About 116,000 |
| Production Example 52 | (3E-1) | 1 | 28 | 47 | 5 | 19 | 2 | 210 | About 62,000 |
| Production Example 53 | (3F-1) | 3 | 22 | 15 | 58 | 2 | 5 | 133 | About 116,000 |
| Production Example 54 | (3G-1) | 3 | 56 | 37 | 4 | | 7 | 260 | About 38,000 |
| Production Example 55 | (3H-1) | 2 | 66 | | 16 | 16 | 7 | 300 | About 60,000 |
| Production Example 56 | (3H-1) | 2 | 49 | | 25 | 24 | 8 | 400 | About 86,000 |
| Production Example 57 | (3G-1) | 2 | 65 | | | 33 | 6 | 240 | About 35,000 |
| Production Example 58 | (3H-1) | 3 | 14 | 14 | 55 | 14 | 9 | 350 | About 67,000 |
| Production Example 59 | (3J-1) | 2 | 26 | 26 | 26 | 20 | 3 | 150 | About 28,000 |
| Production Example 60 | (3K-1) | 1 | 26 | 20 | 33 | 20 | 2 | 150 | About 30,000 |
| Production Example 61 | (3K-1) | 1 | 9 | | 45 | 45 | 3 | 220 | About 60,000 |
| Production Example 62 | (3J-1) | 1 | 49 | 30 | | 20 | 1 | 100 | About 19,000 |

TABLE 17-continued

| Production Example C | Unit represented by formula (1) Average molecular formula | Percentage content | Any other unit (Percentage content) (1-1) | (1-2) | (1-6) | (1-7) | n | m | Weight-average molecular weight in terms of PS |
|---|---|---|---|---|---|---|---|---|---|
| Production Example 63 | (3K-1) | 7 | 23 | | 46 | 23 | 14 | 200 | About 85,000 |
| Production Example 64 | (3M-1) | 3 | 24 | 49 | | 24 | 13 | 400 | About 77,000 |
| Production Example 65 | (3P-1) | 2 | 60 | | 19 | 19 | 5 | 250 | About 52,000 |
| Production Example 66 | (3P-1) | 2 | 49 | | 16 | 33 | 4 | 300 | About 74,000 |
| Production Example 67 | (3M-1) | 2.5 | 32.5 | | | 65 | 7 | 300 | About 39,000 |
| Production Example 68 | (3P-1) | 3 | 32 | 11 | 22 | 32 | 14 | 450 | About 114,000 |
| Production Example 69 | (3E-1) | 100 | | | | | 4 | 0 | About 54,000 |
| Production Example 70 | (3Q-1) | 100 | | | | | 3 | 0 | About 43,000 |
| Production Example 71 | (1J-1) | 7 | 36 | 7 | 14 | 36 | 0 | 0 | About 30,000 |
| Production Example 72 | (1K-1) | 2 | 32 | 13 | 22 | 31 | 0 | 0 | About 37,000 |

TABLE 18

| Production Example C | Circumferential speed of rotor (m/s) | Airflow rate ($m^3$/min) | Produced resin particles | Average particle diameter (μm) |
|---|---|---|---|---|
| Production Example 27 | 50 | 7.5 | Resin particles 1 | 20 |
| Production Example 28 | 60 | 8.5 | Resin particles 2 | 6 |
| Production Example 29 | 50 | 8 | Resin particles 3 | 12 |
| Production Example 30 | 50 | 8 | Resin particles 4 | 14 |
| Production Example 31 | 60 | 8.5 | Resin particles 5 | 4 |
| Production Example 32 | 60 | 8.5 | Resin particles 6 | 4 |
| Production Example 33 | 50 | 7.5 | Resin particles 7 | 20 |
| Production Example 34 | 65 | 8.7 | Resin particles 8 | 2 |
| Production Example 35 | 50 | 7 | Resin particles 9 | 25 |
| Production Example 36 | 50 | 8 | Resin particles 10 | 12 |
| Production Example 37 | 60 | 8.5 | Resin particles 11 | 4 |
| Production Example 38 | 50 | 7.5 | Resin particles 12 | 20 |
| Production Example 39 | 60 | 8.5 | Resin particles 13 | 5 |
| Production Example 40 | 50 | 7.5 | Resin particles 14 | 20 |
| Production Example 41 | 50 | 8 | Resin particles 15 | 14 |
| Production Example 42 | 60 | 8.5 | Resin particles 16 | 6 |
| Production Example 43 | 50 | 7.5 | Resin particles 17 | 25 |
| Production Example 44 | 65 | 8.7 | Resin particles 18 | 1 |
| Production Example 45 | 50 | 8 | Resin particles 19 | 19 |
| Production Example 46 | 60 | 8.5 | Resin particles 20 | 3 |

TABLE 18-continued

| Production Example C | Circumferential speed of rotor (m/s) | Airflow rate ($m^3$/min) | Produced resin particles | Average particle diameter (μm) |
|---|---|---|---|---|
| Production Example 47 | 50 | 7.5 | Resin particles 21 | 19 |
| Production Example 48 | 60 | 8.5 | Resin particles 22 | 4 |
| Production Example 49 | 50 | 8 | Resin particles 23 | 15 |
| Production Example 50 | 60 | 8.5 | Resin particles 24 | 3 |
| Production Example 51 | 60 | 8.5 | Resin particles 25 | 10 |
| Production Example 52 | 50 | 7.5 | Resin particles 26 | 25 |
| Production Example 53 | 65 | 8.7 | Resin particles 27 | 1 |
| Production Example 54 | 50 | 8 | Resin particles 28 | 13 |
| Production Example 55 | 55 | 8 | Resin particles 29 | 10 |
| Production Example 56 | 55 | 8 | Resin particles 30 | 10 |
| Production Example 57 | 50 | 8 | Resin particles 31 | 15 |
| Production Example 58 | 50 | 8 | Resin particles 32 | 18 |
| Production Example 59 | 60 | 8.5 | Resin particles 33 | 8 |
| Production Example 60 | 60 | 8.5 | Resin particles 34 | 5 |
| Production Example 61 | 50 | 7.5 | Resin particles 35 | 20 |
| Production Example 62 | 55 | 8 | Resin particles 36 | 12 |
| Production Example 63 | 50 | 8 | Resin particles 37 | 17 |
| Production Example 64 | 60 | 8.5 | Resin particles 38 | 3 |
| Production Example 65 | 50 | 7.5 | Resin particles 39 | 20 |
| Production Example 66 | 60 | 8.5 | Resin particles 40 | 5 |

TABLE 18-continued

| Production Example C | Circumferential speed of rotor (m/s) | Airflow rate ($m^3$/min) | Produced resin particles | Average particle diameter (μm) |
|---|---|---|---|---|
| Production Example 67 | 60 | 8.5 | Resin particles 41 | 8 |
| Production Example 68 | 55 | 8 | Resin particles 42 | 15 |
| Production Example 69 | 65 | 8.7 | Resin particles 43 | 1 |
| Production Example 70 | 50 | 7 | Resin particles 44 | 33 |
| Production Example 71 | 60 | 8.5 | Resin particles 45 | 6 |
| Production Example 72 | 55 | 8 | Resin particles 46 | 12 |

Example C-51

1.12 Grams of the resin particles 1 were added to a dispersion liquid prepared in the same manner as in Example B-33. After that, dispersion was performed with a paint shaker dispersing machine for 1 hour, and then the glass beads were removed. Thus, an application liquid for a surface layer was obtained. The solution was applied to a roller member having an elastic layer and was then heated in the same manner as in Example A-1. Thus, a charging roller was produced.

The produced charging roller was subjected to electrical resistance measurement, C set amount measurement, and a C set image evaluation in the same manner as in Example A-1.

In addition, the hardness of the resin particles was measured by the following measurement method. A NanoIndenter (manufactured by MTS) was used as a measuring machine. Measurement conditions are as follows: head used in indentation test; DCM, test mode; Continuous Stiffness Measurement (CSN), and used indenter; Berkovich type diamond indenter. In addition, measurement parameters were set as follows: allowable drift rate: 0.05 nm/s, frequency target: 45.0 Hz, harmonic displacement target: 1.0 nm, strain rate target: 0.05 l/S, and depth limit: 2,000 nm.

A small piece of the surface layer was obtained by cutting the small piece out of the surface layer with a razor. A resin particle in the small piece was cut with a razor, and then the section of the resin particle was observed. Hardness measurement was performed on the section of the resin particle with the apparatus. A resin particle as an object of the hardness measurement was such that a circle-equivalent diameter was calculated from the sectional area of the resin particle and the diameter fell within the range of 90% to 110% of the average particle diameter of the resin particles to be described later. Then, the measurement was performed on 100 resin particles, and then the arithmetic average of the measured values was calculated. Table 19-1 shows the result.

(Surface Roughness of Charging Roller)

The ten-point average roughness Rzjis of the surface of the charging roller and the depression-protrusion average interval RSm of the surface were measured based on a surface roughness specification by Japanese Industrial Standards (JIS) B0601-1994. The measurement was performed with a surface roughness-measuring machine (trade name: SE-3500, manufactured by Kosaka Laboratory Ltd.). Adopted as the ten-point average roughness Rzjis was the average of values measured at six sites of the surface of the charging member selected at random. The depression-protrusion average interval RSm was determined as described below. Six sites of the charging member were selected at random, and then ten depression-protrusion intervals were measured at each of the measurement sites. The average of the measured values was adopted as the RSm. At this time, a cutoff value was set to 0.8 mm, an evaluation length was set to 8 mm, and a Gaussian filter was used as a cutoff filter.

(Evaluation for Hazy Image)

(Discharge Idle Rotation Acceleration Test)

A color laser printer (trade name: LBP5400, manufactured by Canon Inc.) was reconstructed so as to output A4 size paper in its vertical direction at a speed of 200 mm/sec. An attached charging roller was detached from a process cartridge (for a black color) for the printer, and then the produced charging roller was set. In addition, the charging roller was brought into abutment with a photosensitive member at a pressing force by springs of 4.9 N at one end, i.e., a total of 9.8 N at both ends. Next, a monochromatic solid image was printed on 2 sheets under a 23° C./50% RH environment (NN environment). After that, the photosensitive member was continuously rotated for 1 hour in a state in which a DC voltage of −1,100 V was applied to the charging roller. The foregoing was repeated 20 times.

After that, an image was output on one sheet, and then the rotation of the electrophotographic apparatus was stopped. After that, an image-forming operation was restarted. The foregoing operation was repeated (intermittent endurance at a print percentage of 1%). Thus, an image output endurance test of a total of 5,000 sheets was performed.

The test was performed under each of an environment having a temperature of 23° C. and a humidity of 50% RH(NN environment, hereinafter "NN"), and an environment having a temperature of 15° C. and a humidity of 10% RH (LL environment, hereinafter "LL"). A halftone image was output at the time of each of 1,000-th, 3,000-th, and 5,000-th sheets in the endurance test, and then the image was evaluated for a state of occurrence of a hazy image. The evaluation for the state of occurrence was performed by the following evaluation criteria.

(Evaluation Criteria for Hazy Image)

Rank 1: No hazy image occurs.

Rank 2: A hazy image occurs only in an extremely slight fashion, and is at such a level as to be nearly incapable of being observed.

Rank 3: The occurrence of a hazy image is observed in part of the image, but no problems arise in practical use.

Rank 4: A hazy image occurs in the entire image and the quality of the image remarkably deteriorates.

Example C-52

Preparation of Application Liquid for Surface Layer

Composite conductive fine particles were added so that the amount of the composite conductive fine particles was 30 parts by mass with respect to 100 parts by mass of the solid content of an aqueous urethane resin "Superflex 460" (trade name, manufactured by Dai-ichi Kogyo Seiyaku Co., Ltd., solid content: 38%) as a binder resin. Thus, a mixed solution was prepared.

200 Grams of the mixed solution were loaded into a glass bottle having an internal volume of 450 mL together with 200 g of glass beads having an average particle diameter of 0.5 mm as media, and then dispersion was performed with a paint shaker dispersing machine for 5 hours. After that, the resin particles 2 were added so that the amount of the resin particles 2 was 50 parts by mass with respect to 100 parts by mass of the solid content of the binder resin. Then, dispersion was performed for 20 minutes, followed by the removal of the glass beads. Thus, an application liquid for a surface layer was obtained.

The application liquid for a surface layer was applied to a roller member having an elastic layer once by dipping in the same manner as in Example C-51. After that, the liquid was cured with a circulating hot air dryer at 80° C. for 5 minutes. Thus, a charging roller having a surface layer formed on the elastic layer was obtained. The produced charging roller was evaluated in the same manner as in Example C-51.

Examples C-53 to C-94, and Comparative Examples C-8 and C-9

Charging rollers were each obtained in the same manner as in Example C-52 except that the kind and addition amount of resin particles to be added to the application liquid for a surface layer were changed as shown in each of Table 19-1, Table 19-2, and Table 19-3. In each of Table 19-1, Table 19-2, and Table 19-3, the addition amount of the resin particles was represented in the unit "part(s) by mass" to be added to 100 parts by mass of the solid content of the binder resin.

Table 19-1, Table 19-2, and Table 19-3 show the surface roughnesses, electrical resistances, hardnesses of the resin particles, and C set image evaluations of the charging rollers according to Examples C-51 to C-94, and Comparative Examples C-8 and C-9. In addition, a hazy image evaluation was performed in the same manner as in Example C-51. Table 20-1, Table 20-2, and Table 20-3 show the results.

As shown in Table 19-1 to Table 19-3 and Table 20-1 to Table 20-3, the charging roller according to the embodiments can be preferably incorporated into an electrophotographic apparatus or a process cartridge because the occurrence of each of a C set image and a hazy image is suppressed.

TABLE 19-1

| Example C | Resin particles No. | Resin particles Addition amount (part(s) by mass) | Hardness ($\times 10^{-4}$ N) | Surface roughness Rzjis (μm) | Surface roughness RSm (μm) | Electrical resistance of charging roller (Ω) | C set rank | C set amount (μm) |
|---|---|---|---|---|---|---|---|---|
| 51 | 1 | 5 | 4.8 | 19 | 135 | $6.5 \times 10^5$ | 1 | 8 |
| 52 | 2 | 50 | 4.0 | 5 | 35 | $5.5 \times 10^4$ | 1 | 8 |
| 53 | 4 | 10 | 2.8 | 10 | 60 | $3.2 \times 10^5$ | 1 | 8 |
| 54 | 3 | 10 | 3.1 | 13 | 80 | $3.5 \times 10^5$ | 1 | 8 |
| 55 | 5 | 150 | 1.1 | 2 | 18 | $5.2 \times 10^4$ | 1 | 10 |
| 56 | 6 | 75 | 5.8 | 3 | 28 | $3.8 \times 10^4$ | 1 | 8 |
| 57 | 7 | 5 | 0.5 | 18 | 130 | $8.1 \times 10^5$ | 2 | 10 |
| 58 | 8 | 150 | 5.8 | 1 | 15 | $2.6 \times 10^4$ | 1 | 8 |
| 59 | 9 | 3 | 0.5 | 23 | 180 | $9.3 \times 10^5$ | 2 | 10 |
| 60 | 10 | 10 | 5.0 | 10 | 60 | $4.6 \times 10^5$ | 1 | 8 |
| 61 | 11 | 150 | 4.2 | 2 | 18 | $7.2 \times 10^4$ | 1 | 8 |
| 62 | 12 | 5 | 3.3 | 18 | 130 | $6.8 \times 10^5$ | 1 | 8 |
| 63 | 13 | 75 | 2.6 | 3 | 28 | $2.7 \times 10^5$ | 1 | 8 |
| 64 | 14 | 5 | 1.0 | 19 | 135 | $5.6 \times 10^5$ | 1 | 9 |
| 65 | 15 | 10 | 6.1 | 13 | 80 | $4.4 \times 10^5$ | 1 | 8 |
| 66 | 16 | 50 | 0.4 | 5 | 35 | $8.9 \times 10^4$ | 2 | 10 |
| 67 | 17 | 10 | 6.1 | 23 | 100 | $6.5 \times 10^5$ | 1 | 8 |
| 68 | 18 | 75 | 0.4 | 1 | 30 | $2.2 \times 10^4$ | 2 | 10 |
| 69 | 19 | 5 | 4.6 | 18 | 130 | $6.7 \times 10^5$ | 1 | 8 |
| 70 | 20 | 75 | 4.1 | 3 | 28 | $5.5 \times 10^4$ | 1 | 8 |

TABLE 19-2

| Example C | Resin particles No. | Addition amount (part(s) by mass) | Hardness (×10$^{-4}$ N) | Surface roughness Rzjis (μm) | Surface roughness RSm (μm) | Electrical resistance of charging roller (Ω) | C set rank | C set amount (μm) |
|---|---|---|---|---|---|---|---|---|
| 71 | 21 | 5 | 3.7 | 19 | 15 | 6.2 × 10$^5$ | 1 | 8 |
| 72 | 22 | 50 | 2.5 | 5 | 35 | 2.5 × 10$^5$ | 1 | 8 |
| 73 | 23 | 10 | 1.3 | 13 | 80 | 3.1 × 10$^5$ | 1 | 10 |
| 74 | 24 | 150 | 5.5 | 2 | 18 | 6.5 × 10$^4$ | 1 | 8 |
| 75 | 25 | 10 | 0.8 | 10 | 60 | 1.1 × 10$^5$ | 2 | 9 |
| 76 | 26 | 5 | 5.5 | 23 | 160 | 1.2 × 10$^6$ | 1 | 8 |
| 77 | 27 | 75 | 0.8 | 1 | 20 | 1.8 × 10$^4$ | 2 | 10 |
| 78 | 28 | 15 | 4.9 | 13 | 60 | 6.5 × 10$^5$ | 1 | 8 |
| 79 | 29 | 5 | 2.7 | 8 | 55 | 8.3 × 10$^4$ | 1 | 8 |
| 80 | 30 | 75 | 1.5 | 3 | 25 | 2.7 × 10$^4$ | 2 | 10 |
| 81 | 31 | 10 | 5.8 | 14 | 110 | 6.4 × 10$^5$ | 1 | 8 |
| 82 | 32 | 10 | 0.4 | 17 | 82 | 4.4 × 10$^5$ | 2 | 11 |
| 83 | 33 | 10 | 4.2 | 8 | 60 | 6.2 × 10$^5$ | 1 | 8 |
| 84 | 34 | 75 | 3.1 | 4 | 25 | 7.8 × 10$^4$ | 1 | 8 |
| 85 | 35 | 10 | 1.8 | 19 | 100 | 1.1 × 10$^6$ | 2 | 10 |
| 86 | 36 | 10 | 6.2 | 11 | 60 | 3.3 × 10$^5$ | 1 | 8 |
| 87 | 37 | 5 | 0.3 | 15 | 140 | 7.8 × 10$^5$ | 2 | 12 |
| 88 | 38 | 75 | 4.8 | 3 | 28 | 4.2 × 10$^4$ | 1 | 8 |
| 89 | 39 | 10 | 3.0 | 18 | 110 | 9.2 × 10$^5$ | 1 | 9 |
| 90 | 40 | 50 | 1.1 | 4 | 33 | 2.2 × 10$^4$ | 2 | 10 |
| 91 | 41 | 10 | 6.0 | 8 | 62 | 4.7 × 10$^5$ | 1 | 9 |
| 92 | 42 | 5 | 0.5 | 15 | 125 | 7.7 × 10$^5$ | 2 | 12 |
| 93 | 43 | 150 | 0.7 | 0.8 | 15 | 1.1 × 10$^4$ | 3 | 14 |
| 94 | 44 | 2 | 0.1 | 32 | 210 | 4.5 × 10$^6$ | 3 | 15 |

TABLE 19-3

| Comparative Example C | Resin particles No. | Addition amount (part(s) by mass) | Hardness (×10$^{-4}$ N) | Surface roughness Rzjis (μm) | Surface roughness RSm (μm) | Electrical resistance of charging roller (Ω) | C set rank | C set amount (μm) |
|---|---|---|---|---|---|---|---|---|
| 8 | 45 | 40 | 2.2 | 5 | 55 | 3.5 × 10$^4$ | 4 | 18 |
| 9 | 46 | 10 | 4.8 | 10 | 65 | 2.7 × 10$^5$ | 4 | 18 |

TABLE 20-1

| Example C | Hazy image level: Environment having temperature of 23° C. and humidity of 50% RH (NN) 1,000-th sheet | 3,000-th sheet | 5,000-th sheet | Environment having temperature of 15° C. and humidity of 10% RH (LL) 1,000-th sheet | 3,000-th sheet | 5,000-th sheet |
|---|---|---|---|---|---|---|
| 51 | 1 | 1 | 1 | 1 | 1 | 1 |
| 52 | 1 | 1 | 1 | 1 | 1 | 1 |
| 53 | 1 | 1 | 1 | 1 | 1 | 1 |
| 54 | 1 | 1 | 1 | 1 | 1 | 1 |
| 55 | 1 | 1 | 1 | 1 | 1 | 1 |
| 56 | 1 | 1 | 1 | 1 | 1 | 2 |
| 57 | 1 | 1 | 1 | 1 | 1 | 2 |
| 58 | 1 | 1 | 2 | 1 | 2 | 2 |
| 59 | 1 | 1 | 2 | 1 | 1 | 2 |
| 60 | 1 | 1 | 1 | 1 | 1 | 1 |
| 61 | 1 | 1 | 1 | 1 | 1 | 1 |
| 62 | 1 | 1 | 1 | 1 | 1 | 1 |
| 63 | 1 | 1 | 1 | 1 | 1 | 1 |
| 64 | 1 | 1 | 1 | 1 | 1 | 1 |
| 65 | 1 | 1 | 1 | 1 | 1 | 2 |
| 66 | 1 | 1 | 1 | 1 | 1 | 2 |
| 67 | 1 | 1 | 2 | 1 | 1 | 2 |
| 68 | 1 | 1 | 2 | 1 | 1 | 2 |

TABLE 20-1-continued

| Example C | Hazy image level: Environment having temperature of 23° C. and humidity of 50% RH (NN) 1,000-th sheet | 3,000-th sheet | 5,000-th sheet | Environment having temperature of 15° C. and humidity of 10% RH (LL) 1,000-th sheet | 3,000-th sheet | 5,000-th sheet |
|---|---|---|---|---|---|---|
| 69 | 1 | 1 | 1 | 1 | 1 | 1 |
| 70 | 1 | 1 | 1 | 1 | 1 | 1 |

TABLE 20-2

| Example C | Hazy image level: Environment having temperature of 23° C. and humidity of 50% RH (NN) 1,000-th sheet | 3,000-th sheet | 5,000-th sheet | Environment having temperature of 15° C. and humidity of 10% RH (LL) 1,000-th sheet | 3,000-th sheet | 5,000-th sheet |
|---|---|---|---|---|---|---|
| 71 | 1 | 1 | 1 | 1 | 1 | 1 |
| 72 | 1 | 1 | 1 | 1 | 1 | 1 |

TABLE 20-2-continued

| | Hazy image level | | | | | |
|---|---|---|---|---|---|---|
| | Environment having temperature of 23° C. and humidity of 50% RH (NN) | | | Environment having temperature of 15° C. and humidity of 10% RH (LL) | | |
| Example C | 1,000-th sheet | 3,000-th sheet | 5,000-th sheet | 1,000-th sheet | 3,000-th sheet | 5,000-th sheet |
| 73 | 1 | 1 | 1 | 1 | 1 | 1 |
| 74 | 1 | 1 | 1 | 1 | 1 | 2 |
| 75 | 1 | 1 | 1 | 1 | 1 | 2 |
| 76 | 1 | 1 | 2 | 1 | 2 | 2 |
| 77 | 1 | 1 | 2 | 1 | 1 | 2 |
| 78 | 1 | 1 | 3 | 1 | 2 | 3 |
| 79 | 1 | 1 | 3 | 1 | 2 | 3 |
| 80 | 1 | 1 | 3 | 1 | 2 | 3 |
| 81 | 1 | 3 | 3 | 2 | 3 | 3 |
| 82 | 1 | 3 | 3 | 2 | 3 | 3 |
| 83 | 1 | 1 | 3 | 1 | 2 | 3 |
| 84 | 1 | 1 | 3 | 1 | 2 | 3 |
| 85 | 1 | 1 | 3 | 1 | 2 | 3 |
| 86 | 1 | 3 | 3 | 2 | 3 | 3 |
| 87 | 1 | 3 | 3 | 2 | 3 | 3 |
| 88 | 1 | 1 | 3 | 1 | 2 | 3 |
| 89 | 1 | 1 | 3 | 1 | 2 | 3 |
| 90 | 1 | 1 | 3 | 1 | 2 | 3 |
| 91 | 2 | 3 | 3 | 2 | 3 | 3 |
| 92 | 2 | 3 | 3 | 2 | 3 | 3 |
| 93 | 2 | 3 | 3 | 3 | 3 | 3 |
| 94 | 2 | 3 | 3 | 3 | 3 | 3 |

TABLE 20-3

| | Hazy image level | | | | | |
|---|---|---|---|---|---|---|
| | Environment having temperature of 23° C. and humidity of 50% RH (NN) | | | Environment having temperature of 15° C. and humidity of 10% RH (LL) | | |
| Comparative Example C | 1,000-th sheet | 3,000-th sheet | 5,000-th sheet | 1,000-th sheet | 3,000-th sheet | 5,000-th sheet |
| 8 | 3 | 4 | 4 | 3 | 4 | 4 |
| 9 | 3 | 4 | 4 | 3 | 4 | 4 |

Example D

Hereinafter, an example is specifically described by letting n represent the number of units each represented by the formula (1) in a compound having a unit represented by the formula (1) and letting m represent the number of units each represented by the formula (4) therein.

Production Example D-1

Production of Compound D-1

300 Parts by mass of isopropyl alcohol as a solvent were charged into a 1-L glass flask provided with a stirring machine, a condenser, and a temperature gauge. Under stirring, a mixture of 95 parts by mass of a compound represented by the following average molecular formula (D-1A), 78 parts by mass of butyl acrylate, 132 parts by mass of methyl methacrylate, and 0.3 part by mass of a radical polymerization initiator (α,α'-azobisisobutyronitrile) was dropped to the flask over 1 hour while a temperature of 80° C. was kept and a nitrogen gas was flowed. Further, a polymerization reaction was performed at 80° C. for 6 hours. After part of isopropyl alcohol had been removed under reduced pressure, the remaining solution was charged into a large amount of methanol, and then the mixture was stirred. After that, the mixture was left at rest. Thus, a precipitate was obtained. The precipitate was dried under reduced pressure. Thus, a compound D-1 was obtained.

(D-1A)

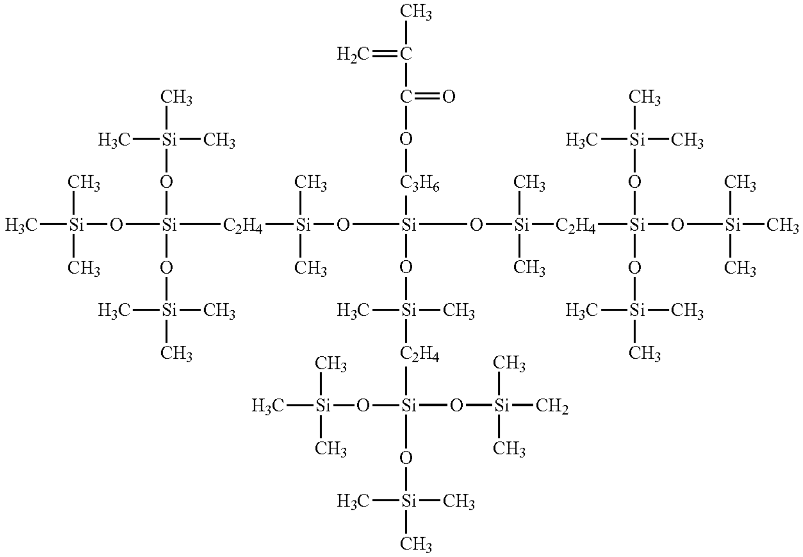

The resultant compound D-1 was analyzed by $^{29}$Si-NMR, $^{13}$C-NMR, and FT-IR. As a result, the compound D-1 had α, β, and γ units represented by the following formula (D-A-1). In addition, the contents of the α unit, the β unit, and the γ unit with respect to the entirety of the compound were 3.5%, 66%, and 30.5%, respectively, and n and m represented 7 and 193, respectively. The compound had a weight-average molecular weight in terms of polystyrene by gel permeation chromatography (GPC) of about 30,000.

(D-A-1)

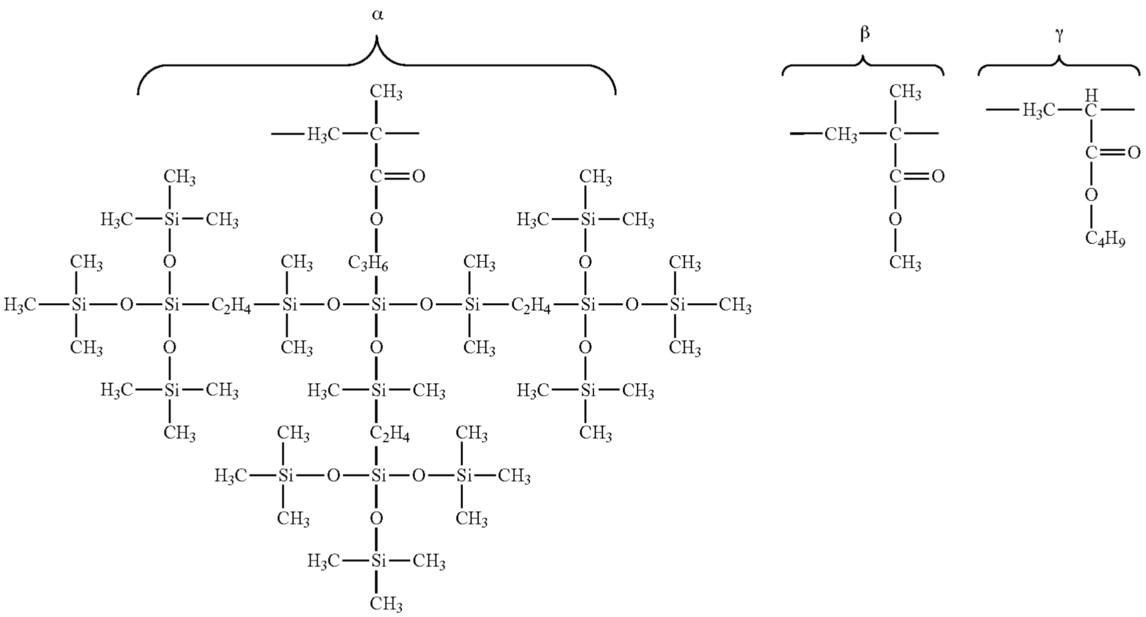

Production Example D-2

Production of Compound D-2

A polymerization reaction was performed in the same manner as in Production Example D-1 except that the mixture to be dropped was changed to 69 parts by mass of the compound represented by the average molecular formula (D-1A), 8 parts by mass of methyl methacrylate, and 0.3 part by mass of the radical polymerization initiator (α,α'-azobisisobutyronitrile). After the reaction, the resultant was dried at 150° C. and a reduced pressure of 10 mmHg without being loaded into methanol. Thus, a compound D-2 was obtained. The resultant compound was analyzed by $^{29}$Si-NMR, $^{13}$C-NMR, and FT-IR. As a result, the compound D-2 had α and β units represented by the following formula (D-A-2). In addition, the contents of the α unit and the β unit with respect to the entirety of the compound were 39% and 61%, respectively, and n and m represented 5 and 8, respectively. The compound had a weight-average molecular weight in terms of polystyrene by gel permeation chromatography (GPC) of about 7,700.

(D-A-2)

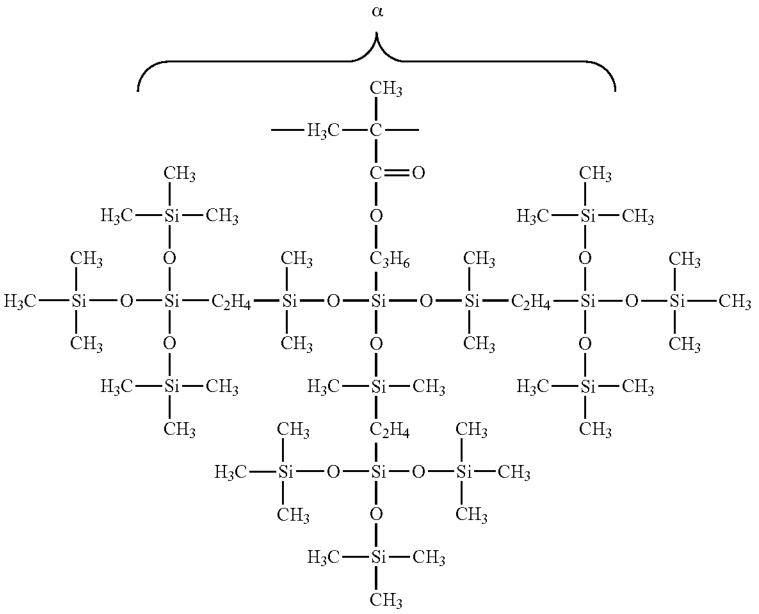

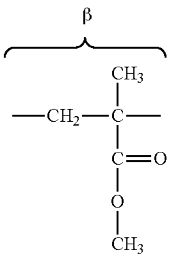

Production Example D-3

Production of Compound D-3

A compound D-3 was produced in the same manner as in Production Example D-2 except that: the solvent was changed to 300 parts by mass of ethanol; the mixture to be dropped was changed to 60 parts by mass of a compound represented by an average molecular formula (D-3A), 0.3 part by mass of the radical polymerization initiator (α,α'-azobisisobutyronitrile), and 100 parts by mass of ethanol; and the polymerization reaction time was changed to 210 hours.

(D-3A)

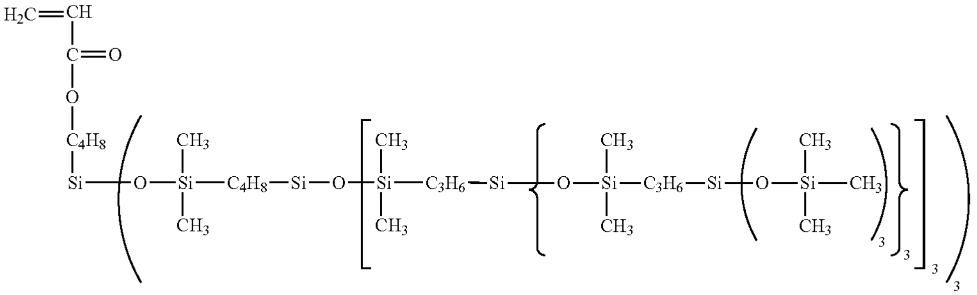

The resultant compound D-3 was analyzed by $^{29}$Si-NMR, $^{13}$C-NMR, and FT-IR. As a result, the compound D-3 was a compound represented by the following formula (D-A-3) and n represented 2. The compound had a weight-average molecular weight in terms of polystyrene by gel permeation chromatography (GPC) of about 30,000.

(D-A-3)

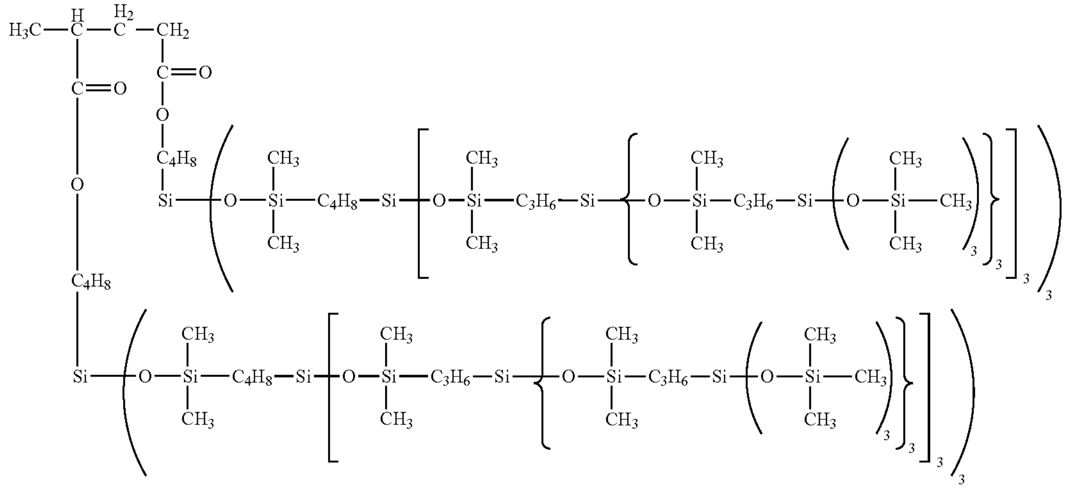

Production Example D-4

Production of Compound D-4

A compound D-4 was produced in the same manner as in Production Example D-1 except that the mixture to be dropped was changed to 90 parts by mass of a compound represented by an average molecular formula (D-2A), 4 parts by mass of methyl methacrylate, 4 parts by mass of styrene, and 0.3 part by mass of the radical polymerization initiator (α,α'-azobisisobutyronitrile).

(D-2A)

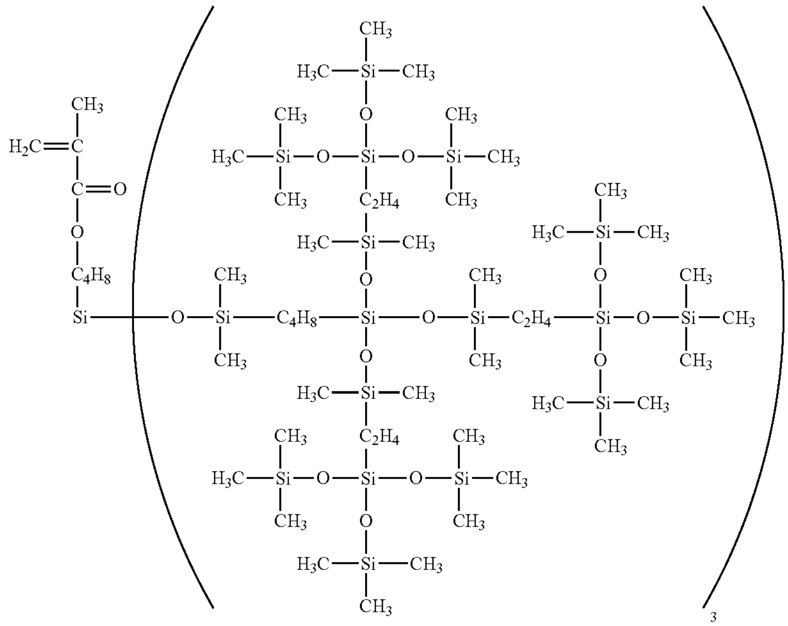

The resultant compound was analyzed by $^{29}$Si-NMR, $^{13}$C-NMR, and FT-IR. As a result, the compound D-4 had α, β, and γ units represented by the following formula (D-A-4). In addition, the contents of the α unit, the β unit, and the γ unit with respect to the entirety of the compound were 21.4%, 40.1%, and 38.6%, respectively, and n and m represented 2 and 8, respectively. The compound had a weight-average molecular weight in terms of polystyrene by gel permeation chromatography (GPC) of about 9,800.

(D-A-4)

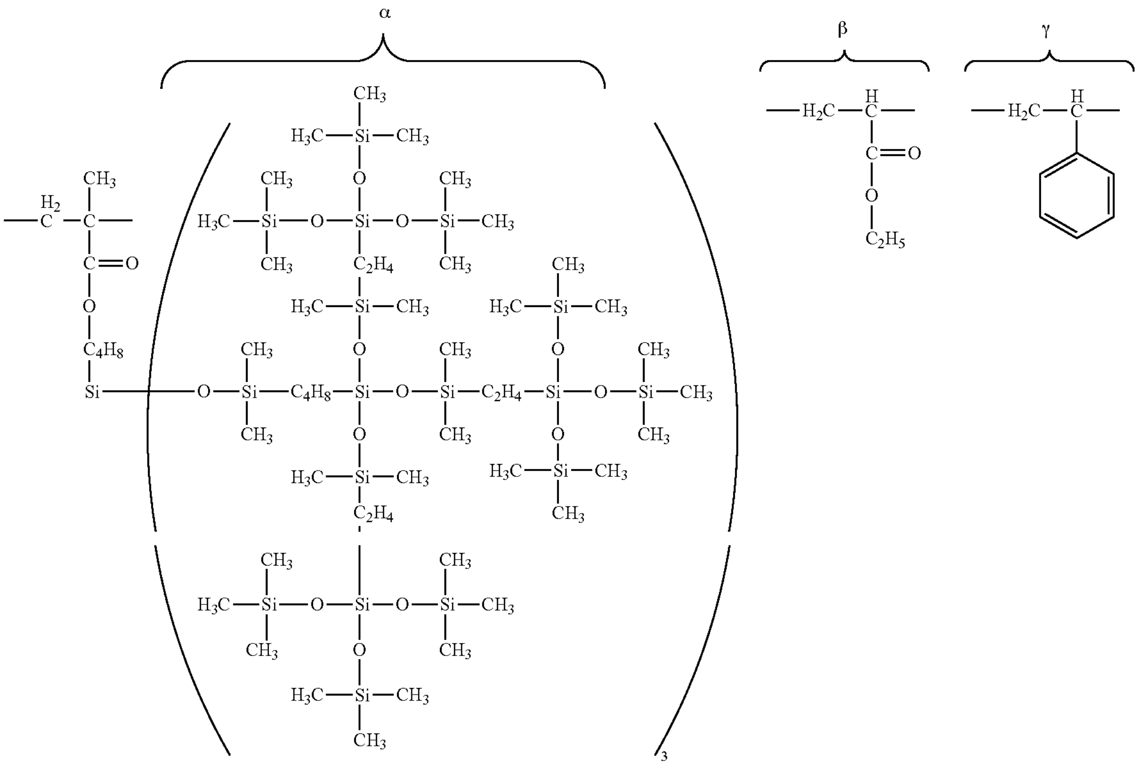

Production Example D-5

Production of Compound D-5

A polymerization reaction was performed in the same manner as in Production Example D-4 except that the mixture to be dropped was changed to 90 parts by mass of the compound represented by the average molecular formula (D-2A), 10 parts by mass of methyl methacrylate, 12 parts by mass of styrene, and 0.3 part by mass of the radical polymerization initiator (α,α'-azobisisobutyronitrile). After the reaction, the resultant was dried at 150° C. and a reduced pressure of 10 mmHg without being loaded into methanol. Thus, a compound D-5 was obtained.

The resultant compound was analyzed by $^{29}$Si-NMR, $^{13}$C-NMR, and FT-IR. As a result, the compound D-5 had the α, β, and γ units represented by the formula (D-A-4). In addition, the contents of the α unit, the β unit, and the γ unit with respect to the entirety of the compound were 9%, 42.2%, and 48.8%, respectively, and n and m represented 2 and 22, respectively. The compound had a weight-average molecular weight in terms of polystyrene by gel permeation chromatography (GPC) of about 11,200.

Production Example D-6

Production of Compound D-6

A polymerization reaction was performed in the same manner as in Production Example A-1 except that the mixture to be dropped was changed to 29 parts by mass of the compound represented by the average molecular formula (D-1A) and 0.3 part by mass of the radical polymerization initiator (α,α'-azobisisobutyronitrile). After the reaction, the resultant was dried at 150° C. and a reduced pressure of 10 mmHg without being loaded into methanol. Thus, a compound D-6 was obtained. The resultant compound was analyzed by $^{29}$Si-NMR, $^{13}$C-NMR, and FT-IR. As a result, the compound D-6 was a compound having an average molecular formula represented by the following formula (D-A-5), and n represented 2. The compound had a weight-average molecular weight in terms of polystyrene by gel permeation chromatography (GPC) of about 2,900.

(D-A-5)

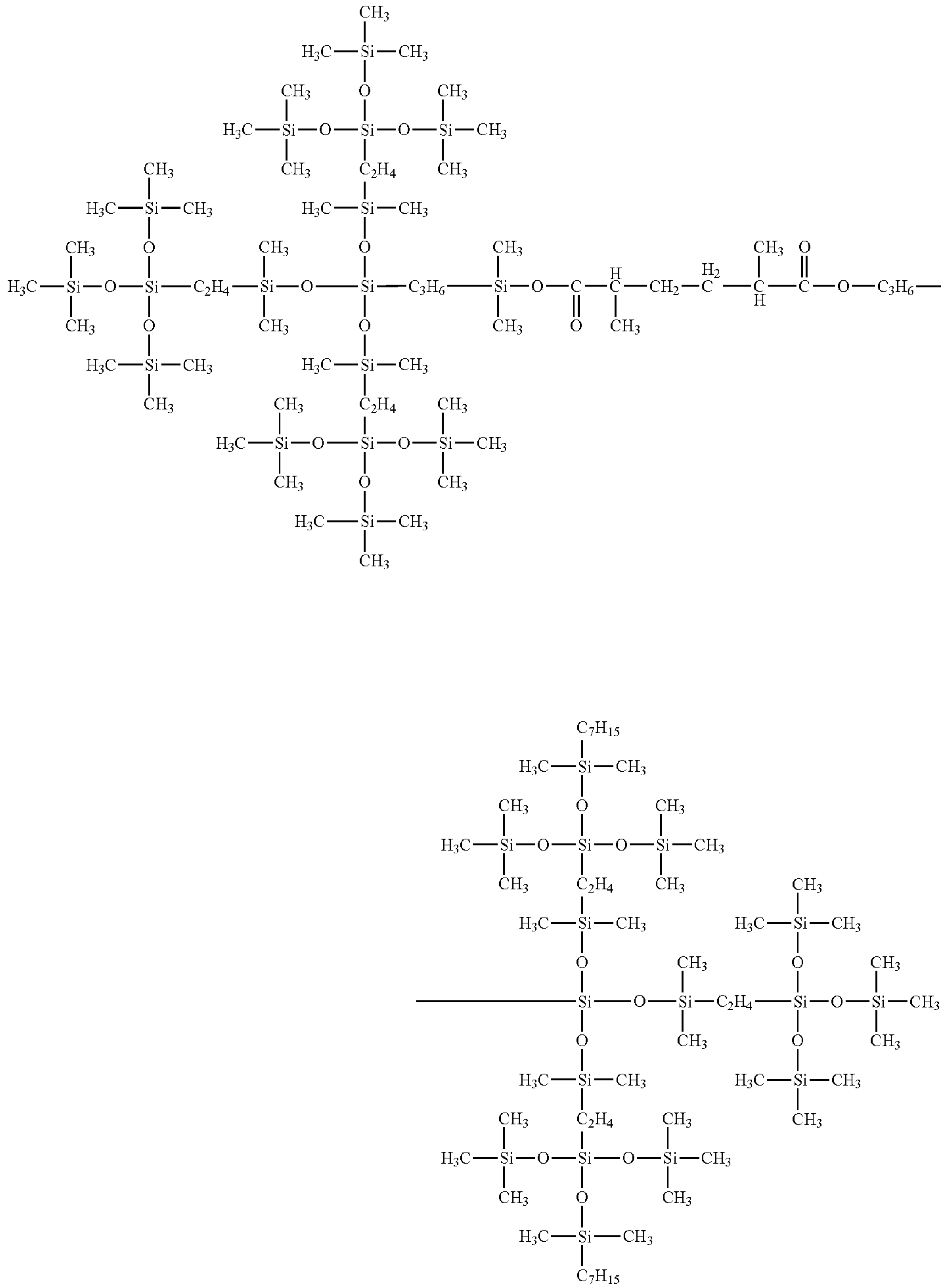

Production Example D-7

Production of Compound D-7

A compound D-7 was produced in the same manner as in Production Example D-3 except the following. 250 Parts by mass of a compound represented by an average molecular formula (D-4A), 100 parts by mass of methyl methacrylate, and 50 parts of butyl acrylate were added to 50 parts by mass of ethanol and 50 parts by mass of isopropyl alcohol, and then the mixture was stirred at room temperature for 6 hours. 0.5 Part, by mass of the radical polymerization initiator (α,α'-azobisisobutyronitrile) was added to the mixed solution in which the compound has been dissolved. Thus, a mixture to be dropped was obtained.

(D-4A)

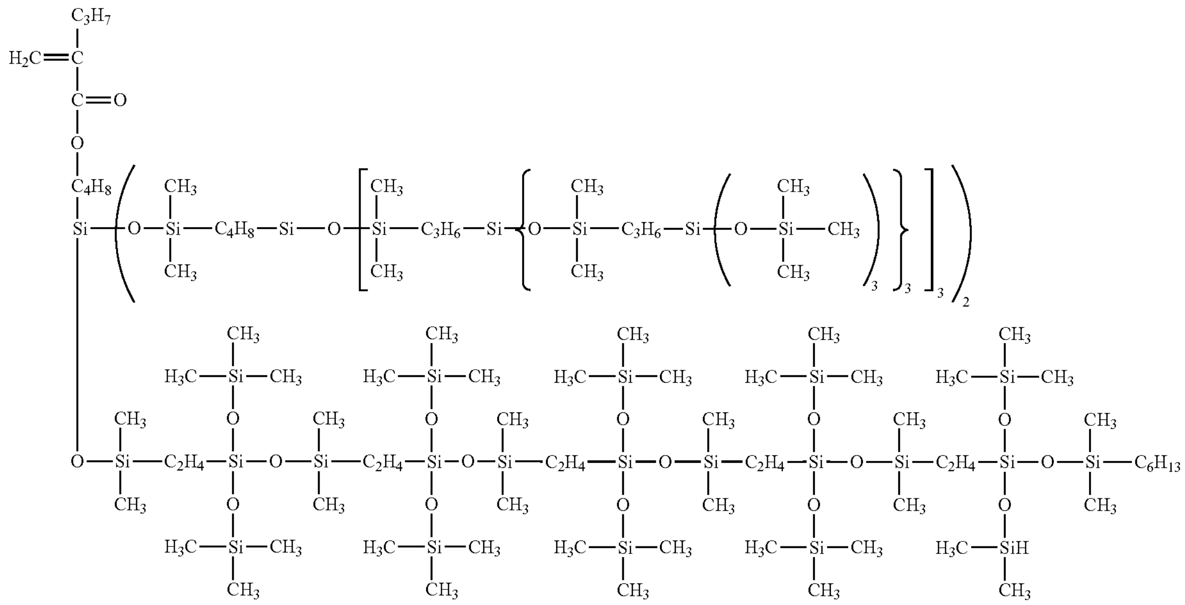

The resultant compound was analyzed by $^{29}$Si-NMR, $^{13}$C-NMR, and FT-IR. As a result, the compound D-7 had α, β, and γ units represented by the following formula (D-A-6). In addition, the contents of the α unit, the β unit, and the γ unit with respect to the entirety of the compound were 3.0%, 93.5%, and 3.5%, respectively, and n and m represented 3 and 104, respectively. The compound had a weight-average molecular weight in terms of polystyrene by gel permeation chromatography (GPC) of about 600,000.

(D-A-6)

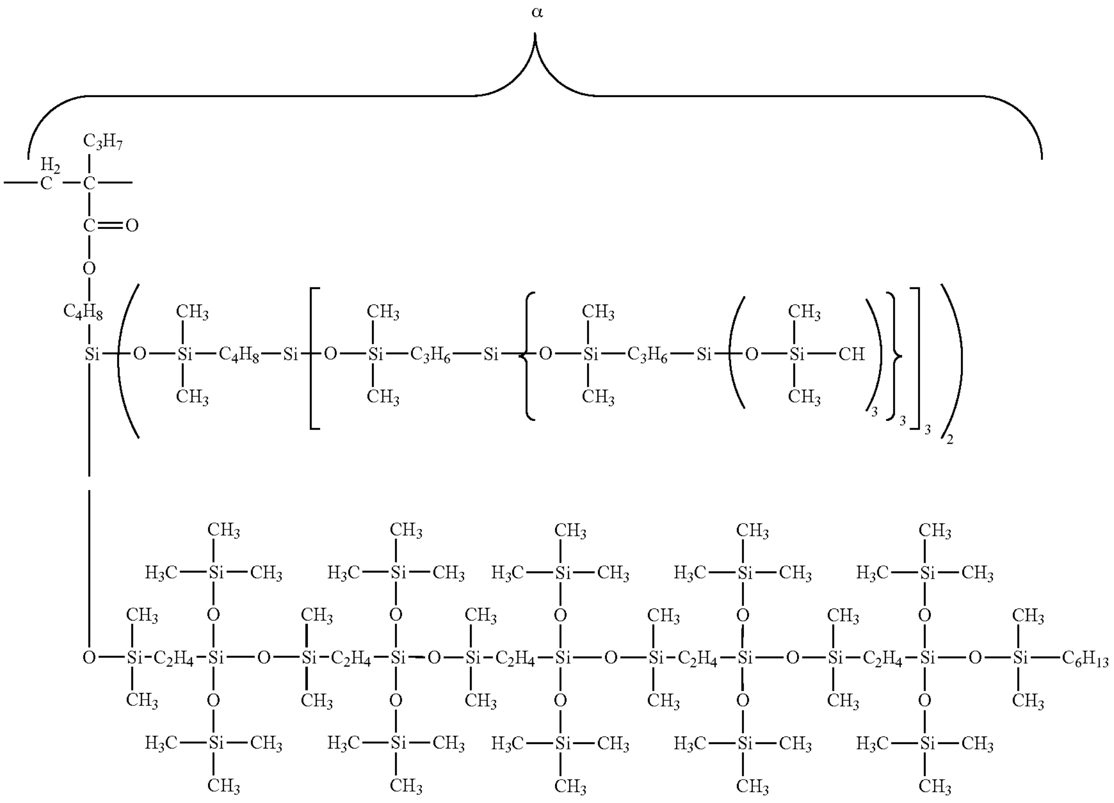

-continued

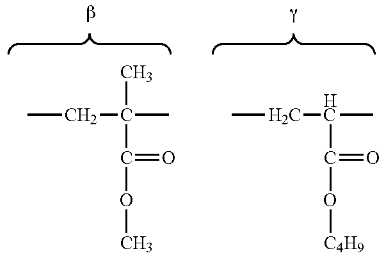

Production Example D-8

Production of Compound D-8

A compound D-8 was produced in the same manner as in Production Example D-7 except that the mixture to be dropped was changed to 50 parts by mass of ethanol, 50 parts by mass of isopropyl alcohol, 50 parts by mass of the compound represented by the average molecular formula (D-4A), 30 parts by mass of methyl methacrylate, and 0.5 part by mass of the radical polymerization initiator (α,α'-azobisisobutyronitrile).

The resultant compound was analyzed by $^{29}$Si-NMR, $^{13}$C-NMR, and FT-IR. As a result, the compound D-8 had α and β units represented by the following formula (D-A-7). In addition, the contents of the α unit and the β unit with respect to the entirety of the compound were 2% and 98%, respectively, and n and m represented 6 and 300, respectively. The compound had a weight-average molecular weight in terms of polystyrene by gel permeation chromatography (GPC) of about 80,000.

(D-A-7)

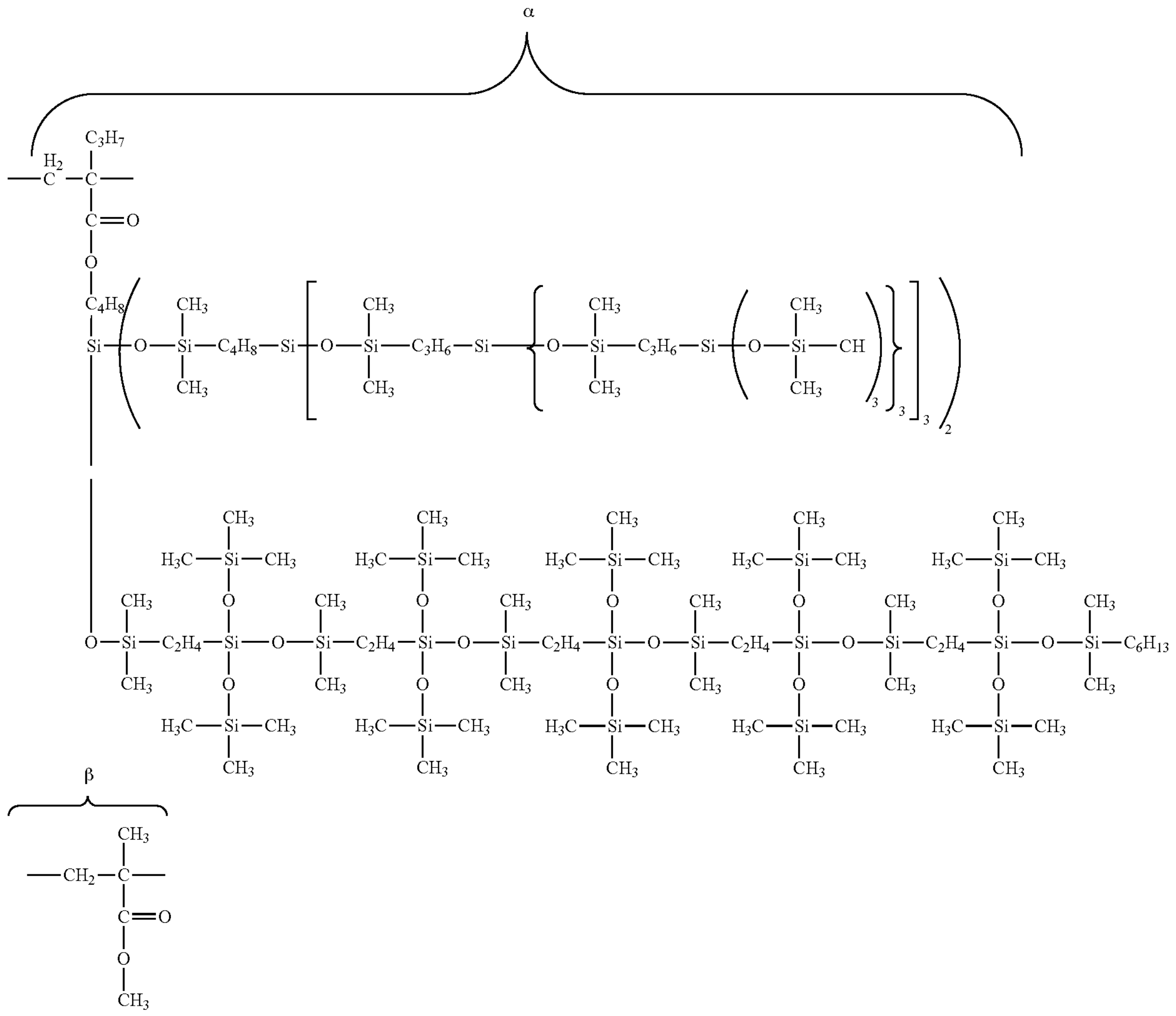

Production Example D-9

Production of Compound D-9

A compound D-9 was produced in the same manner as in Production Example A-8 except that the mixture to be dropped was changed to 50 parts by mass of ethanol, 50 parts by mass of isopropyl alcohol, 150 parts by mass of the compound represented by the average molecular formula (D-4A), 7.5 parts by mass of methyl methacrylate, and 0.5 part by mass of the radical polymerization initiator (α,α'-azobisisobutyronitrile).

The resultant compound was analyzed by $^{29}$Si-NMR, $^{13}$C-NMR, and ET-IR. As a result, the compound D-9 had the α and β units represented by the formula (D-A-6). In addition, the contents of the α unit and the 3 unit with respect to the entirety of the compound were 20% and 80%, respectively, and n and m represented 19 and 75, respectively. The compound had a weight-average molecular weight in terms of polystyrene by gel permeation chromatography (GPC) of about 160,000.

Production Example D-10

Production of Compound D-10

A compound D-10 was produced in the same manner as in Production Example D-1 except that the mixture to be dropped was changed to 130 parts by mass of the compound represented by the average molecular formula (D-1A), 10 parts by mass of methyl methacrylate, 10 parts by mass of butyl acrylate, and 0.3 part by mass of the radical polymerization initiator (α,α'-azobisisobutyronitrile).

The resultant compound was analyzed by $^{29}$Si-NMR, $^{13}$C-NMR, and FT-IR. As a result, the compound D-10 had the α, β, and γ units represented by the formula (D-A-1). In addition, the contents of the α unit, the β unit, and the γ unit with respect to the entirety of the compound were 33%, 34%, and 33%, respectively, and n and m represented 10 and 20, respectively. The compound had a weight-average molecular weight in terms of polystyrene by gel permeation chromatography (GPC) of about 15,000.

Production Example D-11

Production of Compound D-11

A compound D-11 was produced in the same manner as in Production Example D-3 except the following. 250 Parts by mass of a compound represented by an average molecular formula (D-5A), 50 parts by mass of methyl methacrylate, and 78 parts by mass of butyl acrylate were added to 100 parts by mass of ethanol, and then the mixture was stirred at room temperature for 6 hours. 0.5 Part by mass of the radical polymerization initiator (α,α'-azobisisobutyronitrile) was added to the mixed solution in which the compound had been dissolved. Thus, a mixture to be dropped was obtained. In addition, the polymerization reaction time was changed to 24 hours.

(D-5A)

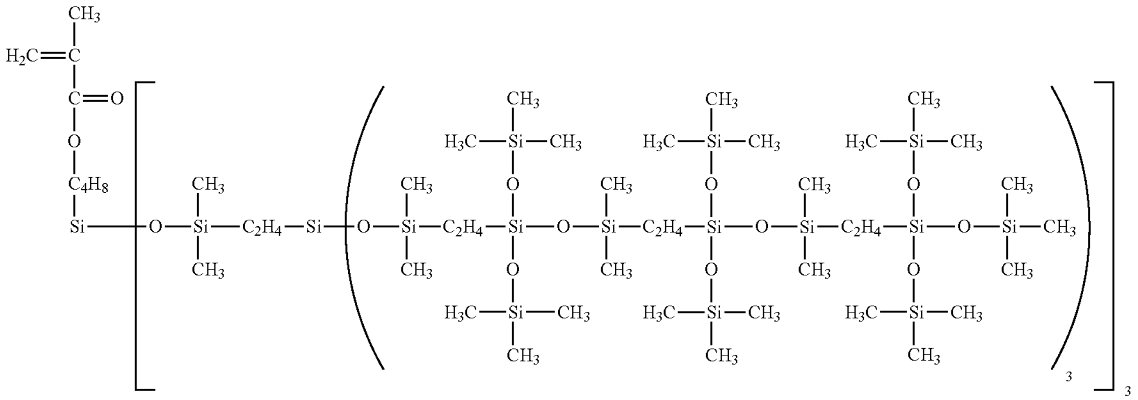

The resultant compound was analyzed by $^{29}$Si-NMR, $^{13}$C-NMR, and FT-IR. As a result, the compound D-11 had α, β, and γ units represented by the following formula (D-A-8). In addition, the contents of the α unit, the β unit, and the γ unit with respect to the entirety of the compound were 2%, 39%, and 59%, respectively, and n and m represented 26 and 1,250, respectively. The compound had a weight-average molecular weight in terms of polystyrene by gel permeation chromatography (GPC) of about 378,000.

(D-A-8)

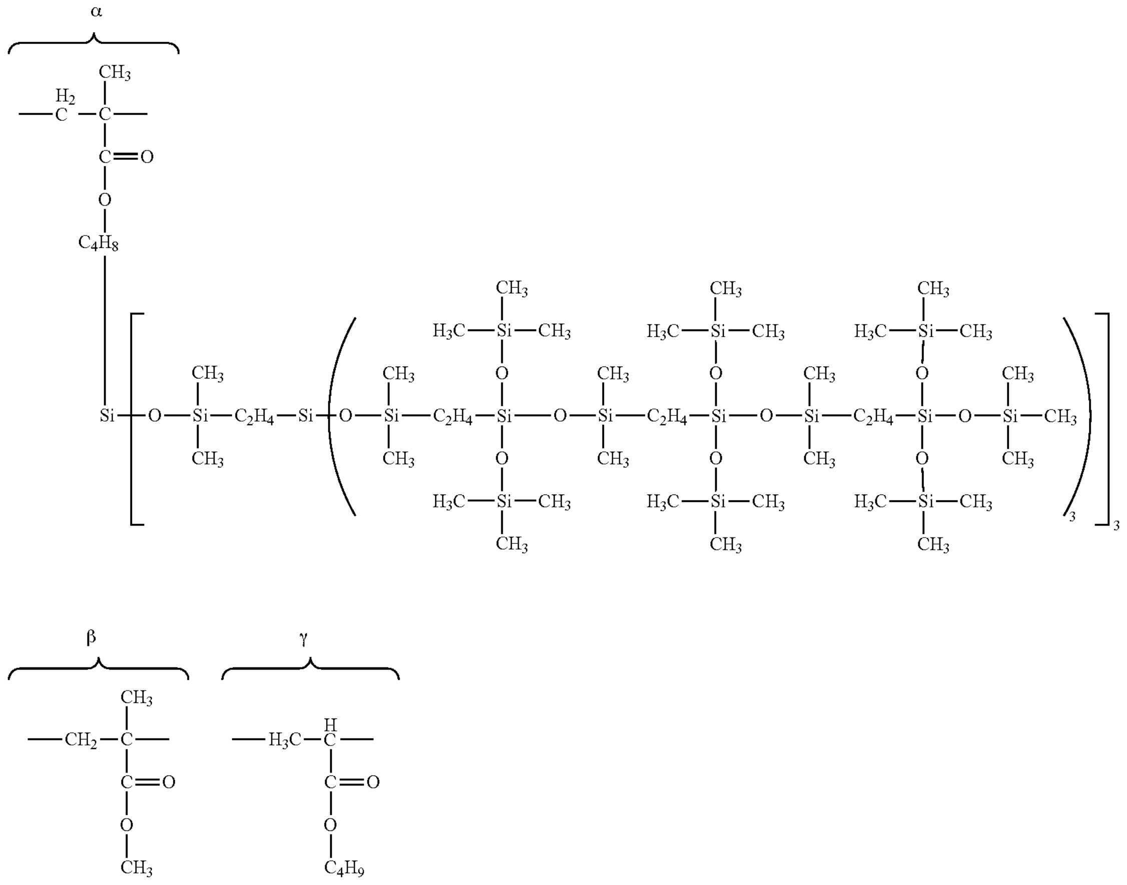

Production Example D-12

Production of Compound D-12

A compound D-12 was produced in the same manner as in Production Example D-11 except that the mixture to be dropped was changed to 100 parts by mass of ethanol, 200 parts by mass of the compound represented by the average molecular formula (D-5A), 5 parts by mass of methyl methacrylate, 5.5 parts by mass of butyl acrylate, and 0.5 part by mass of the radical polymerization initiator (α,α'-azobisisobutyronitrile).

The resultant compound was analyzed by $^{29}$Si-NMR, $^{13}$C-NMR, and FT-IR. As a result, the compound D-12 had the α, β, and γ units represented by the formula (D-A-8). In addition, in the compound D-12, the contents of the α unit, the β unit, and the γ unit with respect to the entirety of the compound were 18.2%, 35.2%, and 46.6%, respectively, and n and m represented 4 and 18, respectively. The compound had a weight-average molecular weight in terms of polystyrene by gel permeation chromatography (GPC) of about 42,000.

Production Example D-13

Production of Compound D-13

A compound D-13 was produced in the same manner as in Production Example D-12 except that: the mixture to be dropped was changed to 100 parts by mass of ethanol, 100 parts by mass of the compound represented by the average molecular formula (D-5A), 4 parts by mass of methyl methacrylate, 5 parts by mass of butyl acrylate, and 0.8 part by mass of the radical polymerization initiator (α,α'-azobisisobutyronitrile); and the polymerization time was changed to 48 hours.

The resultant compound was analyzed by $^{29}$Si-NMR, $^{13}$C-NMR, and FT-IR. As a result, the compound D-13 had the α, β, and γ units represented by the formula (D-A-8). In addition, in the compound D-13, the contents of the α unit, the β unit, and the γ unit with respect to the entirety of the compound were 10.5%, 40.6%, and 48.9%, respectively, and n and m represented 10 and 88, respectively. The compound had a weight-average molecular weight in terms of polystyrene by gel permeation chromatography (GPC) of about 109,000.

Production Example D-14

Production of Compound D-14

A compound D-14 was produced in the same manner as in Production Example D-2 except that the mixture to be dropped was changed to 135 parts by mass of the compound represented by the average molecular formula (D-1A), 20 parts by mass of methyl methacrylate, 21 parts by mass of butyl acrylate, and 0.3 part by mass of the radical polymerization initiator (α,α'-azobisisobutyronitrile).

The resultant compound was analyzed by $^{29}$Si-NMR, $^{13}$C-NMR, and FT-IR. As a result, the compound D-14 had the α, β, and γ units represented by the formula (D-A-1). In addition, the contents of the α unit, the β unit, and the γ unit with respect to the entirety of the compound were 21.6%, 43%, and 35.4%, respectively, and n and m represented 10 and 36, respectively. The compound had a weight-average molecular weight in terms of polystyrene by gel permeation chromatography (GPC) of about 17,000.

Production Example D-15

Production of Compound D-15

A compound D-15 was produced in the same manner as in Production Example D-5 except that the mixture to be dropped was changed to 170 parts by mass of the compound represented by the average molecular formula (D-2A), 50 parts by mass of methyl methacrylate, 50 parts by mass of styrene, and 0.3 part by mass of the radical polymerization initiator (α,α'-azobisisobutyronitrile).

The resultant compound was analyzed by $^{29}$Si-NMR, $^{13}$C-NMR, and FT-IR. As a result, the compound D-15 had the α, β, and γ units represented by the formula (D-A-4). In addition, the contents of the α unit, the β unit, and the γ unit with respect to the entirety of the compound were 4%, 49%, and 47%, respectively, and n and m represented 4 and 98, respectively. The compound had a weight-average molecular weight in terms of polystyrene by gel permeation chromatography (GPC) of about 27,000.

Production Example D-16

Production of Compound D-16

A compound D-16 was produced in the same manner as in Production Example D-15 except that: the mixture to be dropped was changed to 200 parts by mass of the compound represented by the average molecular formula (D-2A), 100 parts by mass of methyl methacrylate, 100 parts by mass of styrene, and 0.6 part by mass of the radical polymerization initiator (α,α'-azobisisobutyronitrile); and the polymerization time was changed to 48 hours.

The resultant compound was analyzed by $^{29}$Si-NMR, $^{13}$C-NMR, and FT-IR. As a result, the compound D-16 had the α, β, and γ units represented by the formula (D-A-4). In addition, in the compound D-16, the contents of the α unit, the β unit, and the γ unit with respect to the entirety of the compound were 2.3%, 49.7%, and 48%, respectively, and n and m represented 47 and 1,961, respectively. The compound had a weight-average molecular weight in terms of polystyrene by gel permeation chromatography (GPC) of about 400,000.

Production Example D-17

Production of Compound D-17

A compound D-17 was produced in the same manner as in Production Example D-7 except that the mixture to be dropped was changed to 50 parts by mass of ethanol, 50 parts by mass of isopropyl alcohol, 180 parts by mass of a compound represented by an average molecular formula (D-6A), 4 parts by mass of methyl methacrylate, 4.2 parts by mass of styrene, and 0.3 part by mass of the radical polymerization initiator (α,α'-azobisisobutyronitrile).

(D-6A)

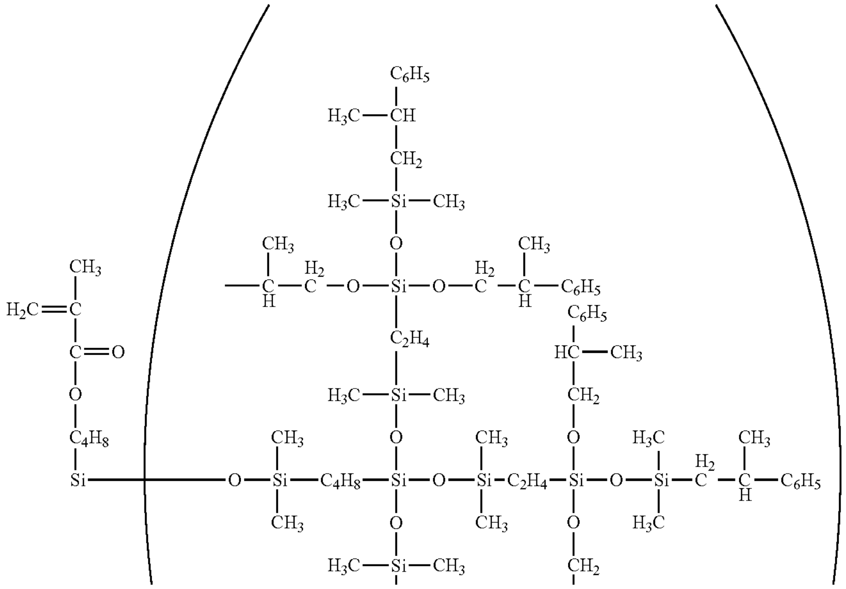

-continued

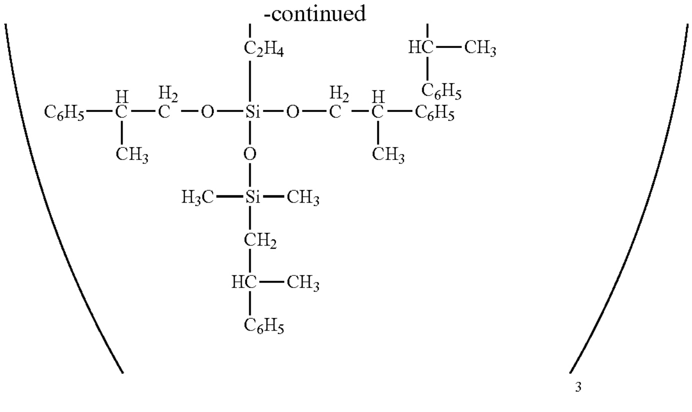

The resultant compound was analyzed by $^{29}$Si-NMR, $^{13}$C-NMR, and FT-IR. As a result, the compound D-17 had α, β, and γ units represented by the following formula (D-A-9). In addition, the contents of the α unit, the β unit, and the γ unit with respect to the entirety of the compound were 27.2%, 36.2%, and 36.6%, respectively, and n and m represented 3 and 8, respectively. The compound had a weight-average molecular weight in terms of polystyrene by gel permeation chromatography (GPC) of about 22,000.

(D-A-9)

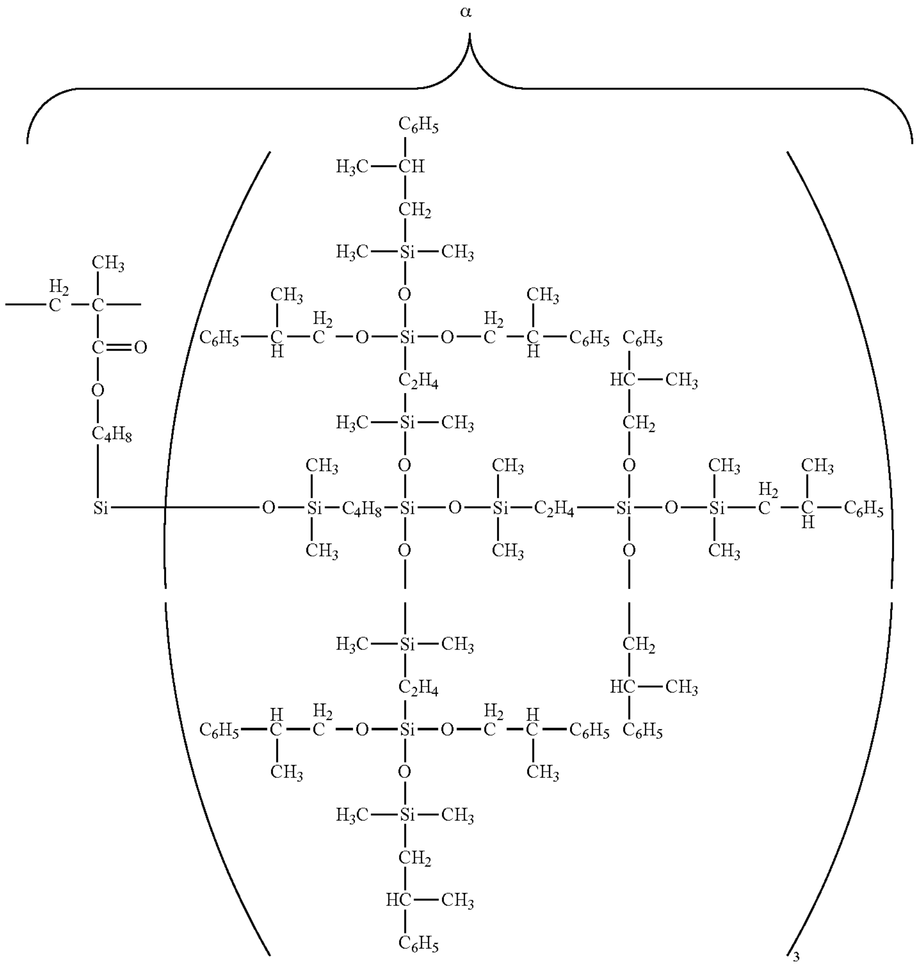

-continued

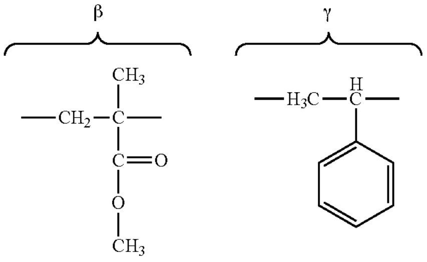

Production Example D-18

Production of Compound D-18

A compound D-18 was produced in the same manner as in Production Example D-1 except that the mixture to be dropped was changed to 76 parts by mass of a compound represented by an average molecular formula (D-7A), 4 parts by mass of methyl methacrylate, 4.2 parts by mass of styrene, and 0.3 part by mass of the radical polymerization initiator (α,α'-azobisisobutyronitrile).

(D-7A)

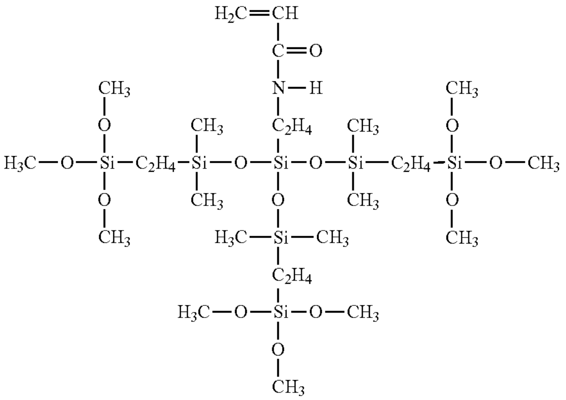

The resultant compound was analyzed by $^{29}$Si-NMR, $^{13}$C-NMR, and FT-IR. As a result, the compound D-18 had the α, β, and γ units represented by the formula (D-A-10). In addition, the contents of the α unit, the β unit, and the γ unit with respect to the entirety of the compound were 46.7%, 26.5%, and 26.8%, respectively, and n and m represented 7 and 8, respectively. The compound had a weight-average molecular weight in terms of polystyrene by gel permeation chromatography (GPC) of about 9,000.

(D-A-10)

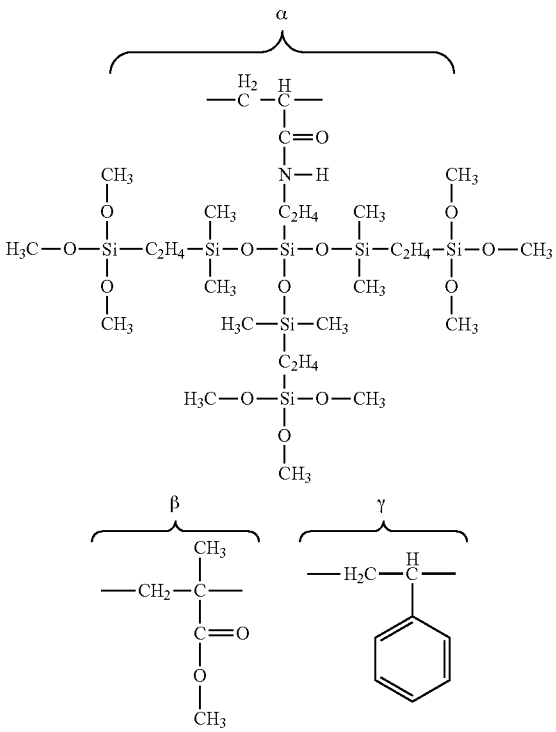

Production Example D-19

Production of Compound D-19

A compound D-19 was produced in the same manner as in Production Example A-18 except that the mixture to be dropped was changed to 76 parts by mass of the compound represented by the average molecular formula (D-7A), 92 parts by mass of methyl methacrylate, 81 parts by mass of butyl acrylate, and 0.3 part by mass of the radical polymerization initiator (α,α'-azobisisobutyronitrile).

The resultant compound was analyzed by $^{29}$Si-NMR, $^{13}$C-NMR, and FT-IR. As a result, the compound D-19 had α, β, and γ units represented by the following formula (D-A-11). In addition, the contents of the α unit, the β unit, and the γ unit with respect to the entirety of the compound were 4%, 52%, and 44%, respectively, and n and m represented 7 and 170, respectively. The compound had a weight-average molecular weight in terms of polystyrene by gel permeation chromatography (GPC) of about 27,000.

(D-A-11)

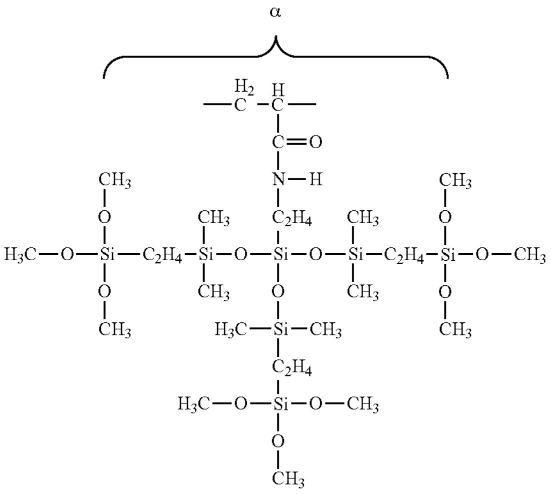

-continued

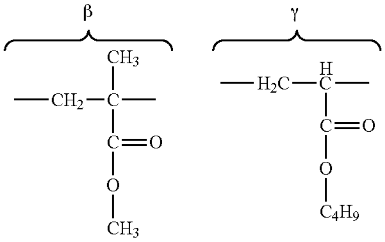

Production Example D-20

Production of Compound D-20

A compound D-20 was produced in the same manner as in Production Example D-3 except the following. 220 Parts by mass of a compound represented by an average molecular formula (D-8A) and 25 parts by mass of styrene were added to 50 parts by mass of acetone, 50 parts by mass of ethanol, and 50 parts by mass of toluene, and then the mixture was stirred for 12 hours. 1 Part by mass of the radical polymerization initiator (α,α'-azobisisobutyronitrile) was added to the mixed solution in which the compound had been dissolved. Thus, a mixture to be dropped was obtained. The polymerization time was changed to 100 hours.

(D-8A)

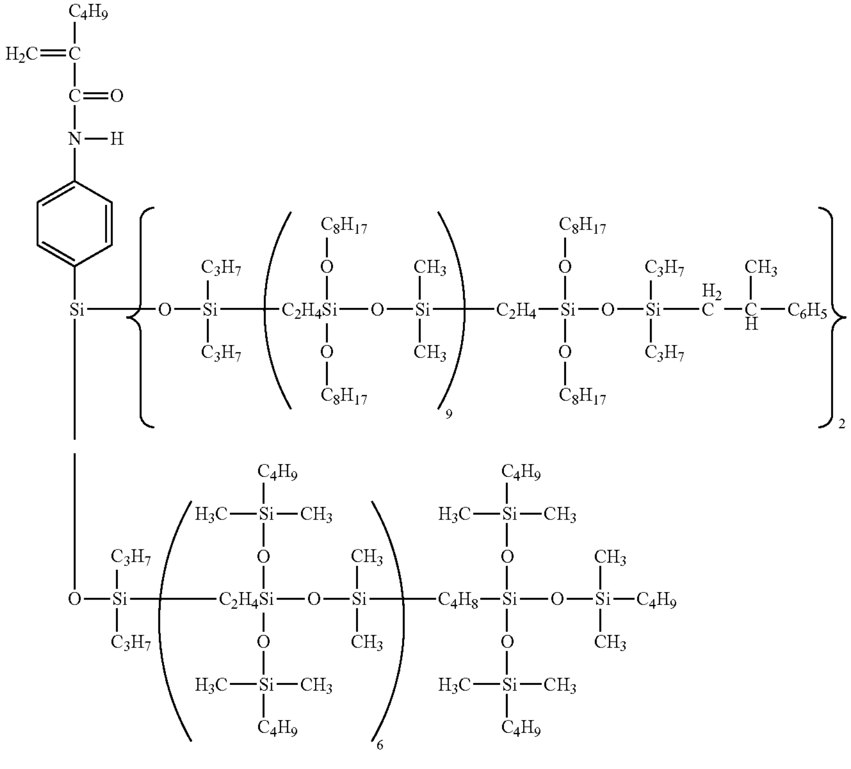

The resultant compound was analyzed by $^{29}$Si-NMR, $^{13}$C-NMR, and FT-IR. As a result, the compound D-20 had α and β units represented by the following formula (D-A-12). In addition, the contents of the α unit and the β unit with respect to the entirety of the compound were 6.8% and 93.2%, respectively, and n and m represented 128 and 1,750, respectively. The compound had a weight-average molecular weight in terms of polystyrene by gel permeation chromatography (GPC) of about 1,800,000.

(D-A-12)

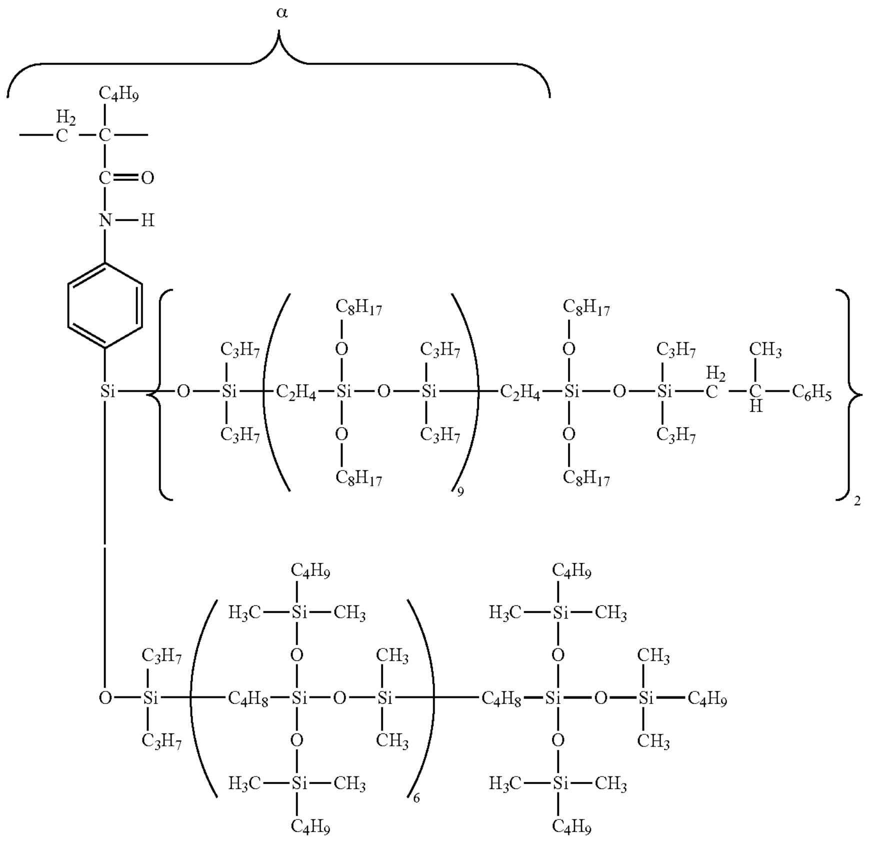

Production Example D-21

Production of Compound D-21

A compound D-21 was produced in the same manner as in Production Example D-20 except that the mixture to be dropped was changed to 50 parts by mass of acetone, 50 parts by mass of toluene, 250 parts by mass of the compound represented by the average molecular formula (D-8A), and 1 part by mass of the radical polymerization initiator (α,α'-azobisisobutyronitrile).

The resultant compound was analyzed by $^{29}$Si-NMR, $^{13}$C-NMR, and FT-IR. As a result, the compound D-21 was a compound represented by the following formula (D-A-13) and n represented 2. The compound had a weight-average molecular weight in terms of polystyrene by gel permeation chromatography (GPC) of about 25,000.

(D-A-13)
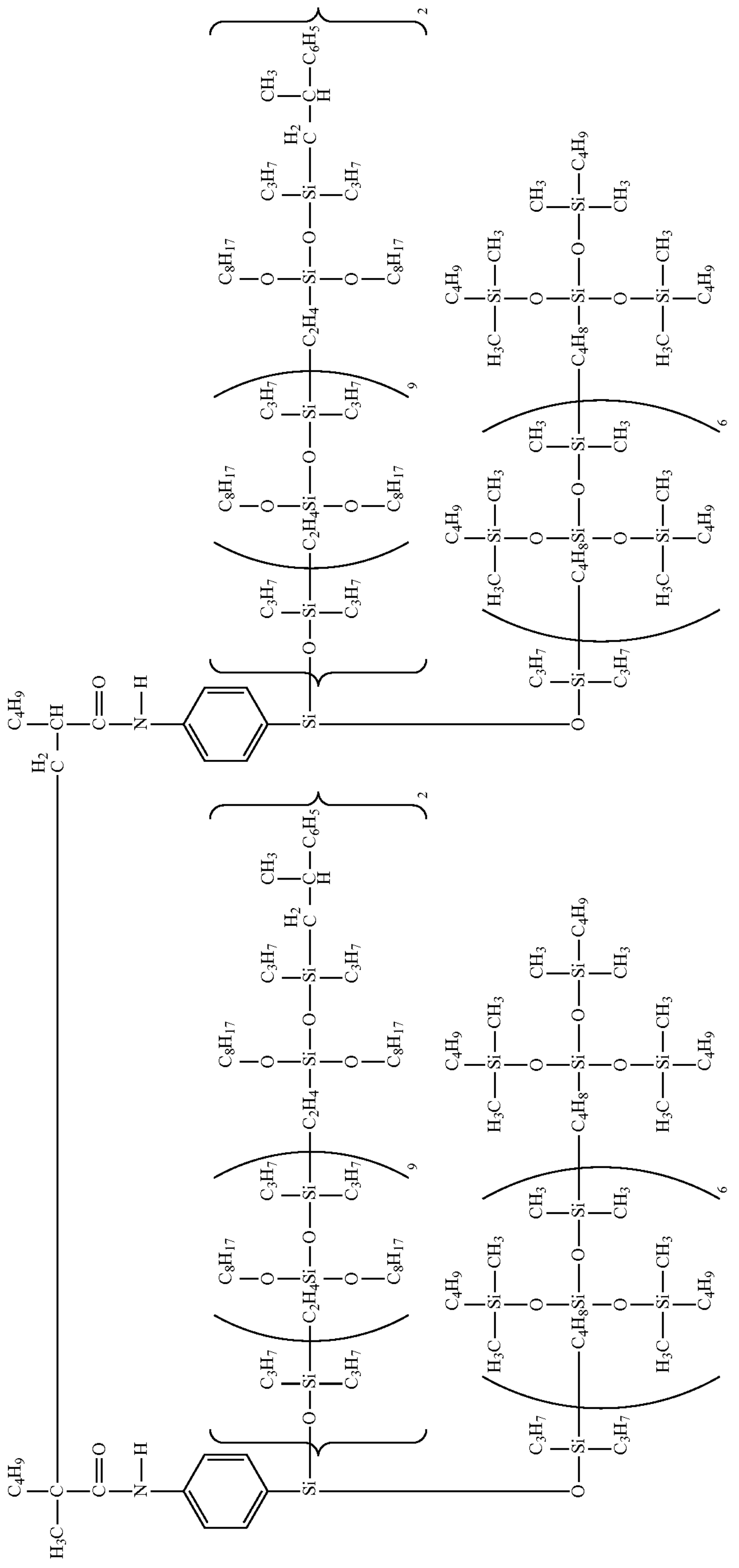

Production Example D-22

Production of Compound D-22

A compound D-22 was produced in the same manner as in Production Example D-1 except that the mixture to be dropped was changed to 110 parts by mass of a compound represented by an average molecular formula (D-9A), 132 parts by mass of methyl methacrylate, 25 parts by mass of styrene, and 0.3 part by mass of the radical polymerization initiator (α,α'-azobisisobutyronitrile).

(D-9A)

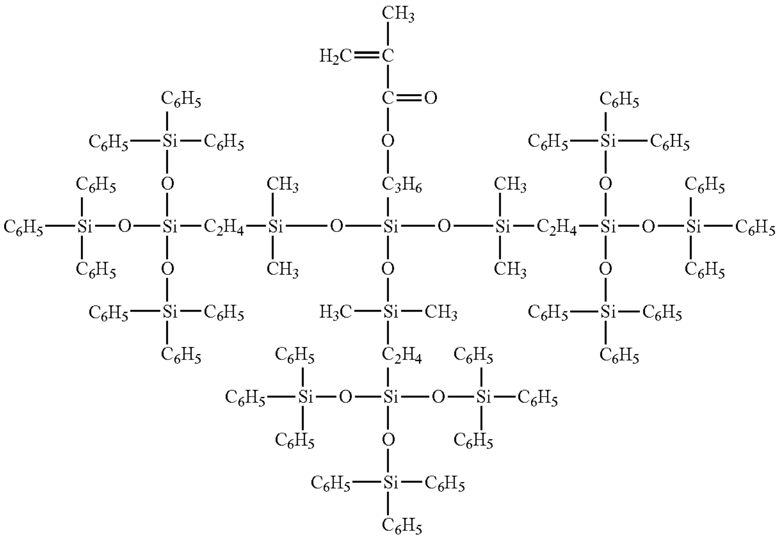

The resultant compound was analyzed by $^{29}$Si-NMR, $^{13}$C-NMR, and FT-IR. As a result, the compound D-22 had α, β, and γ units represented by the following formula (D-A-14). In addition, the contents of the α unit, the β unit, and the γ unit with respect to the entirety of the compound were 2.3%, 82.1%, and 15.6%, respectively, and n and m represented 11 and 471, respectively. The compound had a weight-average molecular weight in terms of polystyrene by gel permeation chromatography (GPC) of about 80,000.

(D-A-14)

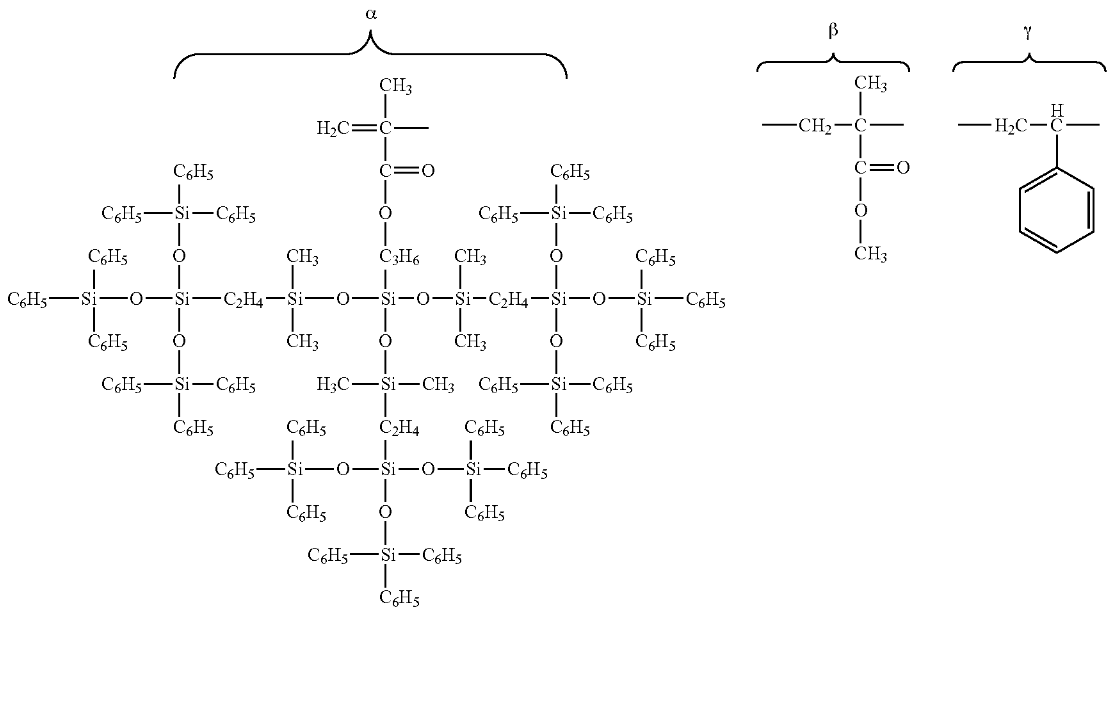

Production Example D-23

Production of Compound D-23

A compound D-23 was produced in the same manner as in Production Example D-3 except that the mixture to be dropped was changed to 80 parts by mass of the compound represented by the average molecular formula (D-3A), 10 parts by mass of methyl methacrylate, 12 parts by mass of butyl acrylate, and 0.3 part by mass of the radical polymerization initiator (α,α'-azobisisobutyronitrile).

The resultant compound was analyzed by $^{29}$Si-NMR, $^{13}$C-NMR, and FT-IR. As a result, the compound D-23 had α, β, and γ units represented by the following formula (D-A-15). In addition, the contents of the α unit, the β unit, and the γ unit with respect to the entirety of the compound were 3%, 50%, and 47%, respectively, and n and m represented 6 and 194, respectively. The compound had a weight-average molecular weight in terms of polystyrene by gel permeation chromatography (GPC) of about 102,000.

(D-A-15)

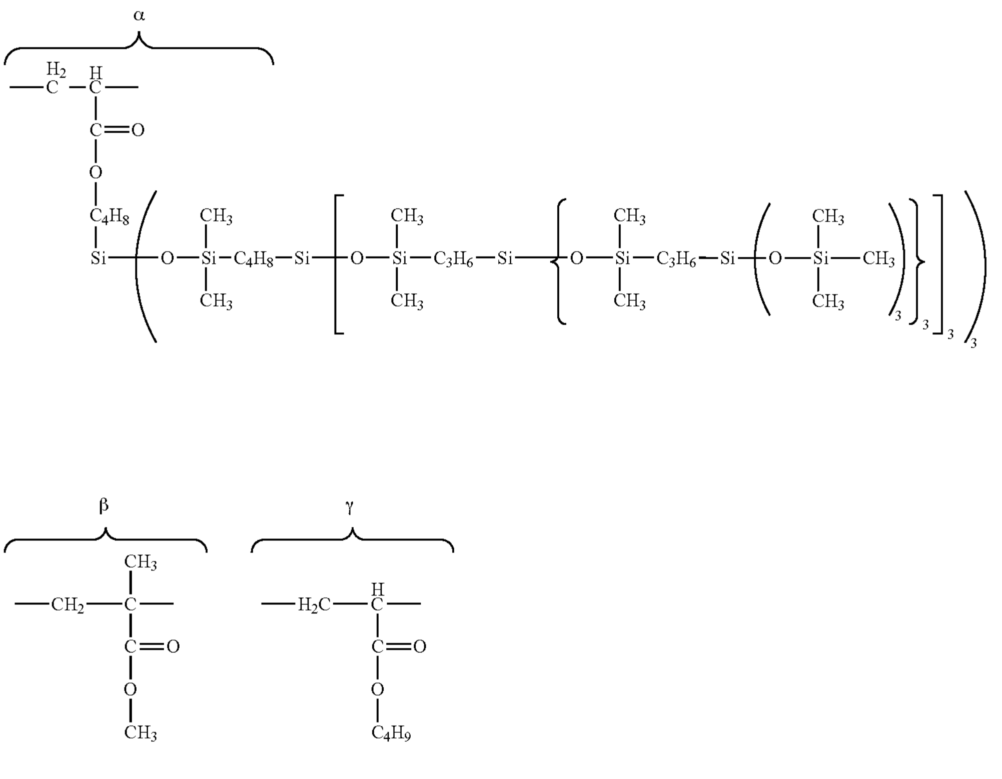

Production Example D-24

Production of Compound D-24

A compound 24 was produced in the same manner as in Production Example A-1 except that the mixture to be dropped was changed to 33 parts by mass of a compound represented by an average molecular formula (D-10A) and 0.3 part by mass of the radical polymerization initiator (α,α'-azobisisobutyronitrile).

(D-10A)

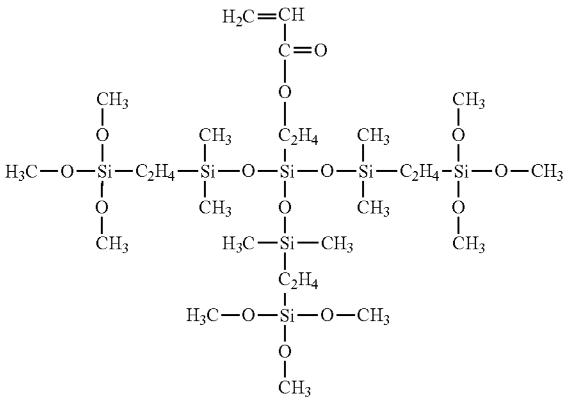

The resultant compound was analyzed by $^{29}$Si-NMR, $^{13}$C-NMR, and FT-IR. As a result, the compound D-24 was a compound represented by the following formula (D-A-16) and n represented 4. The compound had a weight-average molecular weight in terms of polystyrene by gel permeation chromatography (GPC) of about 3,300.

(D-A-16)

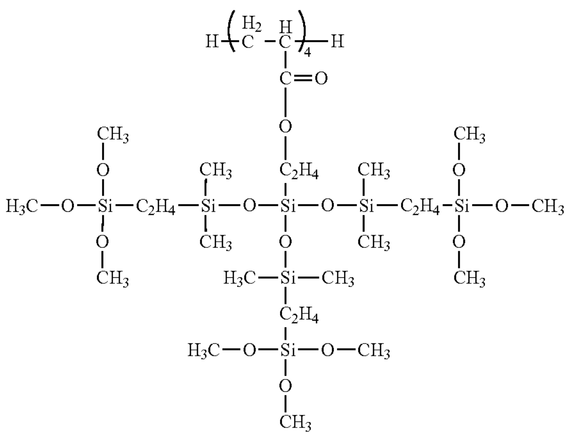

Production Example D-25

Production of Compound D-25

A compound D-25 was produced in the same manner as in Production Example D-24 except that the mixture to be dropped was changed to 115 parts by mass of the compound represented by the average molecular formula (D-10A), 50 parts by mass of methyl methacrylate, 50 parts by mass of styrene, and 0.3 part by mass of the radical polymerization initiator (α,α'-azobisisobutyronitrile).

The resultant compound was analyzed by $^{29}$Si-NMR, $^{13}$C-NMR, and FT-IR. As a result, the compound D-25 had α, β, and γ units represented by the following formula (D-A-17). In addition, the contents of the α unit, the β unit, and the γ unit with respect to the entirety of the compound were 12.3%, 43.8%, and 43.9%, respectively, and n and m represented 14 and 100, respectively. The compound had a weight-average molecular weight in terms of polystyrene by gel permeation chromatography (GPC) of about 21,500.

(D-A-17)

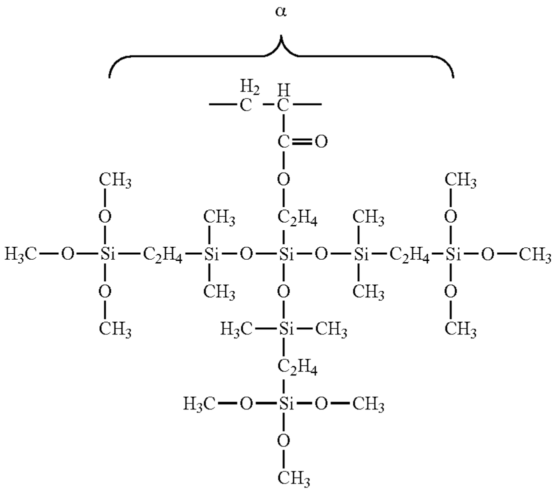

-continued

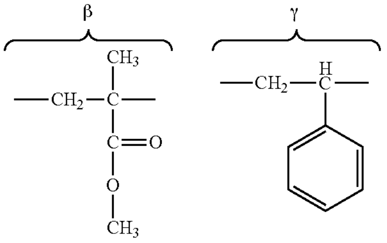

Production Example D-26

Production of Compound D-26

A compound D-26 was produced in the same manner as in Production Example D-2 except that the mixture to be dropped was changed to 90 parts by mass of a compound represented by an average molecular formula (D-11A), 132 parts by mass of methyl methacrylate, 78 parts by mass of butyl acrylate, and 0.3 part by mass of the radical polymerization initiator (α,α'-azobisisobutyronitrile).

(D-11A)

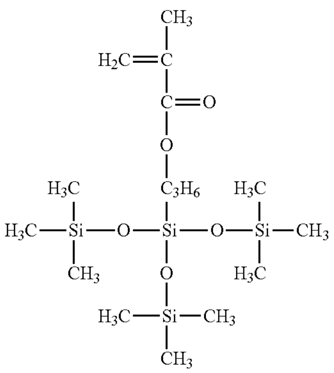

The resultant compound was analyzed by $^{29}$Si-NMR, $^{13}$C-NMR, and FT-IR. As a result, the compound D-26 had α, β, and γ units represented by the following formula (D-A-18). In addition, the contents of the α unit, the β unit, and the γ unit with respect to the entirety of the compound were 10%, 62%, and 28%, respectively, and n and m represented 20 and 174, respectively. The compound had a weight-average molecular weight in terms of polystyrene by gel permeation chromatography (GPC) of about 26,000.

(D-A-18)

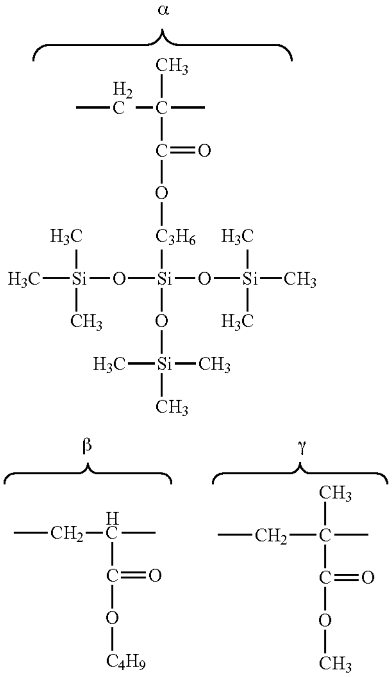

Production Example D-27

Production of Compound D-27

A compound D-27 was produced in the same manner as in Production Example D-2 except that the mixture to be dropped was changed to 100 parts by mass of a compound represented by an average molecular formula (D-12A), 100 parts by mass of methyl methacrylate, 100 parts by mass of butyl acrylate, and 0.3 part by mass of the radical polymerization initiator (α,α'-azobisisobutyronitrile).

(D-12A)

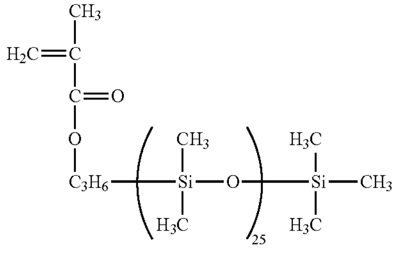

The resultant compound was analyzed by $^{29}$Si-NMR, $^{13}$C-NMR, and FT-IR. As a result, the compound D-27 had α, β, and γ units represented by the following formula (D-A-19). In addition, the contents of the α unit, the β unit, and the γ unit with respect to the entirety of the compound were 3.6%, 54.1%, and 42.3%, respectively, and n and m represented 40 and 1,069, respectively. The compound had a weight-average molecular weight in terms of polystyrene by gel permeation chromatography (GPC) of about 200,000.

(D-A-19)

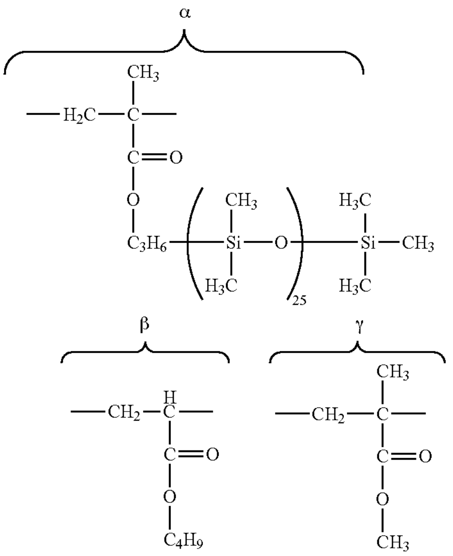

Production Example E-1

Production of Graphite Particles 1

β-Resin was extracted from coal tar pitch by solvent fractionation, and was then subjected to a treatment for making the β-resin heavy by hydrogenation. Subsequently, solvent soluble matter was removed with toluene. Thus, bulk mesophase pitch was obtained. The bulk mesophase pitch was mechanically pulverized, and was then subjected to an oxidation treatment in the air with its temperature increased to 270° C. at a rate of temperature increase of 300° C./h. The pulverization was performed so that an average particle diameter of about 3 μm was obtained. Subsequently, under a nitrogen atmosphere, the temperature was increased to 3,000° C. at a rate of temperature increase of 1,500° C./h, and then the pulverized product was subjected to a heating treatment at 3,000° C. for 15 minutes. Further, the resultant was subjected to a classification treatment. Thus, graphite particles 1 were obtained.

Production Example E-2

Production of Graphite Particles 2

Phenol resin particles having an average particle diameter of 5.0 μm were subjected to a heat stabilization treatment under an oxidizing atmosphere at 300° C. for 1 hour. After that, the temperature was increased to 2,200° C. at 1,100° C./h, and then the particles were subjected to a heating treatment at 2,200° C. for 10 minutes. Further, the particles were subjected to a classification treatment. Thus, graphite particles 2 were obtained.

Production Example E-3

Production of Graphite Particles 3

Graphite particles 3 were obtained in the same manner as in Production Example E-2 except that: the phenol resin particles were changed to a phenol resin particles having an average particle diameter of 3.0 μm; and a condition for the subsequent classification was changed timely.

Production Example E-4

Production of Graphite Particles 4

A coal-based heavy oil was subjected to a heat treatment. The produced coarse mesocarbon microbeads were centrifuged, purified by washing with benzene, and dried. Subsequently, the microbeads were mechanically dispersed with an atomizer mill. Thus, mesocarbon microbeads were obtained. The mesocarbon microbeads were carbonized under a nitrogen atmosphere by increasing their temperature to 1,200° C. at a rate of temperature increase of 600° C./h. Subsequently, secondary dispersion was performed with the atomizer mill. At this time, such adjustment that an average particle diameter of about 6 μm was obtained was performed. Under a nitrogen atmosphere, the temperature of the resultant dispersed product was increased to 2,000° C. at a rate of temperature increase of 1,000° C./h, and then the dispersed product was subjected to a heating treatment at 2,000° C. for 15 minutes. Further, the resultant was subjected to a classification treatment. Thus, graphite particles 4 were obtained.

Production Example E-5

Production of Graphite Particles 5

Graphite particles 5 were obtained in the same manner as in Production Example E-4 except that: the secondary dispersion with the atomizer mill was adjusted so that an average particle diameter of about 3.6 μm was obtained; the secondary heating treatment was changed to such a treatment that the temperature was increased to 2,800° C. at a rate of temperature increase of 1,400° C./h and then heating was performed at 2,800° C. for 15 minutes; and a classification condition was changed timely.

Production Example E-6

Production of Graphite Particles 6

Graphite particles 6 were obtained in the same manner as in Production Example E-4 except that: the secondary dispersion with the atomizer mill was adjusted so that an average particle diameter of about 3 μm was obtained; and a classification condition was changed timely.

Production Example E-7

Production of Graphite Particles 7

Coal tar was distilled so that light oil matter having a boiling point of 270° C. or less was removed. 100 Parts by mass of the tar matter were mixed with 85 parts by mass of acetone, and then the mixture was stirred at room temperature. After that, produced insoluble matter was removed by filtration. The filtrate was distilled so that acetone was separated. Thus, refined tar was obtained. 10 Parts by mass of concentrated nitric acid were added to 100 parts by mass of the resultant refined tar, and then the mixture was subjected to a polycondensation treatment at 350° C. for 1 hour in a vacuum distillation kettle. Further, the treated product was heated at 480° C. for 4 hours. After having been cooled, the resultant was taken out and mechanically pulverized. After that, under a nitrogen atmosphere, the temperature of the resultant was increased to 1,000° C. at a rate of temperature increase of 10° C./h, and then the resultant was subjected to a heating treatment (primary heating treatment) at 1,000° C. for 10 hours. At the time of the pulverization, such adjustment that an average particle diameter of about 2 μm was obtained was performed. Subsequently, under a nitrogen atmosphere, the temperature was increased to 3,000° C. at a rate of temperature increase of 10° C./h, and then the resultant was subjected to a heating treatment (secondary heating treatment) at 3,000° C. for 1 hour. Further, the resultant was subjected to a classification treatment. Thus, graphite particles 7 were obtained.

Production Example E-8

Production of Graphite Particles 8

Graphite particles 8 were obtained in the same manner as in Production Example E-7 except that: the vacuum distillation of the coal tar was performed at 480° C.; the mechanical pulverization was performed so that an average particle diameter of about 1 μm was obtained; and a classification condition was changed timely.

Production Example E-9

Production of Graphite Particles 9

Graphite particles 9 were obtained in the same manner as in Production Example E-1 except that: the pulverization was performed so that an average particle diameter of about 9 μm was obtained; the heating treatment under a nitrogen atmosphere was changed to such a treatment that the temperature was increased to 1,500° C. at a rate of temperature increase of 7,500° C./h and then heating was performed at 1,500° C. for 15 minutes; and a classification condition was changed timely.

Production Example E-10

Production of Graphite Particles 10

Graphite particles 10 were obtained in the same manner as in Production Example E-9 except that: the pulverization was performed so that an average particle diameter of about 8 μm was obtained; and a classification condition was changed timely.

Production Example E-11

Production of Graphite Particles 11

Graphite particles 11 were obtained in the same manner as in Production Example E-1 except that: the pulverization was performed so that an average particle diameter of about 4 μm was obtained; and a classification condition was changed timely.

Production Example E-12

Production of Graphite Particles 12

Tar pitch was softened and melted, and then the graphite particles 2 obtained in Production Example B-2 were added and mixed into the resultant in an amount of 5 parts by mass with respect to 100 parts by mass of the tar pitch. After that, under a nitrogen atmosphere, the mixture was subjected to a heating treatment at 420° C. for 12 hours while being stirred. The mixture was mechanically pulverized so that an average particle diameter of about 3 μm was obtained. After that, in the air, the temperature of the resultant was increased to 260° C. at a rate of temperature increase of 240° C./h, and then the resultant was subjected to a heating treatment at 260° C. for 30 minutes. Subsequently, under a nitrogen atmosphere, the temperature was increased to 1,000° C. at a rate of temperature increase of 500° C./h. Further, under an argon atmosphere, the temperature was increased to 3,000° C. at a rate of temperature increase of 1,000° C./h, and then the resultant was subjected to a heating treatment at 3,000° C. for 10 minutes. Finally, the resultant was subjected to a classification treatment. Thus, graphite particles 12 were obtained.

Production Example E-13

Production of Graphite Particles 13

Graphite particles 13 were obtained in the same manner as in Production Example E-11 except that: the pulverization was performed so that an average particle diameter of about 13 μm was obtained; the heating treatment under a nitrogen atmosphere was changed to such a treatment that the temperature was increased to 2,000° C. at a rate of temperature increase of 1,000° C./h and then heating was performed at 2,000° C. for 15 minutes; and a classification condition was changed timely.

Production Example E-14

Production of Graphite Particles 14

60 Parts by mass of coke particles (having an average particle diameter of 12 μm), 20 parts by mass of tar pitch, and 20 parts by mass of a furan resin (VF303 (trade name) manufactured by Hitachi Chemical Company, Ltd.) were mixed, and then the mixture was stirred at 200° C. for 2 hours. The mixture was mechanically pulverized, and was then subjected to a heating treatment under a nitrogen atmosphere with its temperature increased to 900° C. at a rate of temperature increase of 450° C./h. The pulverization was performed so that an average particle diameter of about 20 μm was obtained. Subsequently, under a nitrogen atmosphere, the temperature was increased to 2,000° C. at a rate of temperature increase of 1,000° C./h, and then the pulverized product was subjected to a heating treatment at 2,000° C. for 10 minutes. Further, the resultant was mechanically pulverized so that an average particle diameter of about 12 μm was obtained, followed by a classification treatment. Thus, graphite particles 14 were obtained.

Production Example E-15

Production of Graphite Particles 15

Graphite particles 15 were obtained in the same manner as in Production Example E-14 except that: the pulverization was performed so that an average particle diameter of about 8 μm was obtained; the heating treatment under a nitrogen atmosphere was changed to such a treatment that the temperature was increased to 1,500° C. at a rate of temperature increase of 1,000° C./h and then heating was performed at 1,500° C. for 10 minutes; and a classification condition was changed timely.

Production Example E-16

Production of Graphite Particles 16

Graphite particles 16 were obtained in the same manner as in Production Example E-11 except that: the pulverization was performed so that an average particle diameter of about 15 μm was obtained; the heating treatment under a nitrogen atmosphere was changed to such a treatment that the temperature was increased to 1,000° C. at a rate of temperature increase of 500° C./h and then heating was performed at 1,000° C. for 15 minutes; and a classification condition was changed timely.

Production Example E-17

Production of Graphite Particles 17

Graphite particles 17 were obtained in the same manner as in Production Example E-2 except that: the phenol resin particles were changed to a phenol resin particles having an average particle diameter of 15 μm; the heating treatment was changed to such a treatment that the temperature was increased to 1,500° C. at 750° C./h and then heating was performed at 1,500° C. for 10 minutes; and a classification condition was changed timely.

Production Example E-18

Production of Graphite Particles 18

Graphite particles 18 were obtained in the same manner as in Production Example E-2 except that: the phenol resin particles were changed to a phenol resin particles having an average particle diameter of 9 μm; the heating treatment was changed to such a treatment that the temperature was increased to 2,000° C. at 1,000° C./h and then heating was performed at 2,000° C. for 15 minutes; and a classification condition was changed timely.

Production Example E-19

Production of Graphite Particles 19

Graphite particles 19 were obtained in the same manner as in Production Example E-18 except that: the phenol resin particles were changed to a phenol resin particles having an average particle diameter of 10 μm; and a classification condition was changed timely.

Production Example E-20

Production of Graphite Particles 20

Graphite particles 20 were obtained in the same manner as in Production Example E-17 except that: the phenol resin particles were changed to a phenol resin particles having an average particle diameter of 7 μm; and a classification condition was changed timely.

Production Example E-21

Production of Graphite Particles 21

Graphite particles 21 were obtained in the same manner as in Production Example E-17 except that: the phenol resin particles were changed to a phenol resin particles having an average particle diameter of 6 μm; and a classification condition was changed timely.

Production Example E-22

Production of Graphite Particles 22

Graphite particles 22 were obtained in the same manner as in Production Example E-5 except that: the secondary dispersion with the atomizer mill was adjusted so that an average particle diameter of about 11.5 μm was obtained; and a classification condition was changed timely.

Production Example E-23

Production of Graphite Particles 23

Graphite particles 23 were obtained in the same manner as in Production Example E-22 except that: the secondary dispersion with the atomizer mill was adjusted so that an average particle diameter of about 10 μm was obtained; and a classification condition was changed timely.

Production Example E-24

Production of Graphite Particles 24

Graphite particles 24 were obtained in the same manner as in Production Example E-22 except that: the secondary dispersion with the atomizer mill was adjusted so that an average particle diameter of about 12 μm was obtained; and a classification condition was changed timely.

Production Example E-25

Production of Graphite Particles 25

Graphite particles 25 were obtained in the same manner as in Production Example E-16 except that: the pulverization was performed so that an average particle diameter of about 15 μm was obtained; and a classification condition was changed timely.

Production Example E-26

Production of Graphite Particles 26

Graphite particles 26 were obtained in the same manner as in Production Example E-9 except that: the pulverization was performed so that an average particle diameter of about 9 μm was obtained; the heating at 1,500° C. was performed for 30 minutes; and a classification condition was changed timely.

Production Example E-27

Production of Graphite Particles 27

Graphite particles 27 were obtained in the same manner as in Production Example E-9 except that: the pulverization was performed so that an average particle diameter of about 5 μm was obtained; and a classification condition was changed timely.

Production Example E-28

Production of Graphite Particles 28

Graphite particles 28 were obtained in the same manner as in Production Example E-9 except that: the pulverization was performed so that an average particle diameter of about 4 μm was obtained; and a classification condition was changed timely.

Production Example E-29

Production of Graphite Particles 29

Graphite particles 29 were obtained in the same manner as in Production Example E-9 except that: the pulverization was performed so that an average particle diameter of about 1 μm was obtained; and a classification condition was changed timely.

Production Example E-30

Production of Graphite Particles 30

Graphite particles 30 were obtained in the same manner as in Production Example E-16 except that: the pulverization was performed so that an average particle diameter of about 0.9 μm was obtained; and a classification condition was changed timely.

Production Example E-31

Production of Graphite Particles 31

Graphite particles 31 were obtained in the same manner as in Production Example E-2 except that: the phenol resin particles were changed to a phenol resin particles having an average particle diameter of 20 μm; and a classification condition was changed timely.

Production Example E-32

Production of Graphite Particles 32

Graphite particles 32 were obtained in the same manner as in Production Example B-14 except that: the pulverization was performed so that an average particle diameter of about 19 μm was obtained; and a classification condition was changed timely.

Production Example E-33

Production of Graphite Particles 33

Scaly graphite (CNP35 (trade name) manufactured by Ito Kokuen Co., Ltd.) was subjected to a pulverization treatment and the average particle diameter of the resultant was adjusted to 14 μm. After that, the resultant was subjected to a classification treatment. Thus, graphite particles 33 were obtained.

Production Example E-34

Production of Graphite Particles 34

Graphite particles 34 were obtained in the same manner as in Production Example E-33 except that the pulverization treatment was performed so that an average particle diameter of 1.5 μm was obtained.

Production Example E-35

Production of Graphite Particles 35

Graphite particles 35 were obtained in the same manner as in Production Example E-33 except that the pulverization treatment was performed so that an average particle diameter of 1.0 μm was obtained.

Production Example E-36

Production of Graphite Particles 36

Graphite particles 36 were obtained in the same manner as in Production Example E-33 except that the pulverization treatment was performed so that an average particle diameter of 0.5 μm was obtained.

Production Example E-37

Production of Graphite Particles 37

Graphite particles 37 were obtained in the same manner as in Production Example E-32 except that: the phenol resin particles were changed to a phenol resin particles having an average particle diameter of 8.5 μm; the heating was performed at 2,000° C. for 5 minutes; and a classification condition was changed timely.

Production Example E-38

Production of Graphite Particles 38

Graphite particles 38 were obtained in the same manner as in Production Example E-18 except that: the phenol resin particles were changed to a phenol resin particles having an average particle diameter of 9 μm; and a classification condition was changed timely.

Production Example E-39

Production of Graphite Particles 39

Graphite particles 39 were obtained in the same manner as in Production Example E-18 except that: the phenol resin particles were changed to a phenol resin particles having an average particle diameter of 6 μm; the heating was performed at 2,000° C. for 5 minutes; and a classification condition was changed timely.

Production Example E-40

Production of Graphite Particles 40

Graphite particles 40 were obtained in the same manner as in Production Example E-17 except that: the phenol resin particles were changed to a phenol resin particles having an average particle diameter of 6.5 μm; and a classification condition was changed timely.

Production Example E-41

Production of Graphite Particles 41

Graphite particles 41 were obtained in the same manner as in Production Example E-17 except that: the phenol resin particles were changed to a phenol resin particles having an average particle diameter of 29 μm; the heating treatment was changed to such a treatment that the temperature was increased to 1,000° C. at 500° C./h and then heating was performed at 1,000° C. for 2 minutes; and a classification condition was changed timely.

Production Example E-42

Production of Graphite Particles 42

Graphite particles 42 were obtained in the same manner as in Production Example E-17 except that: the phenol resin particles were changed to a phenol resin particles having an average particle diameter of 15.5 μm; the heating was performed at 1,500° C. for 20 minutes; and a classification condition was changed timely.

Production Example E-43

Production of Graphite Particles 43

Graphite particles 43 were obtained in the same manner as in Production Example E-42 except that: the phenol resin particles were changed to a phenol resin particles having an average particle diameter of 16 μm; and a classification condition was changed timely.

Production Example E-44

Production of Graphite Particles 44

Graphite particles 44 were obtained in the same manner as in Production Example E-15 except that: the pulverization was performed so that an average particle diameter of about 16.5 μm was obtained; and a classification condition was changed timely.

Production Example E-45

Production of Graphite Particles 45

Graphite particles 45 were obtained in the same manner as in Production Example E-15 except that: the pulverization was performed so that an average particle diameter of about 18 μm was obtained; and a classification condition was changed timely.

Production Example E-46

Production of Graphite Particles 46

Graphite particles 46 were obtained in the same manner as in Production Example E-15 except that: the pulverization was performed so that an average particle diameter of about 21 μm was obtained; and a classification condition was changed timely.

Production Example E-47

Production of Graphite Particles 47

Graphite particles 47 were obtained in the same manner as in Production Example E-14 except that: the pulverization was performed so that an average particle diameter of about 0.4 μm was obtained; the heating treatment under a nitrogen atmosphere was changed to such a treatment that the temperature was increased to 3,000° C. at a rate of temperature increase of 1,500° C./h and then heating was performed at 3,000° C. for 15 minutes; and a classification condition was changed timely.

Production Example E-48

Production of Graphite Particles 48

Graphite particles 48 were obtained in the same manner as in Production Example E-47 except that: the pulverization was performed so that an average particle diameter of about 0.3 μm was obtained; and a classification condition was changed timely.

Production Example E-49

Production of Graphite Particles 49

Graphite particles 49 were obtained in the same manner as in Production Example E-33 except that: the pulverization treatment was performed so that an average particle diameter of 20 μm was obtained.

Production Example E-50

Production of Graphite Particles 50

Graphite particles 50 were obtained in the same manner as in Production Example E-15 except that: the pulverization was performed so that an average particle diameter of about 18 μm was obtained; and a classification condition was changed timely.

Production Example E-51

Production of Graphite Particles 51

Graphite particles 51 were obtained in the same manner as in Production Example E-17 except that: the phenol resin particles were changed to a phenol resin particles having an average particle diameter of 29 μm; the heating treatment was changed to such a treatment that the temperature was increased to 1,000° C. at 500° C./h and then heating was performed at 1,000° C. for 2 minutes; and a classification condition was changed timely.

Production Example E-52

Production of Graphite Particles 52

Graphite particles 52 were obtained in the same manner as in Production Example E-17 except that: the phenol resin particles were changed to a phenol resin particles having an average particle diameter of 20 μm; a pulverization treatment was performed; and a classification condition was changed timely.

Production Example E-53

Production of Graphite Particles 53

Graphite particles 53 were obtained in the same manner as in Production Example E-33 except that: the pulverization treatment was performed so that an average particle diameter of 25 μm was obtained.

Production Example E-54

Production of Graphite Particles 54

Graphite particles 54 were obtained in the same manner as in Production Example E-47 except that: the pulverization was performed so that an average particle diameter of about 32 μm was obtained; and a classification condition was changed timely.

Production Example E-55

Production of Graphite Particles 55

Graphite particles 55 were obtained in the same manner as in Production Example E-47 except that: the pulverization was performed so that an average particle diameter of about 0.2 μm was obtained; and a classification condition was changed timely.

The average particle diameter A μm, spacing of the graphite (002) plane, longer diameter-to-shorter diameter ratio, ratio of particle diameters in the range of 0.5 A μm to 5 A μm, and half width of the Raman spectrum of each of the graphite particles 1 to 55 obtained in the foregoing were measured.

(Average Particle Diameter A of Graphite Particles)

100 Particles formed only of primary particles excluding particles that have undergone secondary agglomeration are observed with a transmission electron microscope (TEM). Their projected areas are determined, and then the circle-equivalent diameters of the resultant areas are calculated. A volume-average particle diameter is determined by converting the circle-equivalent diameters on a volume basis. The determined value is defined as the average particle diameter A. In addition, a particle size distribution is a distribution in terms of the volume-average particle diameter.

(Measurement of Spacing of Graphite (002) Plane of Graphite Particles)

Graphite particles directly filled into a reflection-free sample holder are defined as a measurement sample. An X-ray diffraction chart for the measurement sample of the graphite particles is obtained by performing X-ray diffraction measurement with a sample horizontal type strong X-ray diffractometer "RINT/TTR-II" (trade name, manufactured by Rigaku Corporation) and a CuKα line as a radiation source under the following conditions. It should be noted that a line subjected to monochromatization with a monochrometer was used as the CuKα line.

Main Measurement Conditions;

Optical system: A parallel beam optical system
Goniometer: A rotor horizontal Goniometer (TTR-2)
Tube voltage/current: 50 kV/300 mA
Measurement method: A continuous method
Scan axis: 2θ/θ
Measurement angle: 10° to 50°
Sampling interval: 0.02°
Scan rate: 4°/min
Divergence slit: Open
Divergence vertical slit: 10 mm
Scattering slit: Open
Light-receiving slit: 1.00 mm The peak position of a diffraction line from a graphite (002) plane is determined from the X-ray diffraction chart, and then the spacing of the graphite (002) plane (graphite d(002)) is calculated from Bragg's equation (the following equation (15)). Here, the wavelength λ of the CuKα line is 0.15418 nm.

$$\text{Graphite } d(002)=\lambda/(2\times\sin\theta) \quad (15)$$

(Longer Diameter-to-Shorter Diameter Ratio of Graphite Particles Themselves)

A maximum diameter-to-minimum diameter ratio is calculated for each of the 100 observed particles, and the average of the measured values is defined as a longer diameter-to-shorter diameter ratio.

(Ratio of Particle Diameters in Range of 0.5 A μm to 5 A μm)

A volume ratio of graphite particles each having a particle diameter of 0.5 A to 5 A to all graphite particles was determined from the particle size distribution obtained upon calculation of the average particle diameter A.

(Half Width of Raman Spectrum)

The resultant graphite particles are subjected to measurement with a Raman spectrometer "LabRAM HR" (trade name, manufactured by HORIBA JOBIN YVON) under the following measurement conditions. In the measurement, the bandwidth of a Raman band at a height corresponding to one half of a peak present in a region of 1,570 to 1,630 $cm^{-1}$ was calculated.

Main Measurement Conditions;

Laser: An He—Ne laser (having a peak wavelength of 632 nm)

Filter: D0.3

Hole: 1,000 μm

Slit: 100 μm

Central spectrum: 1,500 $cm^{-1}$

Measurement time: 1 second×16 times

Grating: 1,800

Objective lens: ×50

Table 21 shows the results.

TABLE 21

| Graphite particles | Average particle diameter A of graphite particles (μm) | Spacing of graphite (002) plane | Longer diameter-to-shorter diameter ratio | Ratio of particle diameters of 0.5A to 5A | Half width of Raman spectrum ($cm^{-1}$) |
|---|---|---|---|---|---|
| Graphite particles 1 | 3.2 | 0.3364 | 1.1 | 95 | 22 |
| Graphite particles 2 | 5.3 | 0.3421 | 1.3 | 92 | 55 |
| Graphite particles 3 | 3.1 | 0.3431 | 1.2 | 91 | 56 |
| Graphite particles 4 | 6.2 | 0.3451 | 1.5 | 88 | 56 |
| Graphite particles 5 | 3.5 | 0.3366 | 1.6 | 86 | 30 |
| Graphite particles 6 | 3 | 0.3372 | 1.3 | 97 | 38 |
| Graphite particles 7 | 2 | 0.3375 | 1.1 | 84 | 38 |
| Graphite particles 8 | 1.3 | 0.3361 | 1.3 | 91 | 28 |
| Graphite particles 9 | 9 | 0.3430 | 1.3 | 86 | 51 |
| Graphite particles 10 | 8.3 | 0.3400 | 1.9 | 90 | 46 |
| Graphite particles 11 | 3.8 | 0.3369 | 1.8 | 84 | 34 |
| Graphite particles 12 | 3.3 | 0.3388 | 1.7 | 90 | 42 |
| Graphite particles 13 | 13 | 0.3387 | 1.6 | 89 | 42 |
| Graphite particles 14 | 12.1 | 0.3370 | 1.3 | 93 | 29 |
| Graphite particles 15 | 18 | 0.3451 | 1.5 | 88 | 56 |
| Graphite particles 16 | 14.5 | 0.3445 | 1.4 | 85 | 45 |
| Graphite particles 17 | 15 | 0.3570 | 1.2 | 83 | 70 |
| Graphite particles 18 | 9.5 | 0.3490 | 1.3 | 93 | 73 |
| Graphite particles 19 | 10 | 0.3500 | 1.2 | 92 | 76 |
| Graphite particles 20 | 6.5 | 0.3560 | 1.1 | 84 | 77 |
| Graphite particles 21 | 6 | 0.3540 | 1.1 | 82 | 76 |
| Graphite particles 22 | 11 | 0.3358 | 2.0 | 87 | 31 |
| Graphite particles 23 | 10 | 0.3359 | 2.3 | 84 | 20 |
| Graphite particles 24 | 12 | 0.3355 | 2.2 | 83 | 21 |
| Graphite particles 25 | 14.5 | 0.3444 | 1.7 | 80 | 40 |
| Graphite particles 26 | 9 | 0.3390 | 1.3 | 85 | 33 |
| Graphite particles 27 | 4.8 | 0.3410 | 1.6 | 93 | 40 |

TABLE 21-continued

| Graphite particles | Average particle diameter A of graphite particles (μm) | Spacing of graphite (002) plane | Longer diameter-to-shorter diameter ratio | Ratio of particle diameters of 0.5A to 5A | Half width of Raman spectrum ($cm^{-1}$) |
|---|---|---|---|---|---|
| Graphite particles 28 | 4 | 0.3421 | 1.2 | 98 | 43 |
| Graphite particles 29 | 1.3 | 0.3425 | 1.3 | 77 | 43 |
| Graphite particles 30 | 0.9 | 0.3445 | 1.2 | 79 | 44 |
| Graphite particles 31 | 21 | 0.3430 | 1.2 | 90 | 40 |
| Graphite particles 32 | 19 | 0.3368 | 1.7 | 79 | 33 |
| Graphite particles 33 | 14.3 | 0.3354 | 2.5 | 79 | 21 |
| Graphite particles 34 | 1.5 | 0.3357 | 2.1 | 74 | 20 |
| Graphite particles 35 | 1.4 | 0.3356 | 2.3 | 78 | 18 |
| Graphite particles 36 | 0.5 | 0.3355 | 2.3 | 73 | 19 |
| Graphite particles 37 | 8.5 | 0.3440 | 2.2 | 72 | 53 |
| Graphite particles 38 | 9.3 | 0.3490 | 2.1 | 75 | 58 |
| Graphite particles 39 | 6 | 0.3460 | 2.1 | 80 | 66 |
| Graphite particles 40 | 6.5 | 0.3571 | 2.2 | 79 | 79 |
| Graphite particles 41 | 29 | 0.3650 | 2.3 | 86 | 81 |
| Graphite particles 42 | 15.4 | 0.3550 | 1.9 | 69 | 74 |
| Graphite particles 43 | 16 | 0.3540 | 1.3 | 73 | 77 |
| Graphite particles 44 | 16.4 | 0.3460 | 2.7 | 68 | 45 |
| Graphite particles 45 | 18 | 0.3450 | 2.9 | 65 | 40 |
| Graphite particles 46 | 21 | 0.3450 | 1.9 | 79 | 40 |
| Graphite particles 47 | 0.39 | 0.3358 | 2.8 | 69 | 15 |
| Graphite particles 48 | 0.3 | 0.3359 | 3.2 | 73 | 19 |
| Graphite particles 49 | 20 | 0.3358 | 2.5 | 75 | 18 |
| Graphite particles 50 | 18.3 | 0.3450 | 3.2 | 67 | 45 |
| Graphite particles 51 | 28.9 | 0.363 | 1.9 | 85 | 79 |
| Graphite particles 52 | 21 | 0.355 | 4.2 | 60 | 66 |
| Graphite particles 53 | 25.3 | 0.3354 | 3.8 | 66 | 21 |
| Graphite particles 54 | 32.4 | 0.3355 | 2.4 | 75 | 21 |
| Graphite particles 55 | 0.2 | 0.3355 | 2.5 | 90 | 18 |

Production Example F-3

Production of Elastic Roller 2

A thermosetting adhesive containing 10% of carbon black was applied to a stainless rod having a diameter of 6 mm and a length of 252.5 mm, and was then dried. The resultant was used as a conductive substrate.

The following components were added to 100 parts by mass of an epichlorohydrin rubber (EO-EP-AGE terpolymer, EO/EP/AGE=73 mol %/23 mol %/4 mol %), and then the mixture was kneaded with a closed mixer regulated to 50° C. for 10 minutes. Thus, a raw material compound was prepared.

| | |
|---|---|
| Calcium carbonate | 65 parts by mass |
| Aliphatic polyester-based plasticizer | 8 parts by mass |
| Zinc stearate | 1 part by mass |
| 2-Mercaptobenzimidazole (MB) (age resistor) | 0.5 part by mass |
| Zinc oxide | 2 parts by mass |
| Quaternary ammonium salt | 2 parts by mass |
| Carbon black (average particle diameter: 100 nm, volume resistivity: 0.1 Ω · cm) | 4.5 parts by mass |

0.8 Part by mass of sulfur as a vulcanizer, 1 part by mass of dibenzothiazyl sulfide (DM) as a vulcanization accelerator, and 0.5 part by mass of tetramethylthiuram monosulfide (TS) were added to the compound, and then the mixture was kneaded with a twin-roll machine cooled to 20° C. for 10 minutes. Thus, a compound for an elastic layer was obtained.

The compound for an elastic layer was extruded with an extrusion molding machine with a crosshead together with the conductive substrate, and then the extruded product was molded so as to be of a roller shape having an outer diameter of about 9 mm. Next, vulcanization and the curing of the adhesive were performed in an electric oven at 160° C. for 1 hour. Both ends of the rubber were cut so that the length of the rubber became 228 mm. After that, its surface was subjected to polishing so that a roller shape having an outer diameter of 8.5 mm was obtained. Thus, an elastic layer was formed on the conductive substrate. As a result, an elastic roller 2 having the elastic layer was obtained. It should be noted that the crown amount of the elastic layer of the elastic roller 2 (difference between an outer diameter at its central portion and an outer diameter at a position distant from the central portion by 90 mm) was 120 μm.

Production Example F-4

Production of Elastic Roller 3

The following components were added to 100 parts by mass of NBR, and then the mixture was kneaded with a closed mixer regulated to 50° C. for 10 minutes. Further, the resultant was kneaded with a closed mixer cooled to 20° C. for an additional twenty minutes. Thus, a raw material compound was prepared.

| | |
|---|---|
| Quaternary ammonium salt | 4 parts by mass |
| Calcium carbonate | 30 parts by mass |
| Zinc oxide | 5 parts by mass |
| Fatty acid | 2 parts by mass |

1 Part by mass of sulfur as a vulcanizer and 3 parts by mass of TS as a vulcanization accelerator were added to the compound, and then the mixture was kneaded with a twin-roll machine cooled to 20° C. for 10 minutes. Thus, a compound for an elastic layer was obtained. The subsequent procedure was performed in the same manner as in Production Example F-3. Thus, an elastic roller 3 was produced.

Example D-1

Preparation of Application Liquid for Surface Layer

First, an isododecane solution was prepared by dissolving the compound D-1 at 40%.

Meanwhile, methyl isobutyl ketone was added to a caprolactone-modified acrylic polyol solution "PLACCEL DC2016" (trade name, manufactured by Daicel Chemical Industries, Ltd.) to adjust the solid content of the mixture to 14 mass %.

Components shown in Table 22 below were added to 714.3 parts by mass of the solution (acrylic polyol solid content: 100 parts by mass). Thus, a mixed solution was prepared.

TABLE 22

| | |
|---|---|
| Composite conductive fine particles 1 | 45 Parts by mass |
| Surface-treated titanium oxide particles 1 | 20 Parts by mass |
| Modified dimethyl silicone oil (*1) | 0.08 Part by mass |
| Block isocyanate mixture (*2) | 80.14 Parts by mass |

At this time, the isocyanate amount of the block isocyanate mixture was such that a ratio "NCO/OH" was equal to 1.0.

(*1) and (*2) are identical to those described above.

187.5 Grams of the mixed solution were loaded into a glass bottle having an internal volume of 450 mL together with 200 g of glass beads having an average particle diameter of 0.8 mm as media, and then dispersion was performed with a paint shaker dispersing machine for 42 hours. After the dispersion, 5.25 g of the isododecane solution, 2.1 g of the graphite particles 1, and 2.1 g of polymethyl methacrylate resin particles having an average particle diameter of 6 μm were added to the resultant.

The amounts of all the compound D-1, the graphite particles 1, and the polymethyl methacrylate resin particles each correspond to 10 parts by mass with respect to 100 parts by mass of the acrylic polyol solid content.

After that, dispersion was performed for 5 minutes, and then the glass beads were removed. Thus, an application solution for a surface layer was obtained.

(Production of Charging Roller)

The application liquid for a surface layer was applied to the elastic roller 2 produced in Production Example F-3 once by dipping, and was then air-dried at normal temperature for 30 minutes or more. After that, the resultant was dried with a circulating hot air dryer at 80° C. for 1 hour and then at 160° C. for an additional one hour. Thus, a charging roller having a surface layer formed on the elastic layer was obtained.

Here, the dipping application was performed under the following conditions: an immersion time of 9 seconds, an initial dipping application lifting speed of 20 mm/s, and a final dipping application lifting speed of 2 mm/s. The application was performed while the speed was linearly changed with time.

The produced charging roller was subjected to the following evaluations.

Evaluation D-1 (Measurement for Graphite Particles in Surface Layer)

(1) Average particle diameter A (μm)

(2) Longer diameter-to-shorter diameter ratio (3) Ratio of particle diameters in range of 0.5 A μm to 5 A μm (4) Spacing of graphite (002) plane (5) Half width of Raman spectrum Evaluation D-2 (Evaluation of Charging Roller)

(1) Surface roughness (Rzjis and RSm)

(2) Electrical resistance (3) Confirmation of presence or absence of protruded portions derived from graphite particles Evaluation D-3 (Endurance Evaluation)

Hereinafter, evaluation methods are described.

Evaluation D-1 (Shape Characteristics of Graphite Particles in Surface Layer)

(1) (Average Particle Diameter A)

An arbitrary point of the surface layer is cut every 20 nm over 500 μm with focused ion beams "FB-2000C" (trade name, manufactured by Hitachi, Ltd.), and then its sectional images are photographed. Then, images obtained by photographing the same particle are combined at an interval of 20 nm so that a stereographic particle shape may be calculated. The operation was performed on 100 arbitrary points of the surface layer.

A projected area is calculated from the stereographic particle shape obtained in the foregoing, and then the circle-equivalent diameter of the resultant area is calculated. A volume-average particle diameter is determined from the circle-equivalent diameter, and is defined as the average particle diameter A. In addition, the particle size distribution of the graphite particles is a distribution in terms of the volume-average particle diameter.

(2) (Longer Diameter-to-Shorter Diameter Ratio of Graphite Particles in Surface Layer)

The ratio is the average of the maximum diameter-to-minimum diameter ratios of the stereoscopic particle shapes.

(3) (Ratio of Particle Diameters in Range of 0.5 A μm to 5 A μm)

A volume ratio of graphite particles each having a particle diameter of 0.5 A to 5 A to all graphite particles was determined from the particle size distribution of the graphite particles obtained in the section (1).

(4) (Measurement of Spacing of Graphite (002) Plane of Each of Graphite Particles and Graphite Particles in Surface Layer)

With regard to the graphite particles in the surface layer, the surface layer cut out of the surface of the charging roller is defined as a measurement sample. Graphite particles directly filled into a reflection-free sample holder are also defined as a measurement sample. An X-ray diffraction chart for the measurement sample of the graphite particles is obtained by performing X-ray diffraction measurement with a sample horizontal type strong X-ray diffractometer "RINT/TTR-II" (trade name, manufactured by Rigaku Corporation) and a CuKα line as a radiation source under the following conditions. It should be noted that a line subjected to monochromatization with a monochrometer was used as the CuKα line.

Main Measurement Conditions;

Optical system: A parallel beam optical system
Goniometer: A rotor horizontal goniometer (TTR-2)
Tube Voltage/Current: 50 kV/300 mA
Measurement method: A continuous method
Scan axis: 2θ/θ
Measurement angle: 10° to 50°
Sampling interval: 0.02°
Scan rate: 4°/min
Divergence slit: Open
Divergence vertical slit: 10 mm
Scattering slit: Open
Light-receiving slit: 1.00 mm The peak position of a diffraction line from a graphite (002) plane is determined from the X-ray diffraction chart, and then the spacing of the graphite (002) plane (graphite d(002)) is calculated from Bragg's equation (the following equation (15)). Here, the wavelength λ of the CuKα line is 0.15418 nm.

$$\text{Graphite } d(002)=\lambda/(2\times\sin\theta) \tag{15}$$

(5) (Measurement of Half Width of Raman Spectrum of Each of Graphite Particles and Graphite Particles in Surface Layer)

With regard to the particles in the surface layer, the graphite particles cut out of the surface layer are defined as a measurement sample. Graphite particles to be directly used are also defined as a measurement sample. The samples are subjected to measurement with a Raman spectrometer "LabRAM HR" (trade name, manufactured by HORIBA JOBIN YVON) under the following measurement conditions. In the measurement, the bandwidth of a Raman band at a height corresponding to one half of a peak present in a region of 1,570 to 1,630 $cm^{-1}$ was calculated.

Main Measurement Conditions;

Laser: An He—Ne laser (having a peak wavelength of 632 nm)
Filter: D0.3
Hole: 1,000 μm
Slit: 100 μm
Central spectrum: 1,500 $cm^{-1}$
Measurement time: 1 second×16 times
Grating: 1,800
Objective lens: ×50

Evaluation D-2 (Evaluation of Charging Roller)

(1) (Surface Roughness of Charging Roller)

Methods of measuring the ten-point average roughness Rzjis of the surface and the depression-protrusion average interval RSm of the surface are described below.

Measurement is performed in conformity with a surface roughness specification by JIS B0601-2001 with a surface roughness-measuring machine "SE-3500" (trade name, manufactured by Kosaka Laboratory Ltd.). The Rzjis is the average of values measured at six sites of the surface of the charging roller selected at random. In addition, the RSm is determined as described below. Six sites of the charging roller are selected at random, and then the average of ten depression-protrusion intervals measured at each of the sites is defined as the RSm of the measurement site. The average of the measured values at the six sites is defined as the RSm of the charging roller.

(2) (Measurement of Electrical Resistance of Charging Roller)

The resistance of the charging roller was measured with an instrument for measuring an electrical resistance illustrated in each of FIGS. 4A and 4B.

First, the charging roller 5 is brought into abutment with the columnar metal 32 (having a diameter of 30 mm) by the bearings 33*a* and 33*b* so that the charging roller 5 may be parallel to the metal (FIG. 4A).

Here, an abutting pressure was adjusted to 4.9 N at one end, i.e., a total of 9.8 N at both ends with a pressing force by springs.

Next, the charging roller 5 is rotated with a motor (not shown) following the columnar metal 32 rotationally driven at a circumferential speed of 45 mm/sec. During the rotation following the metal, as illustrated in FIG. 4B, a DC voltage of −200 V is applied from the stabilized power supply 34, and then a value for a current flowing in the charging roller 5 is measured with the ammeter 35. The resistance of the charging roller was calculated from the applied voltage and the current value. The charging roller was left to stand under a normal-temperature, normal-humidity (N/N: 23° C./55% RH) environment for 24 hours or more before its electrical resistance was measured.

(3) (Confirmation of Protruded Portions Derived from Graphite Particles)

The surface of the charging roller is observed with a laser microscope "LSM5 PASCAL" (trade name, manufactured by Carl Zeiss) in a field of view measuring 0.5 mm by 0.5 mm. An X-Y plane in the field of view is scanned with laser so that two-dimensional image data may be obtained. Further, the focal point is moved in a Z direction, and then the above scan is repeated so that three-dimensional image data may be obtained. Whether a protruded portion exists in the field of view is confirmed with the data.

Further, whether the protruded portion is derived from a graphite particle can be identified by changing the wavelength of laser with which the protruded portion is to be excited to examine the spectrum of excitation light.

Evaluation D-3 (Endurance Evaluation)

Preparation for Evaluation

A color laser printer (trade name: LBP5400, manufactured by Canon Inc.) as an electrophotographic apparatus having a construction illustrated in FIG. 6 was used. It should be noted that a process cartridge (for a black color) for the color laser printer was used as a process cartridge having a construction illustrated in FIG. 7. An attached charging roller was detached from the process cartridge, and then the produced charging roller was set. In addition, the charging roller was brought into abutment with a photosensitive member at a pressing force by springs of 4.9 N at one end, i.e., a total of 9.8 N at both ends (FIG. 8). After a monochromatic solid image had been continuously output on 50 sheets under a 23° C./50% RH environment, a solid white image was printed on one sheet. The foregoing operation was repeated ten times. Thus, the monochromatic solid image was output on a total of 500 sheets.

Endurance Test Evaluation

The color laser printer reconstructed so as to be able to output recording media at 220 mm/sec and 70 mm/sec (A4 vertical output) was used as an electrophotographic apparatus having a construction illustrated in FIG. 6. The resolution of an image is 600 dpi and the output of primary charging is a DC voltage of −1,000 V.

It should be noted that a process cartridge for an endurance test was obtained by mounting prepared charging roller on a new process cartridge (for the printer).

Three process cartridges of this kind were prepared and left at rest under (Environment 1), (Environment 2), and (Environment 3) for 24 hours, respectively. After that, each process cartridge was loaded into the electrophotographic apparatus, and then an electrophotographic image was formed under the same environment.

(Environment 1) A 15° C./10% RH environment
(Environment 2) A 23° C./50% RH environment
(Environment 3) A 30° C./80% RH environment Used as the electrophotographic image was such an image that the letter of an alphabet "E" having a size of 4 points was formed on A4 size paper so as to have a print density of 1%. In addition, the process speed was set to 220 mm/sec. Further, the formation of the electrophotographic image was performed according to the so-called intermittent mode in which the rotation of the electrophotographic photosensitive member was stopped over 3 seconds every time the image was output on 2 sheets.

Further, a halftone image was output on 2 sheets after the electrophotographic image had been output on 1,000 sheets. Here, the term "halftone image" refers to such an image that horizontal lines each having a width of 1 dot are drawn at an interval of 2 dots in a direction perpendicular to the rotation direction of the electrophotographic photosensitive member. In addition, the halftone image on the second sheet was formed by setting the process speed to 110 mm/sec.

Such halftone image was similarly output after the electrophotographic image had been output on 3,000 sheets and after the electrophotographic image had been output on 6,000 sheets. Thus, a total of 6 halftone images were obtained for one process cartridge.

Those halftone images were visually observed and evaluated for a situation of occurrence of a streak- or dot-like defect by the following criteria.

Rank 1; No defect is observed in any one of the halftone images.

Rank 2; Although a halftone image in which a slight defect is observed exists, the occurrence of a defect in sync with the rotational period of the charging roller is not observed.

Rank 3; A halftone image in which the occurrence of a defect in sync with the rotational period of the charging roller is observed exists.

Rank 4; A halftone image in which the occurrence of a distinct defect in sync with the rotational period of the charging roller is observed exists.

Example D-2

Methyl isobutyl ketone was added to the same caprolactone-modified acrylic polyol solution as that of Example D-1 to adjust the solid content of the mixture to 17 mass %. Components shown in Table 23 below were added to 588.24 parts by mass of the solution (acrylic polyol solid content: 100 parts by mass). Thus, a mixed solution was prepared.

TABLE 23

| | | |
|---|---|---|
| Carbon black "#52" (manufactured by Mitsubishi Chemical Corporation) | 40 | Parts by mass |
| Modified dimethyl silicone oil (*1) | 0.08 | Part by mass |
| Block isocyanate mixture (*2) | 80.14 | Parts by mass |

At this time, the isocyanate amount of the block isocyanate mixture was such that a ratio "NCO/OH" was equal to 1.0.

(*1) and (*2) are identical to those used in Example D-1.

195.6 Grams of the mixed solution were loaded into a glass bottle having an internal volume of 450 mL together with 200 g of glass beads having an average particle diameter of 0.8 mm as media, and then dispersion was performed with a paint shaker dispersing machine for 48 hours. After the dispersion, 5.1 g of the compound D-2, 0.64 g of the graphite particles 2, and 2.55 g of polymethyl methacrylate resin particles having an average particle diameter of 10 μm were added to the resultant. The amounts of the compound D-2, the graphite particles, and the polymethyl methacrylate resin particles correspond to 20 parts by mass, 2.5 parts by mass, and 10 parts by mass, respectively, with respect to 100 parts by mass of the acrylic polyol solid content. After that, a charging roller was produced in the same manner as in Example D-1.

Example D-3

Methyl isobutyl ketone was added to the same caprolactone-modified acrylic polyol solution as that of Example D-1 to adjust the solid content of the mixture to 17 mass %. Components shown in Table 24 below were added to 588.24 parts by mass of the solution (acrylic polyol solid content: 100 parts by mass). Thus, a mixed solution was prepared.

TABLE 24

| | | |
|---|---|---|
| Carbon black "#52" (manufactured by Mitsubishi Chemical Corporation) | 50 | Parts by mass |
| Modified dimethyl silicone oil (*1) | 0.08 | Part by mass |
| Block isocyanate mixture (*2) | 80.14 | Parts by mass |
| Compound D-3 (*3) | 10 | Parts by mass |

At this time, the isocyanate amount of the block isocyanate mixture was such that a ratio "NCO/OH" was equal to 1.0.

(*1) and (*2) are identical to those used in Example D-1.

(*3) was such that an acetone solution was prepared by dissolving the compound D-3 at 30%, and was then added so that parts by mass of the compound D-3 were as described above with respect to 100 parts by mass of the acrylic polyol solid content.

195.6 Grams of the mixed solution were loaded into a glass bottle having an internal volume of 450 mL together with 200 g of glass beads having an average particle diameter of 0.8 mm as media, and then dispersion was performed with a paint shaker dispersing machine for 48 hours. After the dispersion, 5.1 g of the graphite particles 3 and 2.55 g of polymethyl methacrylate resin particles having an average particle diameter of 3 μm were added to the resultant. The amounts of the graphite particles 3 and the polymethyl methacrylate resin particles correspond to 20 parts by mass and 10 parts by mass, respectively, with respect to 100 parts by mass of the acrylic polyol solid content. After that, a charging roller was produced in the same manner as in Example D-1.

Example D-4

Ethanol was added to polyvinyl butyral to adjust the solid content of the mixture to 20 mass %. Components shown in Table 25 below were added to 500 parts by mass of the solution (polyvinyl butyral solid content: 100 parts by mass). Thus, a mixed solution was prepared.

TABLE 25

| | | |
|---|---|---|
| Carbon black "#52" (manufactured by Mitsubishi Chemical Corporation) | 30 | Parts by mass |
| Compound D-4 | 10 | Parts by mass |
| Modified dimethyl silicone oil (*1) | 0.08 | Part by mass |

(*1) is identical to that used in Example D-1.

190.4 Grams of the mixed solution were loaded into a glass bottle having an internal volume of 450 mL together with 200 g of glass beads having an average particle diameter of 0.8 mm as media, and then dispersion was performed with a paint shaker dispersing machine for 24 hours. After the dispersion, 6.4 g of the graphite particles 4 and 3.2 g of polymethyl methacrylate resin particles having an average particle diameter of 6 μm were added to the resultant. The amounts of the graphite particles and the polymethyl methacrylate resin particles correspond to 20 parts by mass and 10 parts by mass, respectively, with respect to 100 parts by mass of the polyvinyl butyral solid content. After that, a charging roller was produced in the same manner as in Example D-1.

Example D-5

A methyl ethyl ketone solution was prepared by dissolving the compound D-5 at 40%. Dispersion was performed with a paint shaker for 48 hours in the same manner as in Example D-1. After that, 10.5 g of the methyl ethyl ketone solution and 2.1 g of the graphite particles 5 were added. The amount of the compound D-5 corresponds to 20 parts by mass with respect to 100 parts by mass of the acrylic polyol solid content and the amount of the graphite particles 5 corresponds to 10 parts by mass with respect thereto. After that, dispersion was performed for 5 minutes, and then the glass beads were removed. Thus, an application solution for a surface layer was obtained. A charging roller was produced in the same manner as in Example D-1 except that this application solution was used.

Example D-6

A methyl ethyl ketone solution was prepared by dissolving the compound D-6 at 40%. Dispersion was performed with a paint shaker for 48 hours in the same manner as in Example D-1. After that, 4.2 g of the methyl ethyl ketone solution and 4.2 g of the graphite particles 6 were added. The amount of the compound D-6 corresponds to 8 parts by mass with respect to 100 parts by mass of the acrylic polyol solid content and the amount of the graphite particles 6 corresponds to 20 parts by mass with respect thereto. After that, dispersion was performed for 5 minutes, and then the glass beads were removed. Thus, an application solution for a surface layer was obtained. A charging roller was produced in the same manner as in Example D-1 except that the application solution was used.

Examples D-7 and D-9 to D-11

Charging rollers were each produced in the same manner as in Example D-6 except that the kind and part(s) by mass of the compound to be added, and the kind and part(s) by mass of the graphite particles were changed as shown in Table 26. The term "part(s) by mass" in Table 26 refers to "part(s) by mass with respect to 100 parts by mass of the acrylic polyol solid content."

Example D-8

A charging roller was produced in the same manner as in Example D-7 except that: the compound to be added was changed to the compound represented by the average molecular formula (D-4A); and the part(s) by mass of the compound, and the kind and part(s) by mass of the graphite particles were changed as shown in Table 26.

Example D-12

A charging roller was produced in the same manner as in Example D-8 except that: the compound to be added was changed to the compound represented by the average molecular formula (D-5A); and the part(s) by mass of the compound, and the kind and part(s) by mass of the graphite particles were changed as shown in Table 26.

Examples D-13 and D-15

Charging rollers were each produced in the same manner as in Example D-6 except that: the kind and part(s) by mass of the compound, and the kind and part(s) by mass of the graphite particles were changed as shown in Table 26; and the elastic roller 2 was changed to the elastic roller 3.

Example D-14

A charging roller was produced in the same manner as in Example D-8 except that: the part(s) by mass of the compound to be added, and the kind and part(s) by mass of the graphite particles were changed as shown in Table 26.

Example D-16

A charging roller was produced in the same manner as in Example D-3 except that: the kind and part(s) by mass of the compound to be added, and the kind and part(s) by mass of the graphite particles were changed as shown in Table 26; and the elastic roller 2 was changed to the elastic roller 3.

Example D-17

A charging roller was produced in the same manner as in Example D-2 except that: the part(s) by mass of the compound to be added, and the kind and part(s) by mass of the graphite particles were changed as shown in Table 26.

Examples D-18, D-19, and D-21

Charging rollers were each produced in the same manner as in Example D-2 except that: the kind and part(s) by mass of the compound to be added, and the kind and part(s) by mass of the graphite particles were changed as shown in Table 26.

Example D-20

A charging roller was produced in the same manner as in Example D-16 except that: the kind and part(s) by mass of the compound to be added, and the kind and part(s) by mass of the graphite particles were changed as shown in Table 26.

Examples D-22 to D-30

Charging rollers were each produced in the same manner as in Example D-5 except that: the kind and part(s) by mass of the compound to be added, and the kind and part(s) by mass of the graphite particles were changed as shown in Table 26.

Examples D-31 to D-34

Charging rollers were each produced in the same manner as in Example D-6 except that: the kind and part(s) by mass of the compound to be added, and the kind and part(s) by mass of the graphite particles were changed as shown in Table 26.

Examples D-35 and D-36

Charging rollers were each produced in the same manner as in Example D-16 except that: the kind and part(s) by mass of the compound to be added, and the kind and part(s) by mass of the graphite particles were changed as shown in Table 26.

Examples D-37 to D-43

Charging rollers were each produced in the same manner as in Example D-17 except that: the kind and part(s) by mass of the compound to be added, and the kind and part(s) by mass of the graphite particles were changed as shown in Table 26.

Examples D-44 to D-46

Charging rollers were each produced in the same manner as in Example D-4 except that: the kind and part(s) by mass of the compound to be added, and the kind and part(s) by mass of the graphite particles were changed as shown in Table 26; and the polymethyl methacrylate resin particles having an average particle diameter of 6 μm were not added.

Examples D-47 and D-48

Charging rollers were each produced in the same manner as in Example D-4 except that: the kind and part(s) by mass of the compound to be added, and the kind and part(s) by mass of the graphite particles were changed as shown in Table 26.

Examples D-49 and D-50

Charging rollers were each produced in the same manner, as in Example D-44 except that: the kind and part(s) by mass of the compound to be added, and the kind and part(s) by mass of the graphite particles were changed as shown in Table 26.

Comparative Example D-1 and Comparative Example D-2

Charging rollers were each produced in the same manner as in Example D-50 except that: no compound was added; and the kind and part(s) by mass of the graphite particles were changed as shown in Table 27.

Comparative Example D-3 and Comparative Example D-4

Charging rollers were each produced in the same manner as in Comparative Example D-1 except that: the kind and part(s) by mass of the compound to be added, and the kind and part(s) by mass of the graphite particles were changed as shown in Table 27.

Comparative Example D-5

A charging roller was produced in the same manner as in Comparative Example D-1 except that: the kind and part(s) by mass of the compound to be added were changed as shown in Table 27; and no graphite particles were added.

Comparative Example D-6

A charging roller was produced in the same manner as in Comparative Example D-1 except that: the solid content of the polyvinyl butyral was adjusted to 25 mass %; and the kind and part(s) by mass of the compound to be added, and the kind and part(s) by mass of the graphite particles were changed as shown in Table 27.

The charging rollers according to the respective examples and comparative examples were each evaluated in the same manner as in Example D-1. Tables 28 to 32 below show the results.

Tables 28 to 30 show the results of the evaluation D-1 (1) to (5) of the graphite particles, and the results of the evaluation D-2 (1) to (3) of the charging rollers.

In addition, Table 31 and Table 32 show the results of the evaluation of the charging rollers according to the respective examples and comparative examples for their durability.

As shown in Tables 28 to 32, the charging roller according to the embodiments can be preferably incorporated into an electrophotographic apparatus or a process cartridge because the occurrence of each of a streak-like image, a spot-like image, and a rough image is suppressed.

TABLE 26

| | Compound having unit represented by formula (1) | | Graphite particles | |
|---|---|---|---|---|
| Example D | Kind | Part(s) by mass | No. | Part(s) by mass |
| 1 | Compound D-1 | 10.0 | 1 | 10.0 |
| 2 | Compound D-2 | 20.0 | 2 | 2.5 |
| 3 | Compound D-3 | 10.0 | 3 | 20.0 |
| 4 | Compound D-4 | 10.0 | 4 | 20.0 |
| 5 | Compound D-5 | 20.0 | 5 | 10.0 |
| 6 | Compound D-6 | 8.0 | 6 | 20.0 |
| 7 | Compound D-7 | 5.0 | 7 | 10.0 |
| 8 | Formula (D-4A) | 30.0 | 8 | 5.0 |
| 9 | Compound D-23 | 10.0 | 9 | 10.0 |
| 10 | Compound D-5 | 30.0 | 10 | 15.0 |
| 11 | Compound D-10 | 10.0 | 11 | 20.0 |
| 12 | Formula (D-5A) | 10.0 | 12 | 10.0 |
| 13 | Compound D-11 | 5.0 | 13 | 30.0 |
| 14 | Formula (D-4A) | 10.0 | 14 | 10.0 |
| 15 | Compound D-13 | 7.0 | 15 | 5.0 |
| 16 | Compound D-14 | 6.0 | 16 | 10.0 |
| 17 | Compound D-2 | 10.0 | 17 | 3.0 |
| 18 | Compound D-15 | 10.0 | 18 | 5.0 |
| 19 | Compound D-4 | 10.0 | 19 | 5.0 |
| 20 | Compound D-16 | 3.0 | 20 | 40.0 |
| 21 | Compound D-6 | 50.0 | 21 | 3.0 |
| 22 | Compound D-7 | 10.0 | 22 | 5.0 |
| 23 | Compound D-8 | 15.0 | 23 | 5.0 |
| 24 | Formula (D-4A) | 20.0 | 24 | 5.0 |
| 25 | Compound D-9 | 10.0 | 25 | 5.0 |
| 26 | Formula (D-5A) | 5.0 | 26 | 10.0 |
| 27 | Compound D-17 | 3.0 | 27 | 10.0 |

TABLE 26-continued

| Example D | Compound having unit represented by formula (1) Kind | Part(s) by mass | Graphite particles No. | Part(s) by mass |
|---|---|---|---|---|
| 28 | Compound D-18 | 1.0 | 28 | 40.0 |
| 29 | Compound D-1 | 10.0 | 29 | 30.0 |
| 30 | Compound D-2 | 8.0 | 30 | 35.0 |
| 31 | Compound D-12 | 10.0 | 31 | 10.0 |
| 32 | Compound D-19 | 10.0 | 32 | 10.0 |
| 33 | Compound D-21 | 10.0 | 33 | 10.0 |
| 34 | Compound D-19 | 10.0 | 34 | 30.0 |
| 35 | Compound D-20 | 2.0 | 35 | 30.0 |
| 36 | Compound D-12 | 10.0 | 36 | 30.0 |
| 37 | Compound D-13 | 5.0 | 37 | 10.0 |
| 38 | Compound D-4 | 30.0 | 38 | 10.0 |
| 39 | Compound D-22 | 20.0 | 39 | 50.0 |
| 40 | Compound D-12 | 10.0 | 40 | 2.0 |
| 41 | Compound D-24 | 30.0 | 41 | 8.0 |
| 42 | Compound D-17 | 10.0 | 42 | 5.0 |
| 43 | Compound D-21 | 1.0 | 43 | 5.0 |
| 44 | Compound D-22 | 10.0 | 44 | 8.0 |
| 45 | Compound D-25 | 3.0 | 45 | 2.0 |
| 46 | Compound D-12 | 2.0 | 46 | 1.0 |
| 47 | Compound D-25 | 10.0 | 47 | 20.0 |
| 48 | Compound D-12 | 0.5 | 48 | 20.0 |
| 49 | Compound D-24 | 40.0 | 49 | 2.0 |
| 50 | Formula (D-10A) | 50.0 | 50 | 2.0 |

TABLE 27

| Comparative Example D | Compound having unit represented by formula (1) Kind | Part(s) by mass | Graphite particles No. | Part(s) by mass |
|---|---|---|---|---|
| 1 | — | — | 51 | 10.0 |
| 2 | — | — | 52 | 10.0 |
| 3 | Compound D-27 | 10.0 | 53 | 10.0 |
| 4 | Compound D-26 | 10.0 | 54 | 10.0 |
| 5 | Formula (D-10A) | 10.0 | — | — |
| 6 | Formula (D-10A) | 10.0 | 55 | 10.0 |

TABLE 28

| | Evaluation | | | | | | | | |
|---|---|---|---|---|---|---|---|---|---|
| | D-1 | | | | | D-2 | | | |
| | | | | | | (1) | | | |
| Example D | (1) (μm) | (2) | (3) | (4) | (5) ($cm^{-1}$) | Rzjis (μm) | Rsm (μm) | (2) (Ω) | (3) |
| 1 | 3.0 | 1.1 | 95 | 0.3365 | 25 | 6.2 | 43 | $6.7 \times 10^4$ | Present |
| 2 | 5.0 | 1.3 | 93 | 0.3420 | 54 | 8.0 | 54 | $3.2 \times 10^5$ | Present |
| 3 | 3.0 | 1.2 | 90 | 0.3420 | 55 | 3.2 | 23 | $8.9 \times 10^4$ | Present |
| 4 | 6.0 | 1.5 | 89 | 0.3450 | 60 | 6.5 | 40 | $1.4 \times 10^5$ | Present |
| 5 | 3.5 | 1.6 | 86 | 0.3365 | 32 | 3.1 | 20 | $2.3 \times 10^5$ | Present |
| 6 | 3.0 | 1.3 | 98 | 0.3372 | 38 | 6.1 | 32 | $7.6 \times 10^4$ | Present |
| 7 | 2.0 | 1.1 | 84 | 0.3375 | 38 | 6.3 | 34 | $3.3 \times 10^4$ | Present |
| 8 | 1.0 | 1.3 | 90 | 0.3361 | 28 | 6.4 | 43 | $1.1 \times 10^5$ | Present |
| 9 | 9.0 | 1.4 | 85 | 0.3430 | 50 | 8.7 | 65 | $8.9 \times 10^4$ | Present |
| 10 | 8.0 | 1.9 | 91 | 0.3361 | 45 | 8.5 | 75 | $1.0 \times 10^5$ | Present |
| 11 | 3.8 | 1.8 | 84 | 0.3400 | 34 | 6.5 | 33 | $8.0 \times 10^4$ | Present |
| 12 | 3.0 | 1.7 | 91 | 0.3369 | 41 | 6.4 | 35 | $6.5 \times 10^4$ | Present |
| 13 | 13.0 | 1.6 | 89 | 0.3387 | 42 | 10.2 | 65 | $2.3 \times 10^5$ | Present |
| 14 | 12.0 | 1.4 | 90 | 0.3370 | 28 | 11.3 | 78 | $1.2 \times 10^5$ | Present |
| 15 | 18.0 | 1.5 | 88 | 0.3450 | 55 | 16.5 | 98 | $9.8 \times 10^5$ | Present |
| 16 | 14.5 | 1.4 | 84 | 0.3445 | 45 | 13.3 | 89 | $4.5 \times 10^5$ | Present |
| 17 | 16.0 | 1.2 | 83 | 0.3570 | 76 | 11.3 | 90 | $1.1 \times 10^5$ | Present |
| 18 | 9.0 | 1.3 | 90 | 0.3490 | 75 | 9.8 | 76 | $1.0 \times 10^5$ | Present |
| 19 | 10.0 | 1.2 | 92 | 0.3500 | 78 | 8.9 | 60 | $9.8 \times 10^4$ | Present |
| 20 | 6.5 | 1.1 | 81 | 0.3660 | 80 | 7.0 | 30 | $1.2 \times 10^5$ | Present |
| 21 | 6.0 | 1.1 | 80 | 0.3640 | 76 | 7.4 | 50 | $1.8 \times 10^5$ | Present |
| 22 | 11.0 | 2.1 | 85 | 0.3359 | 32 | 9.8 | 76 | $7.9 \times 10^4$ | Present |
| 23 | 10.0 | 2.3 | 84 | 0.3359 | 23 | 8.1 | 67 | $8.5 \times 10^4$ | Present |
| 24 | 12.0 | 1.7 | 82 | 0.3355 | 22 | 10.3 | 78 | $8.3 \times 10^4$ | Present |
| 25 | 14.5 | 1.3 | 78 | 0.3445 | 43 | 10.1 | 81 | $8.9 \times 10^4$ | Present |

TABLE 29

| Example D | Evaluation D-1 (1) (µm) | (2) | (3) | (4) | (5) ($cm^{-1}$) | D-2 (1) Rzjis (µm) | Rsm (µm) | (2) (Ω) | (3) |
|---|---|---|---|---|---|---|---|---|---|
| 26 | 9.0 | 1.3 | 85 | 0.3390 | 34 | 8.7 | 48 | 5.6 × $10^4$ | Present |
| 27 | 4.8 | 1.6 | 93 | 0.3410 | 45 | 4.5 | 33 | 3.5 × $10^4$ | Present |
| 28 | 4.0 | 1.3 | 96 | 0.3420 | 43 | 4.3 | 22 | 2.3 × $10^4$ | Present |
| 29 | 1.0 | 1.3 | 78 | 0.3425 | 45 | 3.2 | 21 | 4.8 × $10^4$ | Present |
| 30 | 0.8 | 1.2 | 76 | 0.3445 | 43 | 3.0 | 18 | 6.5 × $10^4$ | Present |
| 31 | 20.0 | 1.1 | 90 | 0.3430 | 41 | 18 | 78 | 8.8 × $10^4$ | Present |
| 32 | 19.0 | 1.7 | 77 | 0.3368 | 34 | 16.4 | 87 | 7.9 × $10^4$ | Present |
| 33 | 14.0 | 2.5 | 78 | 0.3354 | 21 | 12.1 | 78 | 8.9 × $10^4$ | Present |
| 34 | 1.5 | 2.1 | 75 | 0.3357 | 20 | 6.5 | 21 | 5.2 × $10^4$ | Present |
| 35 | 1.0 | 2.2 | 76 | 0.3356 | 19 | 4.3 | 18 | 2.8 × $10^4$ | Present |
| 36 | 0.5 | 2.3 | 72 | 0.3355 | 20 | 3.5 | 23 | 3.7 × $10^4$ | Present |
| 37 | 8.5 | 2.4 | 72 | 0.3440 | 54 | 8.9 | 56 | 7.1 × $10^4$ | Present |
| 38 | 9.0 | 2.1 | 75 | 0.3490 | 59 | 9.5 | 78 | 9.8 × $10^4$ | Present |
| 39 | 6.0 | 2.1 | 79 | 0.3460 | 65 | 10.5 | 33 | 5.0 × $10^4$ | Present |
| 40 | 6.5 | 2.2 | 78 | 0.3570 | 78 | 7.6 | 64 | 1.1 × $10^5$ | Present |
| 41 | 29.0 | 2.3 | 86 | 0.3650 | 80 | 25.3 | 102 | 1.1 × $10^5$ | Present |
| 42 | 15.5 | 1.8 | 67 | 0.3650 | 75 | 12.1 | 88 | 8.1 × $10^4$ | Present |
| 43 | 16.0 | 1.3 | 70 | 0.3640 | 78 | 13.3 | 78 | 5.8 × $10^4$ | Present |
| 44 | 16.5 | 2.7 | 66 | 0.3460 | 43 | 132 | 67 | 9.2 × $10^4$ | Present |
| 45 | 18.0 | 2.9 | 61 | 0.3450 | 42 | 15.2 | 84 | 1.9 × 105 | Present |
| 46 | 21.0 | 1.9 | 78 | 0.3450 | 41 | 10.2 | 107 | 1.4 × 105 | Present |
| 47 | 0.4 | 2.8 | 67 | 0.3359 | 15 | 7.9 | 23 | 8.5 × 104 | Present |
| 48 | 0.3 | 3.1 | 72 | 0.3359 | 17 | 6.5 | 34 | 4.7 × 104 | Present |
| 49 | 20.0 | 2.5 | 75 | 0.3358 | 19 | 14.8 | 85 | 2.0 × 105 | Present |
| 50 | 18.0 | 3.1 | 66 | 0.3450 | 46 | 16.7 | 101 | 1.8 × 105 | Present |

TABLE 30

| Comparative Example D | Evaluation D-1 (1) (µm) | (2) | (3) | (4) | (5) ($cm^{-1}$) | D-2 (1) Rzjis (µm) | Rsm (µm) | (2) (Ω) | (3) |
|---|---|---|---|---|---|---|---|---|---|
| 1 | 29.0 | 1.8 | 84 | 0.3630 | 80 | 25.9 | 98 | 9.0 × $10^4$ | Present |
| 2 | 20.0 | 4.3 | 0.55 | 0.3550 | 65 | 18.6 | 94 | 8.9 × $10^4$ | Present |
| 3 | 25.0 | 3.8 | 63 | 0.3354 | 20 | 22.3 | 88 | 1.3 × $10^5$ | Present |
| 4 | 32.0 | 2.3 | 76 | 0.3355 | 23 | 28.9 | 108 | 1.2 × $10^5$ | Present |
| 5 | — | — | — | — | — | 3.2 | 134 | 3.0 × $10^5$ | Absent |
| 6 | 0.2 | 2.5 | 90 | 0.3355 | 18 | 2.5 | 141 | 3.0 × $10^5$ | Absent |

TABLE 31

| Example D | Temperature: 15° C., relative humidity: 10% 1,000-th sheet | 3,000-th sheet | 6,000-th sheet | Temperature: 23° C., relative humidity: 50% 1,000-th sheet | 3,000-th sheet | 6,000-th sheet | Temperature: 30° C., relative humidity: 80% 1,000-th sheet | 3,000-th sheet | 6,000-th sheet |
|---|---|---|---|---|---|---|---|---|---|
| 1 | 1 | 1 | 1 | 1 | 1 | 1 | 1 | 1 | 1 |
| 2 | 1 | 2 | 2 | 1 | 1 | 2 | 1 | 2 | 2 |
| 3 | 1 | 2 | 2 | 1 | 1 | 2 | 1 | 2 | 2 |
| 4 | 1 | 1 | 1 | 1 | 1 | 1 | 1 | 1 | 1 |
| 5 | 1 | 1 | 1 | 1 | 1 | 1 | 1 | 1 | 1 |
| 6 | 1 | 1 | 1 | 1 | 1 | 1 | 1 | 1 | 1 |
| 7 | 1 | 1 | 1 | 1 | 1 | 1 | 1 | 1 | 1 |
| 8 | 1 | 1 | 1 | 1 | 1 | 1 | 1 | 1 | 1 |
| 9 | 1 | 1 | 1 | 1 | 1 | 1 | 1 | 1 | 1 |
| 10 | 1 | 1 | 1 | 1 | 1 | 1 | 1 | 1 | 1 |
| 11 | 1 | 1 | 1 | 1 | 1 | 1 | 1 | 1 | 1 |
| 12 | 2 | 2 | 2 | 1 | 2 | 2 | 2 | 2 | 2 |
| 13 | 1 | 2 | 2 | 1 | 1 | 2 | 1 | 1 | 2 |
| 14 | 1 | 2 | 2 | 1 | 1 | 2 | 1 | 1 | 1 |

TABLE 31-continued

| Example D | Temperature: 15° C., relative humidity: 10% 1,000-th sheet | 3,000-th sheet | 6,000-th sheet | Temperature: 23° C., relative humidity: 50% 1,000-th sheet | 3,000-th sheet | 6,000-th sheet | Temperature: 30° C., relative humidity: 80% 1,000-th sheet | 3,000-th sheet | 6,000-th sheet |
|---|---|---|---|---|---|---|---|---|---|
| 15 | 1 | 2 | 2 | 1 | 1 | 2 | 1 | 1 | 2 |
| 16 | 1 | 2 | 2 | 1 | 1 | 2 | 1 | 1 | 1 |
| 17 | 2 | 2 | 2 | 2 | 2 | 2 | 1 | 2 | 2 |
| 18 | 2 | 2 | 2 | 2 | 2 | 2 | 1 | 2 | 2 |
| 19 | 1 | 2 | 2 | 1 | 2 | 2 | 1 | 2 | 2 |
| 20 | 1 | 2 | 2 | 1 | 2 | 2 | 1 | 1 | 2 |
| 21 | 1 | 2 | 2 | 1 | 2 | 2 | 1 | 1 | 2 |
| 22 | 1 | 1 | 2 | 1 | 1 | 1 | 1 | 1 | 1 |
| 23 | 2 | 2 | 2 | 2 | 2 | 2 | 2 | 2 | 2 |
| 24 | 2 | 2 | 2 | 2 | 2 | 2 | 2 | 2 | 2 |
| 25 | 2 | 2 | 2 | 2 | 2 | 2 | 2 | 2 | 2 |
| 26 | 2 | 2 | 2 | 2 | 2 | 2 | 2 | 2 | 2 |
| 27 | 1 | 1 | 2 | 1 | 1 | 1 | 1 | 1 | 1 |
| 28 | 2 | 2 | 2 | 1 | 2 | 2 | 1 | 2 | 2 |
| 29 | 1 | 1 | 2 | 1 | 1 | 1 | 1 | 1 | 1 |
| 30 | 2 | 2 | 2 | 2 | 2 | 2 | 2 | 2 | 2 |
| 31 | 2 | 2 | 2 | 2 | 2 | 2 | 2 | 2 | 2 |
| 32 | 2 | 2 | 3 | 2 | 2 | 2 | 2 | 2 | 3 |
| 33 | 2 | 3 | 3 | 2 | 2 | 2 | 2 | 3 | 3 |
| 34 | 2 | 3 | 3 | 2 | 2 | 2 | 2 | 3 | 3 |
| 35 | 2 | 3 | 3 | 2 | 2 | 2 | 2 | 3 | 3 |
| 36 | 2 | 3 | 3 | 2 | 2 | 2 | 2 | 3 | 3 |
| 37 | 2 | 2 | 3 | 2 | 2 | 2 | 2 | 2 | 3 |
| 38 | 2 | 3 | 3 | 2 | 3 | 3 | 2 | 3 | 3 |
| 39 | 2 | 2 | 3 | 2 | 2 | 2 | 2 | 2 | 3 |
| 40 | 2 | 3 | 3 | 2 | 3 | 3 | 2 | 3 | 3 |
| 41 | 3 | 3 | 3 | 3 | 3 | 3 | 3 | 3 | 3 |
| 42 | 2 | 3 | 3 | 2 | 2 | 2 | 2 | 2 | 3 |
| 43 | 3 | 3 | 3 | 3 | 3 | 3 | 3 | 3 | 3 |
| 44 | 3 | 3 | 3 | 2 | 3 | 3 | 2 | 3 | 3 |
| 45 | 3 | 3 | 3 | 2 | 3 | 3 | 3 | 3 | 3 |
| 46 | 3 | 3 | 3 | 3 | 3 | 3 | 3 | 3 | 3 |
| 47 | 2 | 3 | 3 | 2 | 2 | 2 | 2 | 2 | 3 |
| 48 | 3 | 3 | 3 | 3 | 3 | 3 | 3 | 3 | 3 |
| 49 | 3 | 3 | 3 | 3 | 3 | 3 | 3 | 3 | 3 |
| 50 | 3 | 3 | 3 | 3 | 3 | 3 | 3 | 3 | 3 |

TABLE 32

| Comparative Example D | Temperature: 15° C., relative humidity: 10% 1,000-th sheet | 3,000-th sheet | 6,000-th sheet | Temperature: 23° C., relative humidity: 50% 1,000-th sheet | 3,000-th sheet | 6,000-th sheet | Temperature: 30° C., relative humidity: 80% 1,000-th sheet | 3,000-th sheet | 6,000-th sheet |
|---|---|---|---|---|---|---|---|---|---|
| 1 | 3 | 4 | 4 | 3 | 4 | 4 | 3 | 4 | 4 |
| 2 | 3 | 4 | 4 | 3 | 4 | 4 | 3 | 4 | 4 |
| 3 | 4 | 4 | 4 | 3 | 4 | 4 | 3 | 4 | 4 |
| 4 | 2 | 4 | 4 | 2 | 3 | 4 | 2 | 4 | 4 |
| 5 | 2 | 4 | 4 | 2 | 3 | 4 | 2 | 3 | 4 |
| 6 | 4 | 4 | 4 | 3 | 4 | 4 | 3 | 4 | 4 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-224897, filed Oct. 4, 2010, No. 2010-249896 filed Nov. 8, 2010 which are hereby incorporated by reference herein in their entirety.

What is claimed is:

1. A charging member, comprising:

a conductive substrate, and a surface layer provided thereon, wherein:

the surface layer comprises a compound having a unit represented by the following formula (1):

(1)

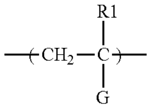

in the formula (1), R1 represents a hydrogen atom or an alkyl group having 1 to 4 carbon atoms, and G represents a group having a structure represented by the formula (2):

(2)

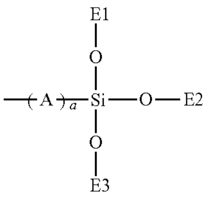

in the formula (2), A represents a group selected from the group consisting of an alkylene group having 2 to 10 carbon atoms, a phenylene group which may be substituted with at least one group selected from a methyl group and an ethyl group, and divalent groups represented by the following formulae (6) to (8), a represents 0 or 1, and E1, E2, and E3 each independently represent a group represented by the following formula (3):

(6)

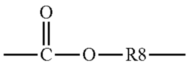

(7)

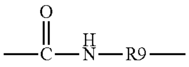

(8)

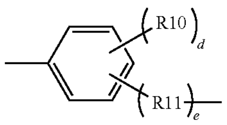

in the formulae (6) to (8), R8, R9, and R11 each independently represent an alkylene group having 1 to 10 carbon atoms, or a phenylene group which may be substituted with at least one group selected from a methyl group and an ethyl group, and in the formula (8), R10 represents an alkyl group having 1 to 10 carbon atoms, an alkoxyl group having 1 to 10 carbon atoms, an aryl group having 6 to 20 carbon atoms, an aralkyl group having 7 to 20 carbon atoms, an allyl group, or a halogen atom, d represents an integer of 0 to 4, and e represents 0 or 1;

(3)

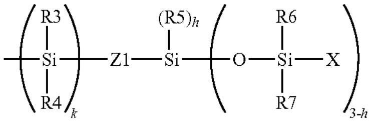

in the formula (3):

k represents 0 or 1, and h represents an integer of 0 to 3;

Z1 represents a group selected from the group consisting of an alkylene group having 2 to 10 carbon atoms, a phenylene group which may be substituted with at least one group selected from a methyl group and an ethyl group, and divalent groups represented by the following formulae (15) to (17);

R3, R4, R6, and R7 each independently represent an alkyl group having 1 to 5 carbon atoms, or a phenyl group which may be substituted with at least one group selected from a methyl group and an ethyl group;

R5 represents an alkoxy group having 1 to 10 carbon atoms, a phenoxy group which may be substituted with at least one group selected from a methyl group and an ethyl group, or a group represented by the following formula (20) or the following formula (21); and X represents a group selected from the group consisting of a hydrogen atom, an alkyl group having 1 to 10 carbon atoms, a phenyl group which may be substituted with at least one group selected from a methyl group and an ethyl group, an allyl group, a vinyl group, a group represented by the following formula (18), and a group represented by the following formula (19):

(15)

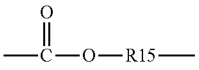

(16)

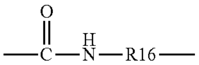

(17)

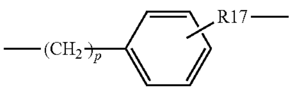

in the formulae (15) to (17), R15, R16, and R17 each independently represent an alkylene group having 1 to 10 carbon atoms, or a phenylene group which may be substituted with at least one group selected from a methyl group and an ethyl group, and p represents an integer of 0 to 3;

(18)

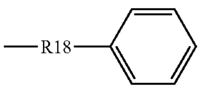

in the formula (18), R18 represents an alkylene group having 1 to 6 carbon atoms;

(19)

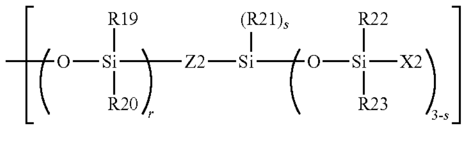

in the formula (19):

r represents 0 or 1, s represents an integer of 0 to 3, and Z2 represents a group selected from the group consisting of an alkylene group having 2 to 10 carbon atoms, a phenylene group which may be substituted with at least one group selected from a methyl group and an ethyl group, and divalent groups represented by the formulae (15) to (17);

R19, R20, R22, and R23 each independently represent an alkyl group having 1 to 5 carbon atoms, or a phenyl group which may be substituted with at least one group selected from a methyl group and an ethyl group, and R21 represents an alkoxy group having 1 to 10 carbon atoms, a phenoxy group which may be substituted with at least one group selected from a methyl group and an ethyl group, or a group represented by the following formula (20) or the following formula (21);

X2 represents a group selected from the group consisting of a hydrogen atom, an alkyl group having 1 to 10 carbon atoms, a phenyl group which may be substituted with at least one group selected from a methyl group and an ethyl group, an allyl group, a vinyl group, a group represented by the formula (18), and a group represented by the formula (19); and when X in the formula (3) is represented by the formula (19), the number of repetition of the group represented by the formula (19) is 1 to 10, and X2 in the formula (19) for forming a terminal end of the compound represents a hydrogen atom, an alkyl group having 1 to 10 carbon atoms, a phenyl group which may be substituted with at least one group selected from a methyl group and an ethyl group, an allyl group, a vinyl group, or a group represented by the formula (18):

(20)

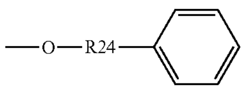

in the formula (20), R24 represents an alkylene group having 1 to 6 carbon atoms;

(21)

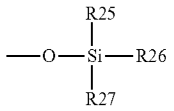

in the formula (21), R25, R26, and R27 each independently represent an alkyl group having 1 to 5 carbon atoms, or a phenyl group which may be substituted with at least one group selected from a methyl group and an ethyl group.

2. The charging member according to claim 1, wherein h in the formula (3) represents 0, X in the formula represents a group represented by the formula (19), the number of repetition of the group represented by the formula (19) is 1 to 3, and r in the formula (19) represents 0.

3. The charging member according to claim 1, wherein the compound further has a unit represented by the following formula (4):

(4)

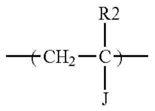

in the formula (4), R2 represents a hydrogen atom or an alkyl group having 1 to 4 carbon atoms, and J represents a hydrogen atom, an alkyl group having 1 to 4 carbon atoms, a phenyl group which may be substituted with at least one group selected from a methyl group and an ethyl group, or a group represented by the following formula (9), the following formula (10), or the following formula (11):

(9)

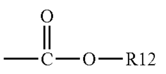

-continued (10)

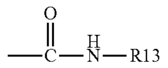

(11)

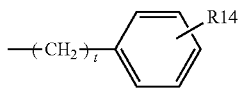

in the formulae (9) and (10), R12 and R13 each independently represent a group selected from the group consisting of an alkyl group having 1 to 6 carbon atoms, a phenyl group which may be substituted with at least one group selected from a methyl group and an ethyl group, and a group represented by the formula (11), and in the formula (11), R14 represents an alkyl group having 1 to 4 carbon atoms, or a phenyl group which may be substituted with at least one group selected from a methyl group and an ethyl group, and t represents an integer of 1 to 3.

4. The charging member according to claim 1, wherein in the formula (3), h and k each represent 0, and X represents such a group that a structure represented by the formula (5) among a structure represented by the formula (19) is repeated one to three times (5)

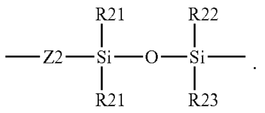

5. The charging member according to claim 1, wherein Z1 in the formula (3) represents an alkylene group having 2 to 6 carbon atoms.

6. The charging member according to claim 1, wherein the surface layer contains graphite particles and the surface layer has protruded portions derived from the graphite particles.

7. The charging member according to claim 6, wherein the graphite particles have an average particle diameter of 0.5 μm to 15 μm.

8. The charging member according to claim 6, wherein the graphite particles have a longer diameter-to-shorter diameter ratio of 2 or less.

9. The charging member according to claim 6, wherein when an average particle diameter of the graphite particles is represented by A μm, 80% or more of the graphite particles each have a particle diameter in a range of 0.5 A to 5 A.

10. The charging member according to claim 6, wherein the graphite particles have a spacing of a graphite (002) plane of 0.3361 nm to 0.3450 nm.

11. The charging member according to claim 1, wherein the surface layer contains a binder resin, and a surface of the surface layer has a continuous phase formed of the binder resin and a discontinuous phase formed of the compound having the unit represented by the formula (1).

12. The charging member according to claim 1, wherein the surface layer contains a binder resin and resin particles formed of the compound having the unit represented by the formula (1), and a surface of the surface layer has protruded portions derived from the resin particles.

13. A process cartridge, comprising the charging member according to claim 1 integrated with at least a body to be charged, wherein the process cartridge is detachably mountable to a main body of an electrophotographic apparatus.

14. An electrophotographic apparatus, comprising at least:

the process cartridge according to claim 13;

an exposing apparatus; and a developing apparatus.

15. The electrophotographic apparatus according to claim 14, wherein the body to be charged is charged by applying only a DC voltage to the charging member.

* * * * *